United States Patent
Jasper et al.

(10) Patent No.: US 10,442,990 B2
(45) Date of Patent: *Oct. 15, 2019

(54) MESOGENIC COMPOUNDS, LIQUID CRYSTAL MEDIA AND COMPONENTS FOR HIGH FREQUENCY TECHNOLOGY

(75) Inventors: Christian Jasper, Seligenstadt (DE); Elvira Montenegro, Weinheim (DE); Detlef Pauluth, Ober-Ramstadt (DE); Volker Reiffenrath, Rossdorf (DE); Atsutaka Manabe, Bensheim (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/006,106

(22) PCT Filed: Feb. 27, 2012

(86) PCT No.: PCT/EP2012/000827
§ 371 (c)(1),
(2), (4) Date: Sep. 19, 2013

(87) PCT Pub. No.: WO2012/126563
PCT Pub. Date: Sep. 27, 2012

(65) Prior Publication Data
US 2014/0008575 A1 Jan. 9, 2014

(30) Foreign Application Priority Data
Mar. 24, 2011 (DE) .......... 10 2011 015 039

(51) Int. Cl.
C09K 19/18 (2006.01)
C09K 19/32 (2006.01)
C09K 19/30 (2006.01)

(52) U.S. Cl.
CPC .......... *C09K 19/18* (2013.01); *C09K 19/3048* (2013.01); *C09K 19/322* (2013.01); *C09K 2019/183* (2013.01); *C09K 2019/188* (2013.01); *C09K 2219/11* (2013.01)

(58) Field of Classification Search
None
See application file for complete search history.

(56) References Cited

U.S. PATENT DOCUMENTS

| | | | |
|---|---|---|---|
| 5,191,339 A * | 3/1993 | Riza | 342/372 |
| 5,356,558 A | 10/1994 | Yamada et al. | |
| 6,149,837 A | 11/2000 | Sekine et al. | |
| 6,168,728 B1 | 1/2001 | Miyazawa et al. | |
| 6,623,810 B2 | 9/2003 | Sekine et al. | |
| 7,361,288 B2 | 4/2008 | Lussem et al. | |
| 7,846,513 B2 | 12/2010 | Sasada | |
| 7,981,486 B2 | 7/2011 | Sasada | |
| 8,557,142 B2 | 10/2013 | Montenegro et al. | |
| 2001/0050353 A1 * | 12/2001 | Sekine | C07C 22/08 252/299.66 |
| 2002/0110650 A1 * | 8/2002 | Sekine | C07D 333/76 428/1.1 |
| 2005/0067605 A1 | 3/2005 | Lussem et al. | |
| 2006/0097226 A1 | 5/2006 | Sasada | |
| 2008/0083904 A1 * | 4/2008 | Wittek et al. | 252/299.67 |
| 2009/0230356 A1 | 9/2009 | Sasada | |
| 2009/0278744 A1 * | 11/2009 | Kirino et al. | 343/700 MS |
| 2012/0205583 A1 | 8/2012 | Montenegro et al. | |
| 2012/0273724 A1 * | 11/2012 | Jasper et al. | 252/299.63 |

FOREIGN PATENT DOCUMENTS

| | | |
|---|---|---|
| CN | 102575165 A | 7/2012 |
| DE | 19907941 A1 | 8/1999 |
| DE | 10120024 A1 | 11/2001 |
| DE | 102004029429 A1 | 2/2005 |
| EP | 0968988 A1 | 1/2000 |
| EP | 1655360 A1 | 5/2006 |
| WO | WO 2011035849 A1 * | 3/2011 |
| WO | WO 2011047781 A1 * | 4/2011 |

OTHER PUBLICATIONS

Galda et al., A Versatile Palladium-Catalyzed Synthesis of n-Alkyl-Substituted Oligo-p-phenyl, May 1996, PApers, 614-620.*
International Search Report from PCT/EP2012/000858 dated May 21, 2012.
Co-pending U.S. Appl. No. 14/006,109, filed Sep. 19, 2013.
International Search Report from PCT/EP2012/000827 dated May 14, 2012.
C.S. Hsu, et al. "Synthesis of laterally substituted bistolane liquid crystals" Liquid Crystals, [2000], vol. 27, No. 2, pp. 283-287.
Shin-Tson Wu, et al. "High birefringence and wide nematic range bis-tolane liquid crystals" Applied Physics Letters, [Jan. 1999], vol. 74, No. 3, pp. 344-346.
Kegang Liu, et al. "Synthesis and characterization of novel fluorinated bistolane-type liquid crystals" Liquid Crystals, [2001], vol. 28, No. 10, pp. 1463-1467.

(Continued)

*Primary Examiner* — Cynthia H Kelly
*Assistant Examiner* — Anna Malloy
(74) *Attorney, Agent, or Firm* — Millen, White, Zelano and Branigan, P.C.

(57) ABSTRACT

A liquid-crystal medium having a component A which is one or more compounds of the formula IA

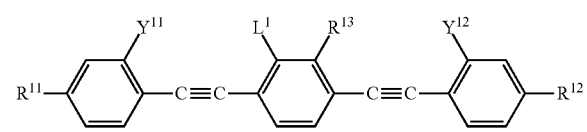

IA and corresponding, novel mesogenic compounds and the preparation thereof. These liquid-crystal media, are used in components for high-frequency technology, and to components of this type which contain the media. The components are suitable, in particular, for phase shifters in the microwave and millimeter wave region, for microwave and millimeter wave array antennae and very particularly for so-called tunable "reflectarrays".

23 Claims, No Drawings

(56) References Cited

OTHER PUBLICATIONS

Zhenlin Zhang, et al. "Synthesis and properties of highly birefringent liquid crystalline materials: 2,5-bis(5-alkyl-2-butadinylthiophene-yl) styrene monomers" Liquid Crystals, [Jan. 2010], vol. 37, No. 1, pp. 69-76.

Official Action related to the corresponding Chinese Application No. 201280013689.0 dated Aug. 21, 2014.

* cited by examiner

MESOGENIC COMPOUNDS, LIQUID CRYSTAL MEDIA AND COMPONENTS FOR HIGH FREQUENCY TECHNOLOGY

FIELD OF THE INVENTION

The present invention relates to liquid-crystalline media, in particular for high-frequency technology, especially components for high-frequency devices, in particular antennas, especially for the gigahertz region and the terahertz region, which are operated in the microwave or millimeter wave region. These components use particular mesogenic, preferably liquid-crystalline, chemical compounds or liquid-crystalline media composed thereof for, for example, the phase shifting of microwaves for tunable phased-array antennas or for tunable cells of microwave antennas based on "reflectarrays". In addition, the present invention relates to novel mesogenic compounds.

PRIOR ART AND PROBLEM TO BE SOLVED

Liquid-crystalline media have long been utilised in electro-optical displays (liquid crystal displays—LCDs) in order to display information.

Bistolan compounds, also known as triphenyldiacetylenes, having an additional alkyl substitution on the central phenylene ring are adequately known to the person skilled in the art.

For example, Wu, S.-T., Hsu, C.-S, and Shyu, K.-F., Appl. Phys. Lett., 74 (3), (1999), pages 344-346, discloses various liquid-crystalline bistolan compounds containing a lateral methyl group, of the formula

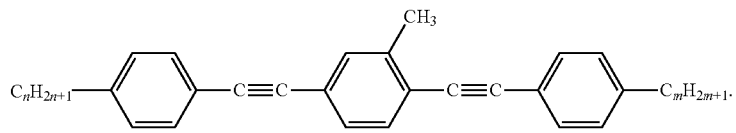

Besides liquid-crystalline bistolan compounds of this type containing a lateral methyl group, Hsu, C. S., Shyu, K. F., Chuang, Y. Y. and Wu, S.-T., Liq. Cryst., 27 (2), (2000), pages 283-287, also discloses corresponding compounds containing a lateral ethyl group and proposes the use thereof, inter alia, in liquid crystal optically phased arrays.

Dabrowski, R., Kula, P., Gauza, S., Dziadiszek, J., Urban, S, and Wu, S.-T., IDRC 08, (2008), pages 35-38, mentions dielectrically neutral bistolan compounds with and without a lateral methyl group on the central ring besides the strongly dielectrically positive isothiocyanatobistolan compounds of the formula

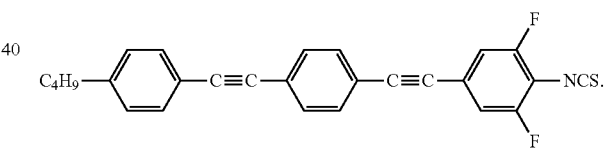

Compounds containing three C—C triple bonds, such as, for example, the compound

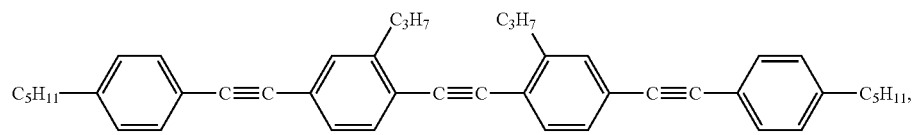

are mentioned in JP 2003-207631 A) and are proposed for use in optical films, polarisers and in liquid crystals of the light-scattering type.

Compounds of the general formula

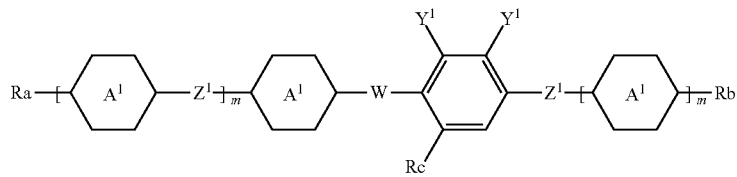

in which

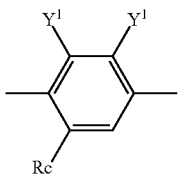

denotes, for example,

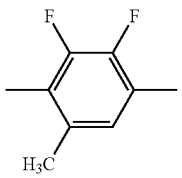

are described in EP 1 655 360 A1.

However, liquid-crystalline media have recently also been proposed for use in components for microwave technology, as described, for example, in DE 10 2004 029 429 A and in JP 2005-120208 (A).

An industrially valuable application of liquid-crystalline media in high-frequency technology is based on their property that their dielectric properties can be controlled, particularly for the gigahertz region and the terahertz region, by a variable voltage. This enables the construction of tunable antennas which contain no moving parts (Gaebler, A., Moessinger, A., Goelden, F., et al., "Liquid Crystal-Reconfigurable Antenna Concepts for Space Applications at Microwave and Millimeter Waves", International Journal of Antennas and Propagation, Volume 2009, Article ID 876989, (2009), pages 1-7, DOI: 10.1155/2009/876989).

Penirschke, A., Müller, S., Scheele, P., Weil, C., Wittek, M., Hock, C. and Jakoby, R.: "Cavity Perturbation Method for Characterisation of Liquid Crystals up to 35 GHz", $34^{th}$ European Microwave Conference—Amsterdam, pp. 545-548, describe, inter alia, the properties of the known single liquid-crystalline substance K15 (also called 4-n-pentyl-4'-cyanobiphenyl or PP-5-N, Merck KGaA, Germany) at a frequency of 9 GHz.

DE 10 2004 029 429 A describes the use of liquid-crystal media in microwave technology, inter alia in phase shifters. DE 10 2004 029 429 A has already investigated liquid-crystalline media with respect to their properties in the corresponding frequency range.

For use in high-frequency technology, liquid-crystalline media having particular, hitherto rather unusual, unconventional properties, or combinations of properties, are required.

A. Gaebler, F. Goelden, S. Müller, A. Penirschke and R. Jakoby "Direct Simulation of Material Permittivities using an Eigen-Susceptibility Formulation of the Vector Variational Approach", 12MTC 2009—International Instrumentation and Measurement Technology Conference, Singapore, 2009 (IEEE), pp. 463-467, describe the corresponding properties of the known liquid-crystal mixture E7 (likewise Merck KGaA, Germany).

DE 10 2004 029 429 A describes the use of liquid-crystal media in microwave technology, inter alia in phase shifters. DE 10 2004 029 429 A has already investigated liquid-crystalline media with respect to their properties in the corresponding frequency range. In addition, it mentions liquid-crystalline media which comprise compounds of the formulae

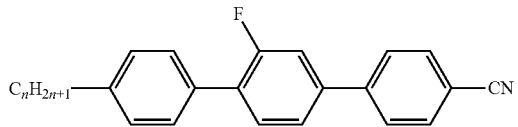

besides compounds of the formulae

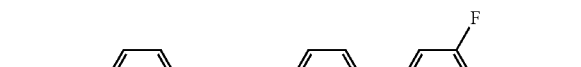

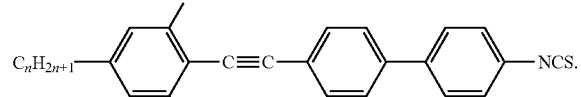

Liquid-crystal media which comprise, for example, compounds of the formula

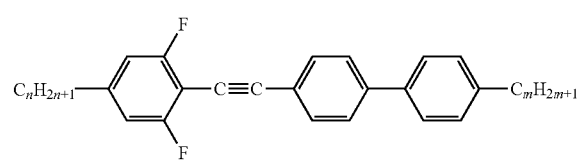

are proposed for use in components for high-frequency technology, for example, in A. Lapanik, "Single compounds and mixtures for microwave applications, Dielectric, microwave studies on selected systems", dissertation, Technical University of Darmstadt, 2009, (D17).

However, the compositions known to date are afflicted with serious disadvantages. Besides other deficiencies, most of them result in disadvantageously high losses and/or inadequate phase shift or inadequate material quality ($\eta$).

Novel liquid-crystalline media having improved properties are thus necessary. In particular, the loss in the microwave region and/or millimeter wave region must be reduced and the material quality improved.

In addition, there is a demand for an improvement in the low-temperature behaviour of the liquid-crystalline media and thus also of the components. Both an improvement in the operating properties and also in the shelf life are necessary here.

Thus, there is a considerable demand for liquid-crystalline media having suitable properties for corresponding practical applications.

PRESENT INVENTION

Surprisingly, it has now been found that it is possible to achieve components for high-frequency technology which do not have the disadvantages of the prior-art materials, or at least only do so to a considerably reduced extent, if selected liquid-crystalline media are employed.

The present invention thus relates to liquid-crystalline media which comprise one or more compounds of the formula IA,

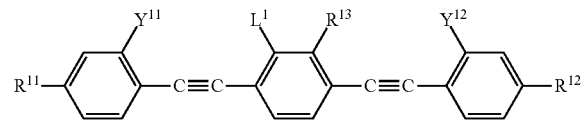

IA in which
L¹ denotes alkyl having 1 to 6 C atoms, cycloalkyl having 3 to 6 C atoms, cycloalkenyl having 4 to 6 C atoms or halogen, preferably $CH_3$, $C_2H_5$, n-$C_3H_7$ (—$(CH_2)_2CH_3$), i-$C_3H_7$ (—$CH(CH_3)_2$), cyclopropyl, cyclobutyl, cyclopentyl, cyclohexyl, cyclopent-1-enyl, cyclohex-1-enyl, F or Cl and particularly preferably $CH_3$, $C_2H_5$, cyclopropyl, cyclobutyl or F and very particularly preferably F,
one of
$Y^{11}$ and $Y^{12}$ denotes alkyl having 1 to 6 C atoms, cycloalkyl having 3 to 6 C atoms, cycloalkenyl having 4 to 6 C atoms or halogen, preferably $CH_3$, $C_2H_5$, n-$C_3H_7$ (—$(CH_2)_2CH_3$), i-$C_3H_7$ (—$CH(CH_3)_2$), cyclopropyl, cyclobutyl, cyclopentyl, cyclohexyl, cyclopent-1-enyl, cyclohex-1-enyl, F or Cl and particularly preferably $CH_3$, $C_2H_5$ or F and very particularly preferably F,
and the other denotes H, alkyl having 1 to 6 C atoms, cycloalkyl having 3 to 6 C atoms, cycloalkenyl having 4 to 6 C atoms or halogen, preferably H, $CH_3$, $C_2H_5$, n-$C_3H_7$ (—$(CH_2)_2CH_3$), i-$C_3H_7$ (—$CH(CH_3)_2$), cyclopropyl, cyclobutyl, cyclopentyl, cyclohexyl, cyclopent-1-enyl, cyclohex-1-enyl, F or Cl and particularly preferably H, $CH_3$, $C_2H_5$ or F and very particularly preferably H,
$R^{11}$ to $R^{13}$, independently of one another, denote unfluorinated alkyl or unfluorinated alkoxy, each having 1 to 15 C atoms, unfluorinated alkenyl, unfluorinated alkenyloxy or unfluorinated alkoxyalkyl, each having 2 to 15 C atoms, or cycloalkyl, alkylcycloalkyl, cycloalkenyl, alkylcycloalkenyl, alkylcycloalkylalkyl or alkylcycloalkenylalkyl, each having up to 15 C atoms, and $R^{13}$ alternatively also denotes H,
preferably
$R^{11}$ and $R^{12}$, independently of one another, denote unfluorinated alkyl or unfluorinated alkoxy, each having 1 to 7 C atoms, or unfluorinated alkenyl, unfluorinated alkenyloxy or unfluorinated alkoxyalkyl, each having 2 to 7 C atoms,
particularly preferably
$R^{11}$ denotes unfluorinated alkyl having 1 to 7 C atoms or unfluorinated alkenyl, unfluorinated alkenyloxy or unfluorinated alkoxyalkyl, each having 2 to 7 C atoms, and
particularly preferably
$R^{12}$ denotes unfluorinated alkyl or unfluorinated alkoxy, each having 1 to 7 C atoms, and
preferably
$R^{13}$ denotes H, unfluorinated alkyl having 1 to 5 C atoms, unfluorinated cycloalkyl or cycloalkenyl having 3 to 7 C atoms, unfluorinated alkylcyclohexyl or unfluorinated cyclohexylalkyl, each having 4 to 12 C atoms, or unfluorinated alkylcyclohexylalkyl having 5 to 15 C atoms, particularly preferably cyclopropyl, cyclobutyl, cyclopentyl or cyclohexyl, particularly preferably H or n-alkyl and very particularly preferably H, methyl, ethyl or n-propyl.

The liquid-crystal media according to the invention are eminently suitable for use in components for high-frequency technology or for the microwave region and/or millimeter wave region of the electromagnetic spectrum. The present invention relates to this use of the media and to these components.

In a first preferred embodiment of the present invention, the component for high-frequency technology contains a liquid-crystal medium which comprises a component A which consists of one compound, two compounds or a plurality of compounds of the formula IA.

In accordance with a further preferred embodiment of the present invention, the component for high-frequency technology contains a liquid-crystalline medium comprising
a first component, component A, which comprises one or more compounds of the above-mentioned formula IA and which optionally comprises one or more compounds of the formula IB, and
one or more further components selected from the group of components B to E defined below,
a strongly dielectrically positive component, component B, which has a dielectric anisotropy of 10.0 or more,
a strongly dielectrically negative component, component C, which has a dielectric anisotropy of –5.0 or less,
a further component, component D, which has a dielectric anisotropy in the range from more than –5.0 to less than 10.0 and consists of compounds having seven or more, preferably eight or more, five- or six-membered rings, and
a further component, component E, which likewise has a dielectric anisotropy in the range from more than –5.0 to less than 10.0 and consists of compounds having up to six five- or six-membered rings.

Typical examples of five-membered rings are

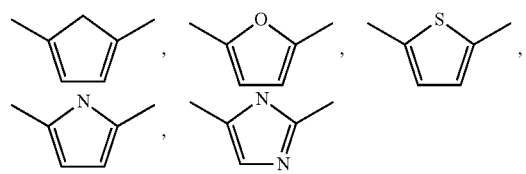

and others.

Typical examples of six-membered rings are

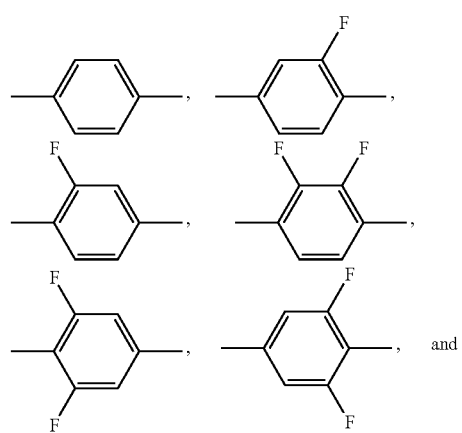

and

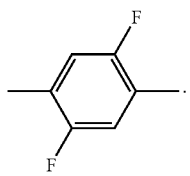

The five- and six-membered rings also include saturated and partially saturated rings, as well as heterocyclic rings.

For the purposes of the present application, condensed ring systems which consist of two of these rings, i.e. two five-membered rings, one five-membered ring or two six-membered rings, such as, for example,

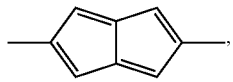

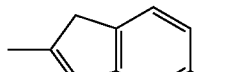 and

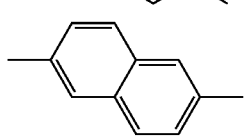

are counted as one of these five- or six-membered rings on assignment of the compounds to components A or D.

Correspondingly, condensed ring systems which consist of a combination of three or more of these rings which are incorporated into the molecule in the longitudinal direction, such as, for example,

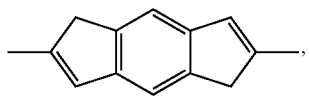

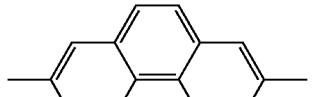

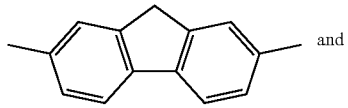 and

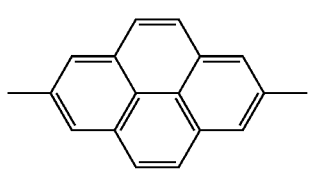

are counted as two of these five- or six-membered rings.

By contrast, condensed ring systems which are incorporated into the molecule in the transverse direction, such as, for example,

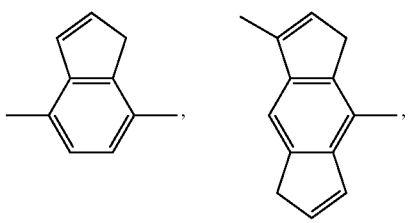

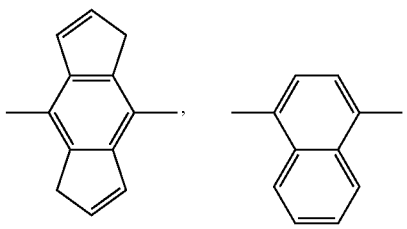

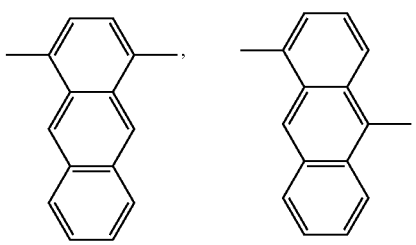

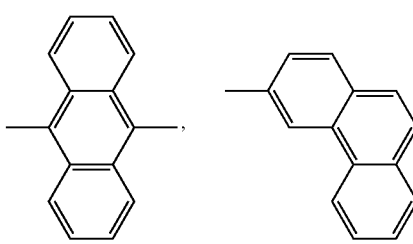

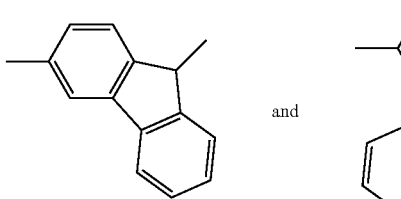 and are counted as one of these five- or six-membered rings.

The present invention likewise relates to the directly preceding liquid-crystalline media and to those described below, and to the use thereof in electro-optical displays and in particular in components for high-frequency technology.

In a preferred embodiment of the present invention, the liquid-crystal medium comprises one or more compounds of the formula IA, preferably selected from the group of the compounds of the formulae IA-1 and IA-2, preferably of the formula IA-1:

IA-1

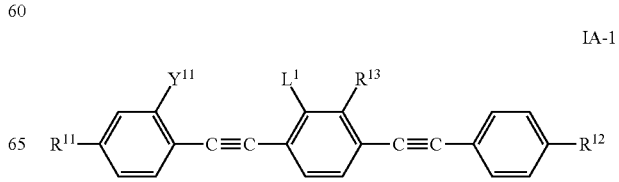

IA-2
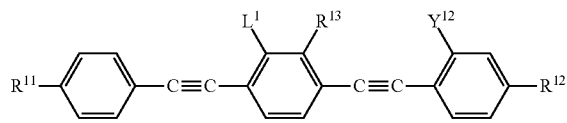

in which the parameters have the meanings given above for formula IA, and preferably $R^{13}$ denotes H, alkyl having 1 to 6 C atoms, alkenyl having 2 to 6 C atoms, cycloalkyl having 3 to 6 C atoms or cycloalkenyl having 4 to 6 C atoms, preferably $CH_3$, $C_2H_5$, n-$C_3H_7$ (—$(CH_2)_2CH_3$), i-$C_3H_7$ (—$CH(CH_3)_2$), —CH=$CH_2$, cyclopropyl, cyclobutyl, cyclopentyl, cyclohexyl, cyclopent-1-enyl or cyclohex-1-enyl, and particularly preferably $CH_3$, $C_2H_5$, cyclopropyl or cyclobutyl, $L^1$ denotes H, alkyl having 1 to 3 C atoms or halogen, preferably H, F or Cl, and particularly preferably H, F or $CH_3$, even more preferably H or F and very particularly preferably F, and the other parameters have the respective meanings indicated above in the case of formula IA and preferably $R^{11}$ denotes unfluorinated alkyl having 1 to 7 C atoms, and $R^{12}$ denotes unfluorinated alkyl having 1 to 7 C atoms or unfluorinated alkoxy having 1 to 7 C atoms.

In a preferred embodiment of the present invention, component A consists predominantly, even more preferably consists essentially and very particularly preferably consists completely of compounds of the formula IA.

In a particularly preferred embodiment of the present invention, the liquid-crystal medium comprises one or more compounds of the formula IA-1, preferably selected from the group of the compounds of the formulae IA-1a to IA-1c and IA-2a to IA-2c, particularly preferably selected from the group of the compounds of the formulae IA-1a to IA-1c, very particularly preferably of the formula IA-1c, IA-1a
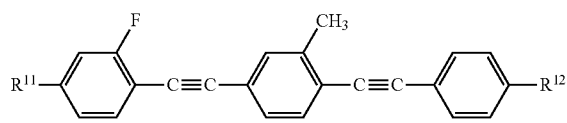

IA-1b
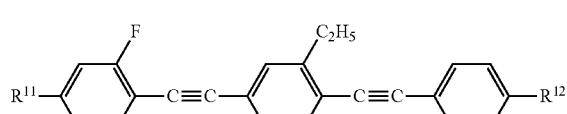

IA-1c

IA-2a
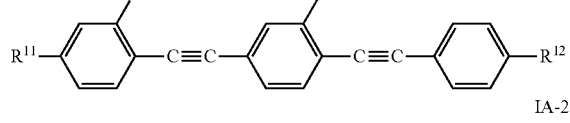

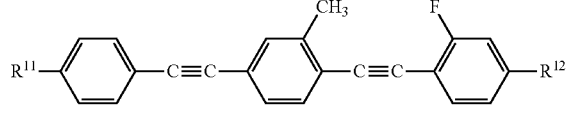

IA-2b
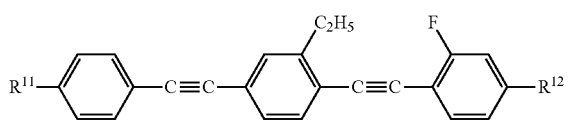

IA-2c
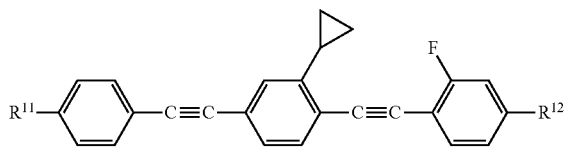

in which the parameters have the meanings given above under formula IA-1 or under formula IA-2, and preferably $R^{11}$ and $R^{12}$, independently of one another, denote an alkyl radical having 2 to 7 C atoms, for example a propyl radical and a hexyl radical or in each case a propyl, butyl, pentyl or hexyl radical.

The liquid-crystal medium in component A optionally comprises one or more compounds of the formula IB, IB
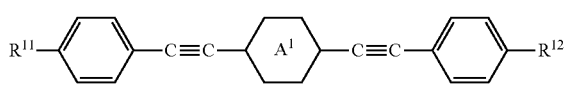

in which

denotes

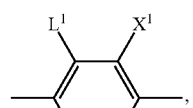

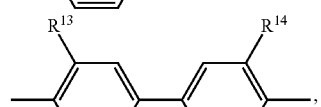

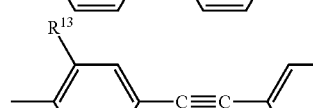

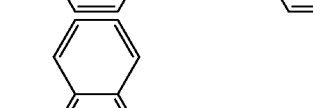 or

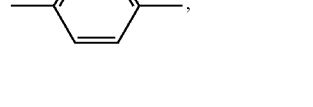

preferably
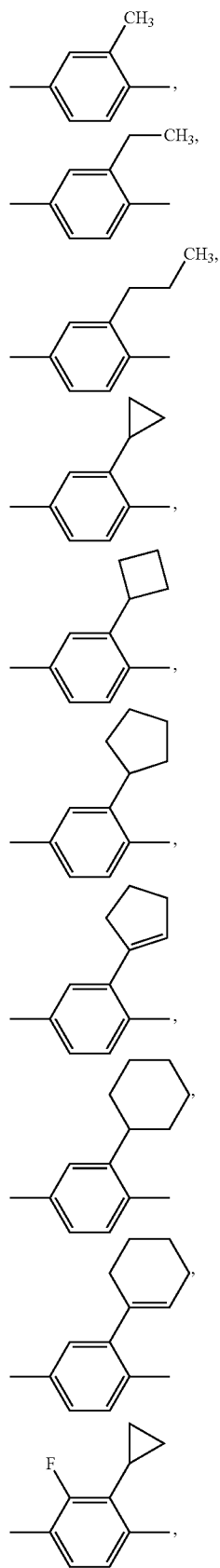
-continued
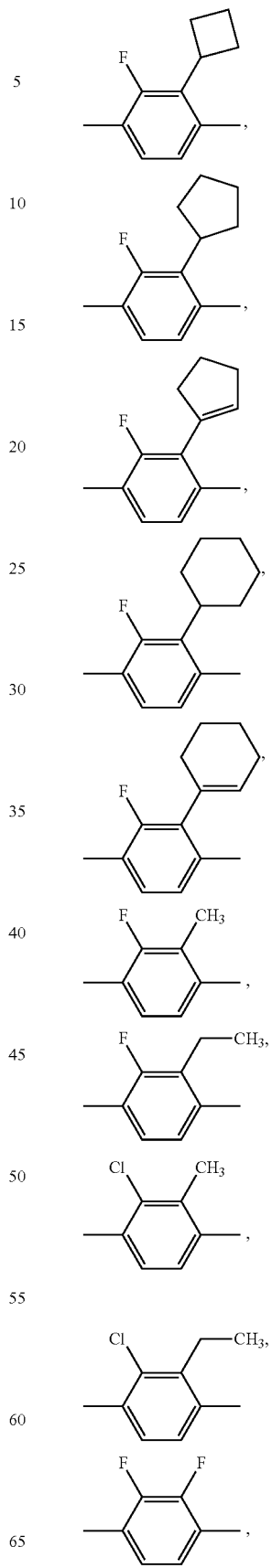

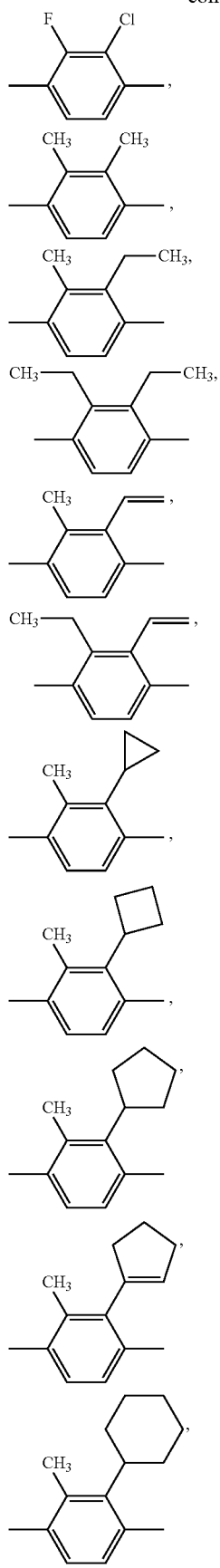
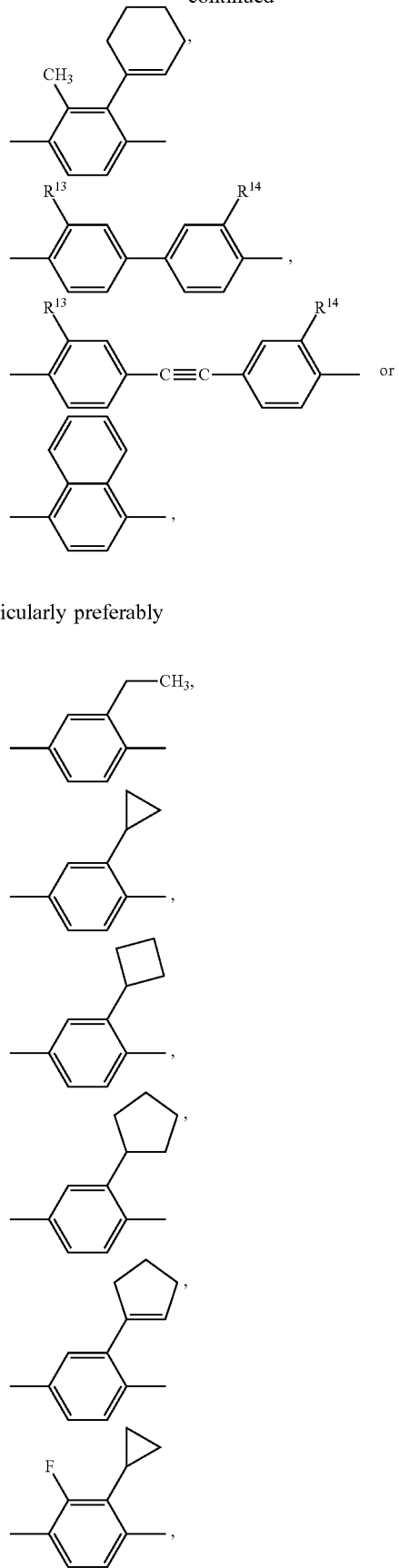
particularly preferably

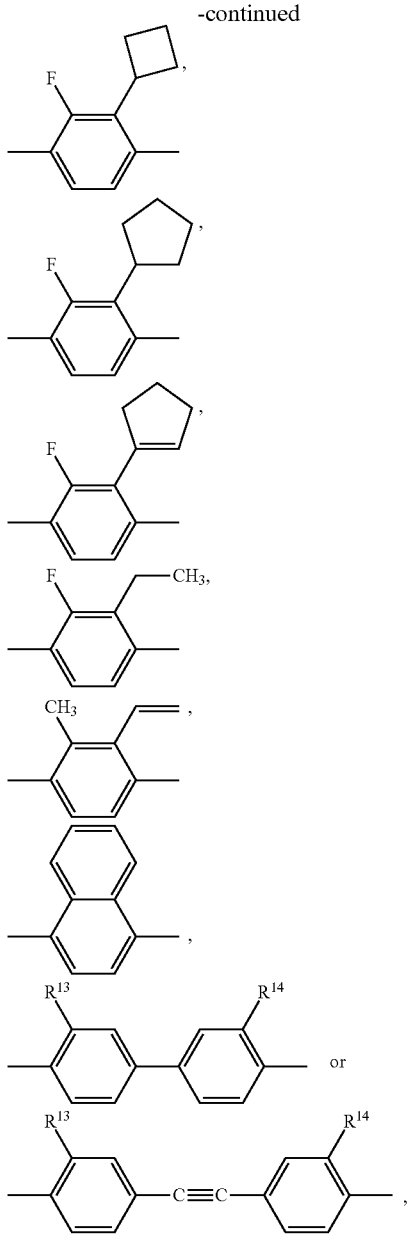

L¹ denotes alkyl having 1 to 6 C atoms, cycloalkyl having 3 to 6 C atoms or cycloalkenyl having 4 to 6 C atoms, preferably $CH_3$, $C_2H_5$, n-$C_3H_7$ (—$(CH_2)_2CH_3$), i-$C_3H_7$ (—$CH(CH_3)_2$), cyclopropyl, cyclobutyl, cyclopentyl, cyclohexyl, cyclopent-1-enyl or cyclohex-1-enyl, and particularly preferably $CH_3$, $C_2H_5$, cyclopropyl or cyclobutyl, $X^1$ denotes H, alkyl having 1 to 3 C atoms or halogen, preferably H, F or Cl, particularly preferably H or F and very particularly preferably F, $R^{11}$ to $R^{14}$, independently of one another, denote unfluorinated alkyl or unfluorinated alkoxy, each having 1 to 15 C atoms, unfluorinated alkenyl, unfluorinated alkenyloxy or unfluorinated alkoxyalkyl, each having 2 to 15 C atoms, or cycloalkyl, alkylcycloalkyl, cycloalkenyl, alkylcycloalkenyl, alkylcycloalkylalkyl or alkylcycloalkenylalkyl, each having up to 15 C atoms, and alternatively one of $R^{13}$ and $R^{14}$ or both also denote H, preferably $R^{11}$ and $R^{12}$, independently of one another, denote unfluorinated alkyl or unfluorinated alkoxy, each having 1 to 7 C atoms, or unfluorinated alkenyl, unfluorinated alkenyloxy or unfluorinated alkoxyalkyl, each having 2 to 7 C atoms, particularly preferably $R^{11}$ denotes unfluorinated alkyl having 1 to 7 C atoms or unfluorinated alkenyl, unfluorinated alkenyloxy or unfluorinated alkoxyalkyl, each having 2 to 7 C atoms, and particularly preferably $R^{12}$ denotes unfluorinated alkyl or unfluorinated alkoxy, each having 1 to 7 C atoms, and preferably $R^{13}$ and $R^{14}$ denote H, unfluorinated alkyl having 1 to 5 C atoms, unfluorinated cycloalkyl or cycloalkenyl having 3 to 7 C atoms, unfluorinated alkylcyclohexyl or unfluorinated cyclohexylalkyl, each having 4 to 12 C atoms, or unfluorinated alkylcyclohexylalkyl having 5 to 15 C atoms, particularly preferably cyclopropyl, cyclobutyl, cyclopentyl or cyclohexyl, and very particularly preferably at least one of $R^{13}$ and $R^{14}$ denotes n-alkyl, particularly preferably methyl, ethyl or n-propyl, and the other denotes H or n-alkyl, particularly preferably H, methyl, ethyl or n-propyl.

In a particularly preferred embodiment of the present invention, component A comprises one or more compounds of the formula IA and one or more compounds of the formula IB, preferably component A consists predominantly, even more preferably consists essentially and very particularly preferably consists completely of compounds of the formulae IA and IB.

The compounds of the formula IB are preferably compounds selected from the group of the compounds of the formulae IB-1 to IB-4

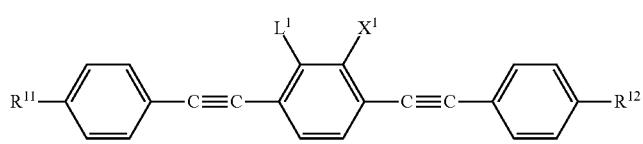

IB-1

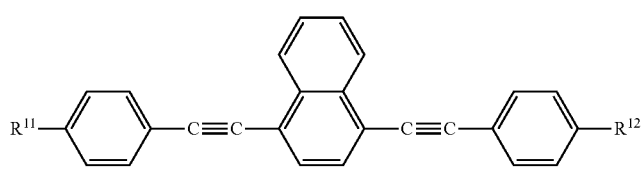

IB-2

-continued

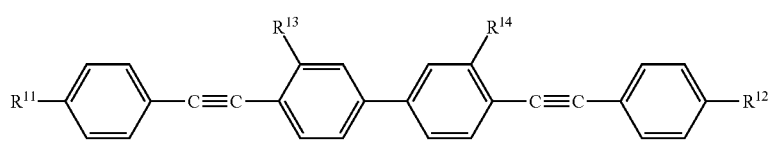
IB-3

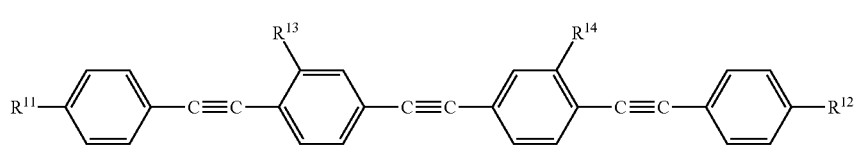
IB-4 in which $L^1$ denotes alkyl having 1 to 6 C atoms, alkenyl having 2 to 6 C atoms, cycloalkyl having 3 to 6 C atoms or cycloalkenyl having 4 to 6 C atoms, preferably CH$_3$, C$_2$H$_5$, n-C$_3$H$_7$ (—(CH$_2$)$_2$CH$_3$), i-C$_3$H$_7$ (—CH(CH$_3$)$_2$), —CH=CH$_2$, cyclopropyl, cyclobutyl, cyclopentyl, cyclohexyl, cyclopent-1-enyl or cyclohex-1-enyl, and particularly preferably CH$_3$, C$_2$H$_5$, cyclopropyl or cyclobutyl, $X^1$ denotes H, alkyl having 1 to 3 C atoms or halogen, preferably H, F or Cl, particularly preferably H, F or CH$_3$, even more preferably H or F and very particularly preferably F, and the other parameters have the respective meanings indicated above formula IB, and preferably $R^{11}$ denotes unfluorinated alkyl having 1 to 7 C atoms, and $R^{12}$ denotes unfluorinated alkyl having 1 to 7 C atoms or unfluorinated alkoxy having 1 to 7 C atoms.

In a particularly preferred embodiment of the present invention, the liquid-crystal medium comprises one or more compounds of the formula IB-1, preferably selected from the group of the compounds of the formulae IB-1a-1 to IB-1a-12 and IB-1b-1 to IB-1b-12

IB-1a-1
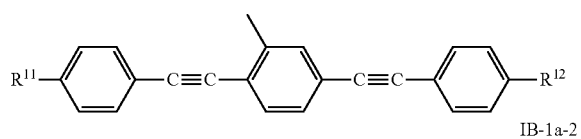

IB-1a-2
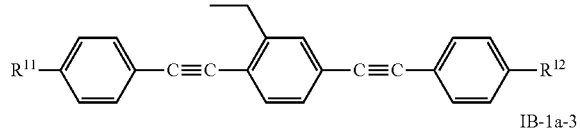

IB-1a-3
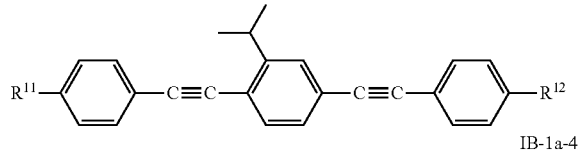

IB-1a-4
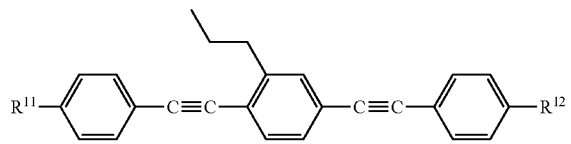

-continued

IB-1a-5
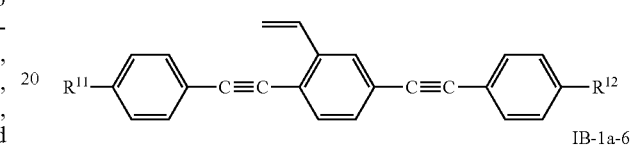

IB-1a-6
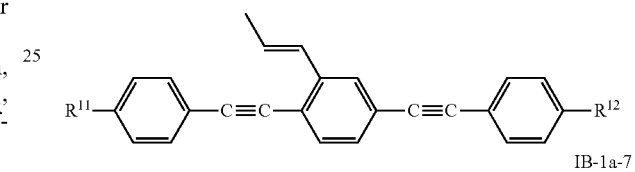

IB-1a-7
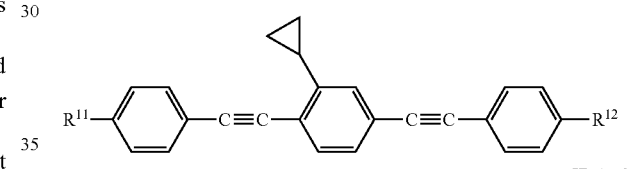

IB-1a-8
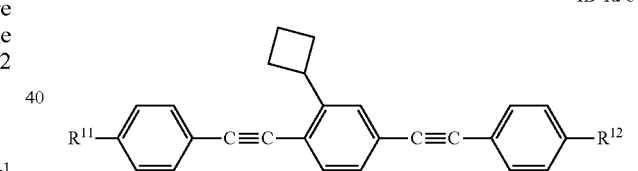

IB-1a-9
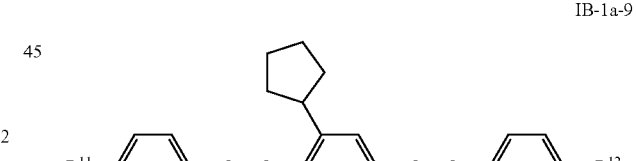

IB-1a-10
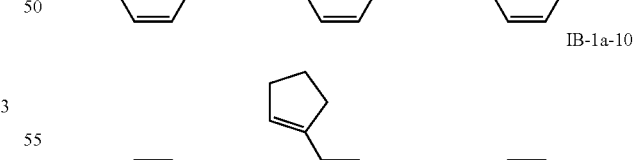

IB-1a-11
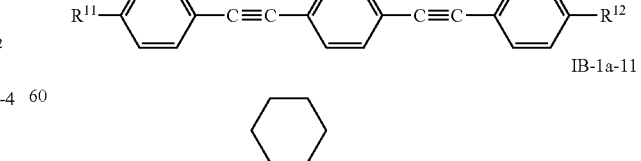

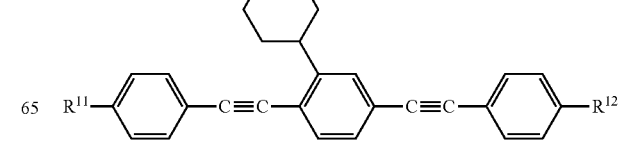

-continued

IB-1a-12
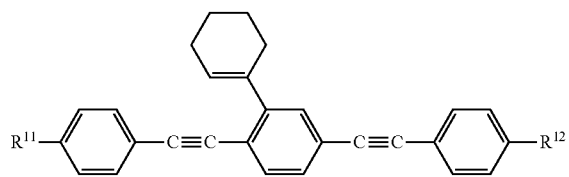

IB-1b-1
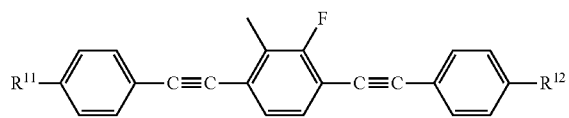

IB-1b-2
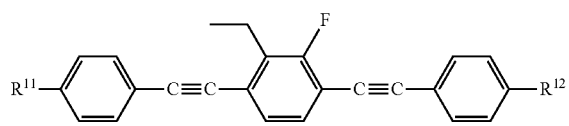

IB-1b-3
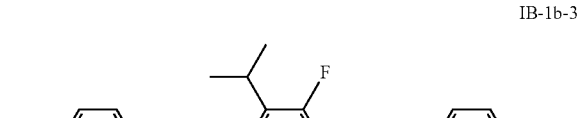

IB-1b-4
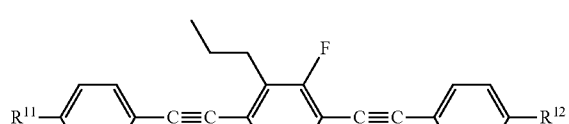

IB-1b-5
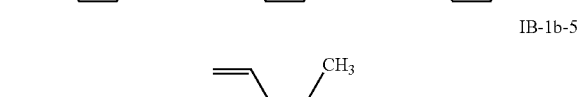

IB-1b-6
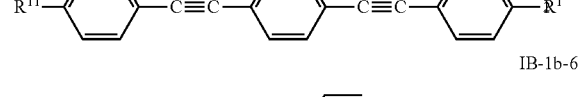

IB-1b-7
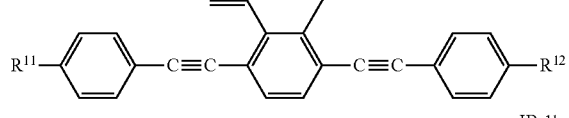

IB-1b-8
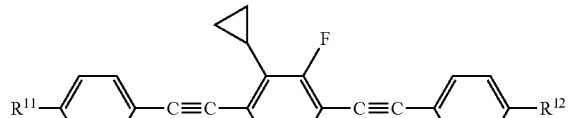

-continued

IB-1b-9
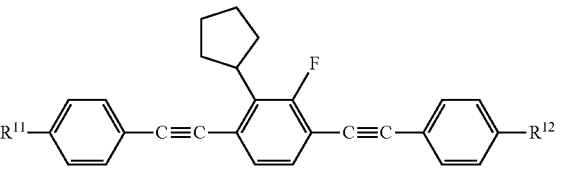

IB-1b-10
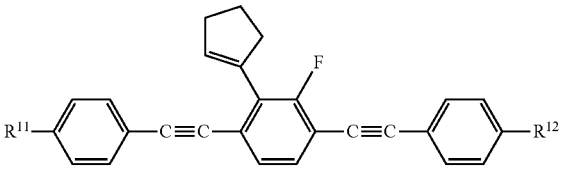

IB-1b-11
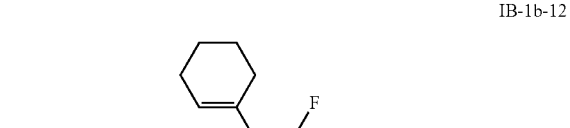

IB-1b-12
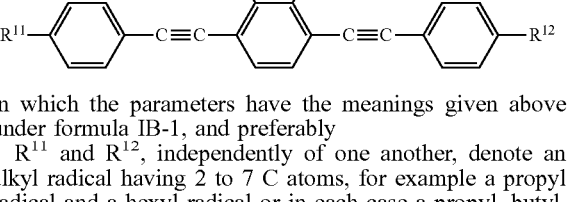

in which the parameters have the meanings given above under formula IB-1, and preferably $R^{11}$ and $R^{12}$, independently of one another, denote an alkyl radical having 2 to 7 C atoms, for example a propyl radical and a hexyl radical or in each case a propyl, butyl, pentyl or hexyl radical.

In a very particularly preferred embodiment of the present invention, the liquid-crystal medium, or component A of the liquid-crystal medium, comprises one or more compounds of the formula IB, preferably selected from the group of the compounds of the formulae IB-1a-2, IB-1a-5, IB-1a-7, IB-1a-8, IB-1a-9, IB-1a-10, IB-1b-5, IB-1b-7, IB-1b-8, IB-1b-9, IB-1b-10, where the parameters have the meanings given above, and particularly preferably $R^{11}$ and $R^{12}$, independently of one another, denote unfluorinated alkyl having 1 to 7 C atoms or unfluorinated alkoxy having 1 to 6 C atoms, especially preferably one of $R^{11}$ and $R^{12}$ denotes alkyl and the other denotes alkyl or alkoxy, and very particularly preferably $R^{11}$ and $R^{12}$ have different meanings from one another.

In a preferred embodiment of the present invention, the liquid-crystal medium, or component A of the liquid-crystal medium, comprises one or more compounds of the formula IB-2, in which preferably $R^{11}$ and $R^{12}$, independently of one another, denote an alkyl radical having 2 to 7 C atoms, for example a propyl radical and a hexyl radical or in each case a propyl, butyl, pentyl or hexyl radical.

In a preferred embodiment of the present invention, the liquid-crystal medium, or component A of the liquid-crystal medium, comprises one or more compounds of the formula IB-3, preferably selected from the group of the compounds of the formulae IB-3a-1 to IB-3a-3 and IB-3b-1 to IB-3b-3, preferably IB-3a-2, IB-3b-2,

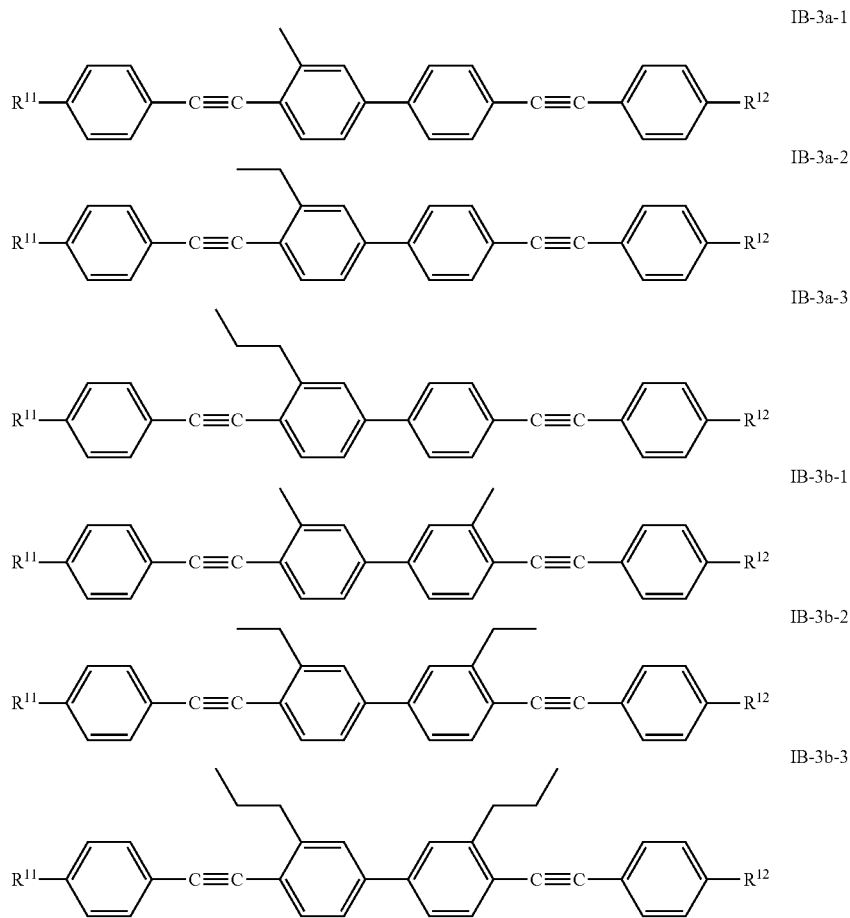

in which the parameters have the meanings given above under formula IB-3, and preferably $R^{11}$ and $R^{12}$, independently of one another, denote an alkyl radical having 2 to 7 C atoms, for example a propyl radical and a hexyl radical or in each case a propyl, butyl, pentyl or hexyl radical.

In a preferred embodiment of the present invention, the liquid-crystal medium, or component A of the liquid-crystal medium, comprises one or more compounds of the formula IB-4, preferably selected from the group of the compounds of the formulae IB-4a-1 to IB-4a-3 and IB-4-b-1 to IB-4-b-3, preferably IB-4-b-2,

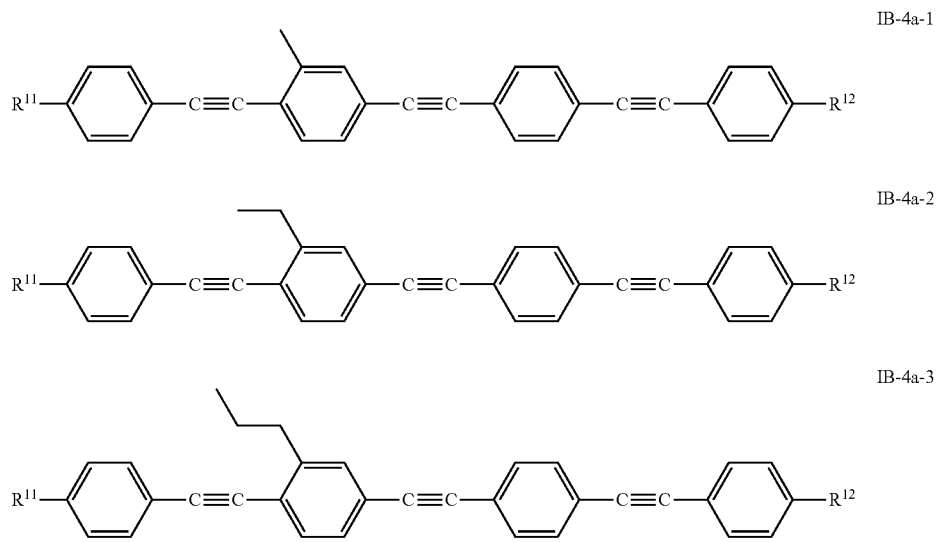

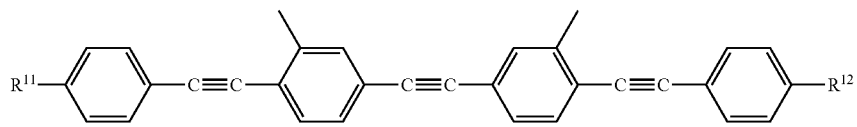
IB-4b-1

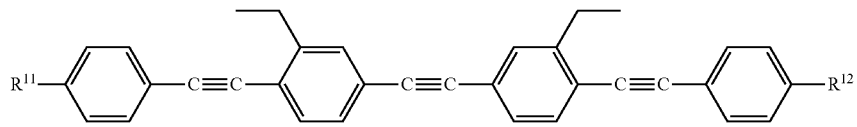
IB-4b-2

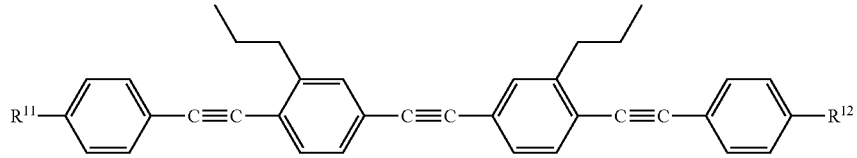
IB-4b-3 in which the parameters have the meanings given above under formula IB-4, and preferably $R^{11}$ and $R^{12}$, independently of one another, denote an alkyl radical having 2 to 7 C atoms, for example a propyl radical and a hexyl radical or in each case a propyl, butyl, pentyl or hexyl radical.

The compounds of the formula IA can advantageously be prepared as evident from the following illustrative syntheses (Schemes 1 and 2):

Scheme 1: Illustrative synthesis of the compounds of the formula IA-1.

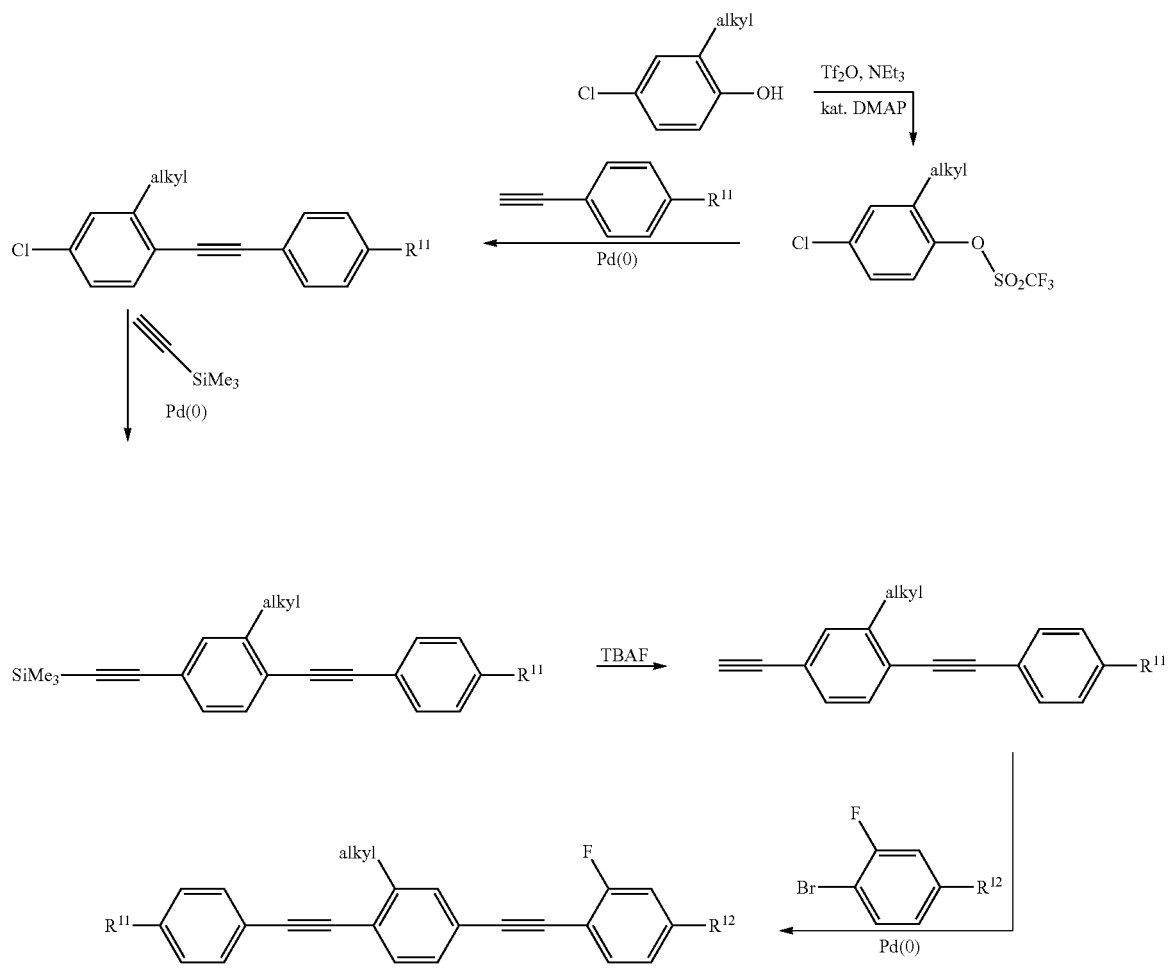

Scheme 2: Illustrative synthesis of the compounds of the formula IA-2 (for example IA-2a).
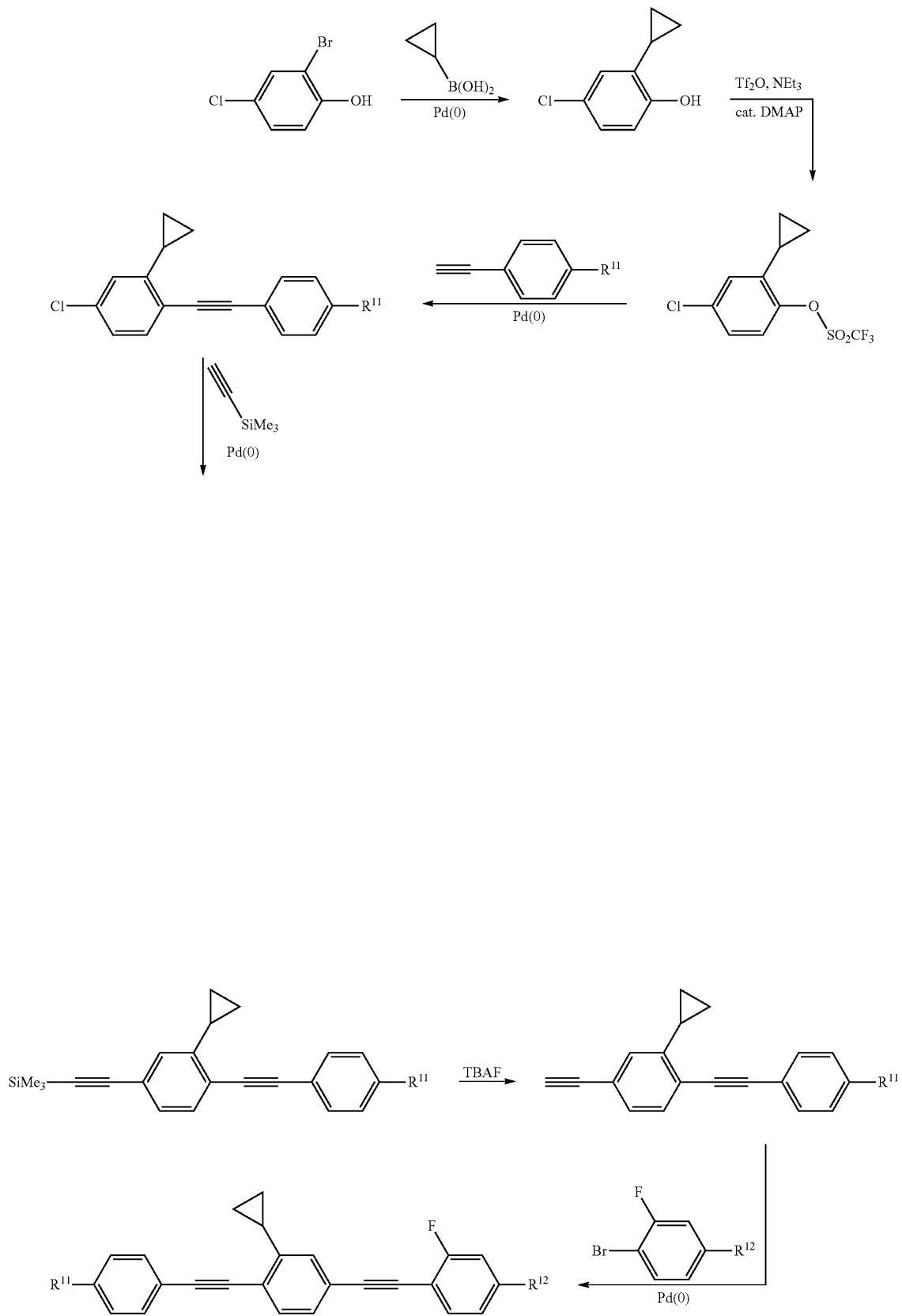

The compounds of the formula IB-1a can advantageously be prepared as evident from the following illustrative synthesis (Schemes 3-6):

Scheme 3: Illustrative synthesis of the compounds of the formula IB-1 (for example IB-1a-7 to IB-1a-12) containing symmetrical end groups, where cycloalkyl also means cycloalkenyl.

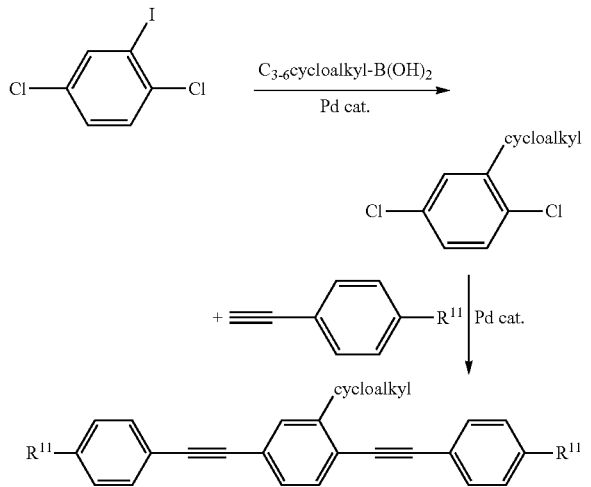

Scheme 4: Illustrative synthesis of the compounds of the formula IB-1 (for example IB-1a-7, IB-1a-8, IB-1a-9 and IB-1a-11) containing symmetrical end groups.

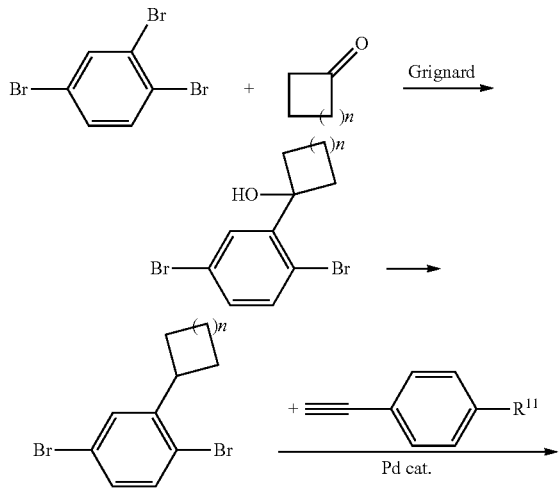

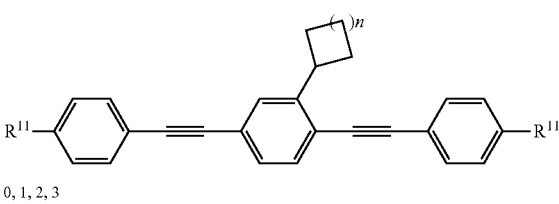

n: 0, 1, 2, 3

Scheme 5. Illustrative synthesis of the compounds of the formula IB-1 (for example IB-1a-7 to IB-1a-12) containing asymmetrical end groups, where cycloalkyl also means cycloalkenyl.

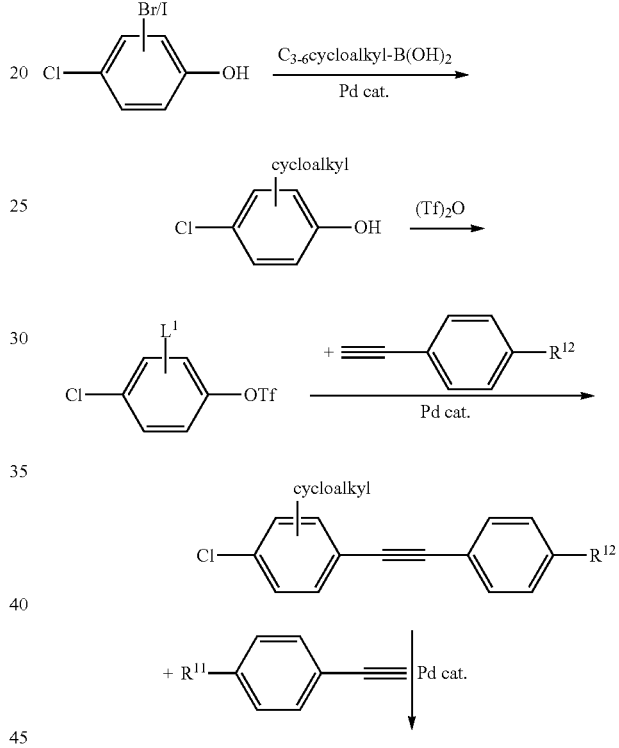

Scheme 6: Illustrative synthesis of the compounds of the formula IB-1 (for example IB-1a-7 to IB-1a-12) containing asymmetrical end groups, where cycloalkyl also means cycloalkenyl.

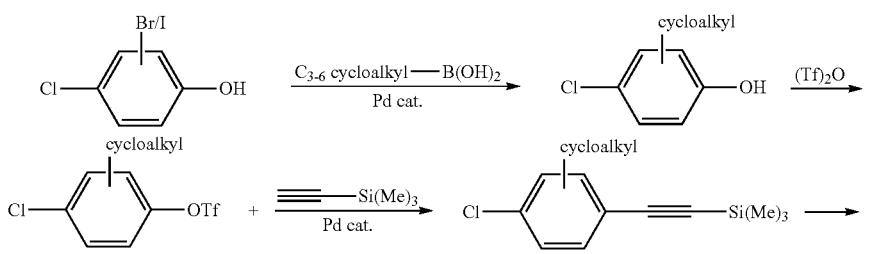

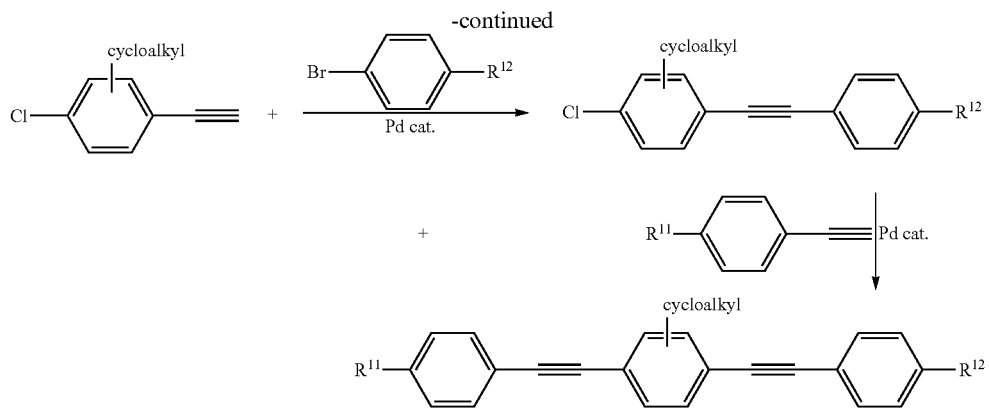

The compounds of the formula IB-1b can advantageously be obtained in accordance with the following general reaction schemes (Reaction Schemes 5 to 11). The parameters $L^1$, $R^{11}$, $R^{12}$ and $X^1$ therein are as defined above and below. R has the meaning of $R^{11}$ or $R^{12}$.

Scheme 7: Illustrative synthesis of the compounds of the formula IB with asymmetrical substitution, where R has the meaning of $R^{11}$.

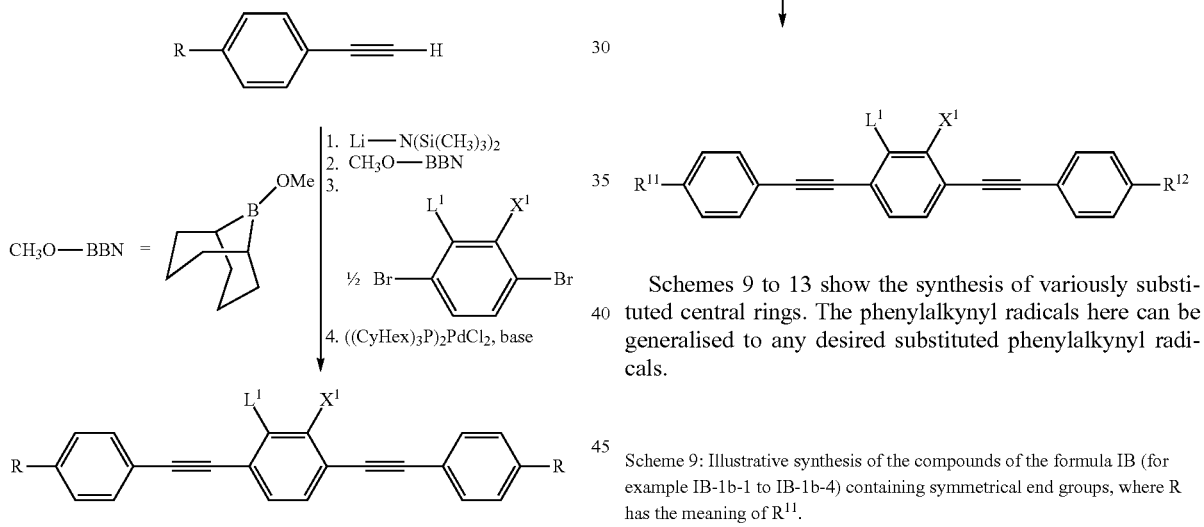

Scheme 8: Illustrative synthesis of the compounds of the formula IB with asymmetrical substitution

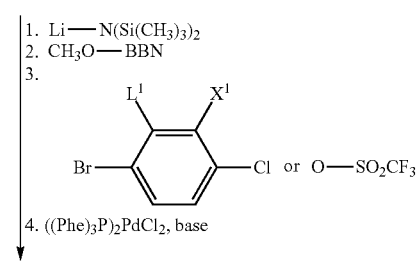

Schemes 9 to 13 show the synthesis of variously substituted central rings. The phenylalkynyl radicals here can be generalised to any desired substituted phenylalkynyl radicals.

Scheme 9: Illustrative synthesis of the compounds of the formula IB (for example IB-1b-1 to IB-1b-4) containing symmetrical end groups, where R has the meaning of $R^{11}$.

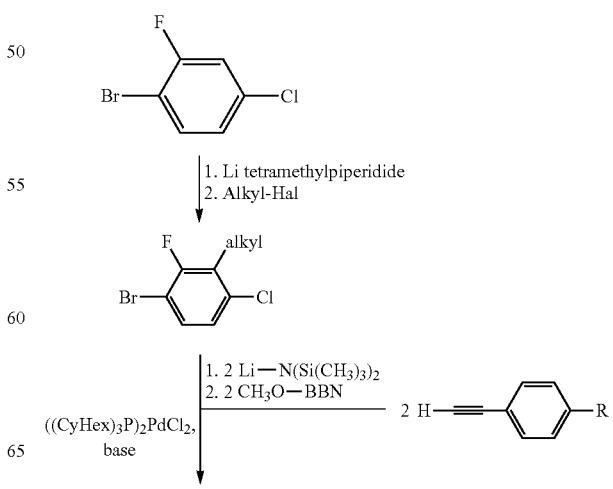

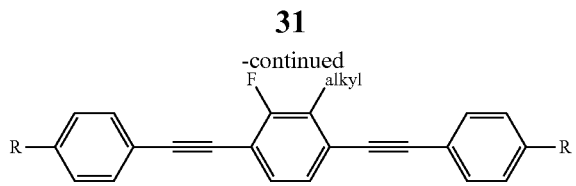

Scheme 10: Illustrative synthesis of the compounds of the formula IB-1b-8 containing symmetrical end groups, where R has the meaning of R[11].

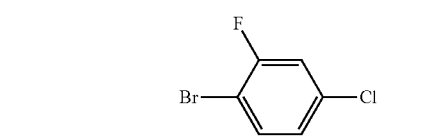

1. LDA
2. 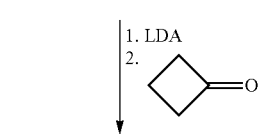

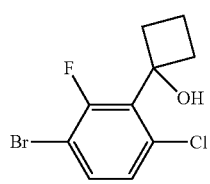

NaBH$_4$CN
BF$_3$ Eth.

H—≡—⟨⟩—R

Pd-cat.
CuI
base

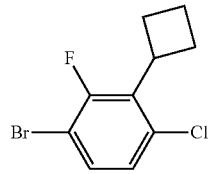

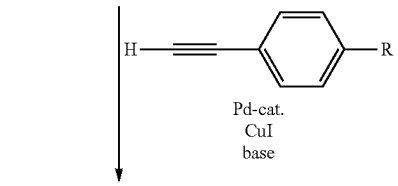

Scheme 11: Illustrative synthesis of the compounds of the formula IB-1 where X$^1$ = Cl, L$^1$ = CH$_3$ and containing symmetrical end groups, where R has the meaning of R[11].

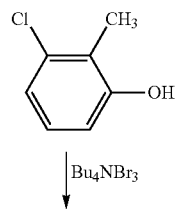

Bu$_4$NBr$_3$

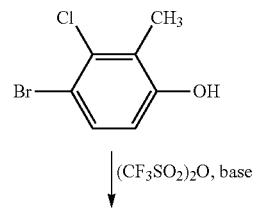

(CF$_3$SO$_2$)$_2$O, base

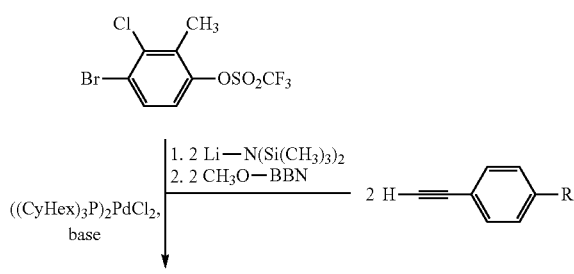

1. 2 Li—N(Si(CH$_3$)$_3$)$_2$
2. 2 CH$_3$O—BBN ((CyHex)$_3$P)$_2$PdCl$_2$, base

2 H—≡—⟨⟩—R

Scheme 12: Illustrative synthesis of the compounds of the formula IB where X$^1$ = L$^1$ = CH$_3$ and containing symmetrical end groups, where R has the meaning of R[11].

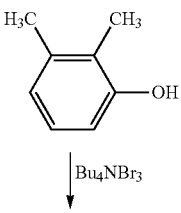

Bu$_4$NBr$_3$

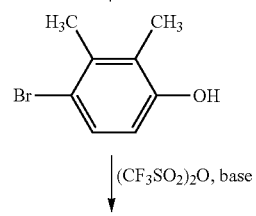

(CF$_3$SO$_2$)$_2$O, base

-continued

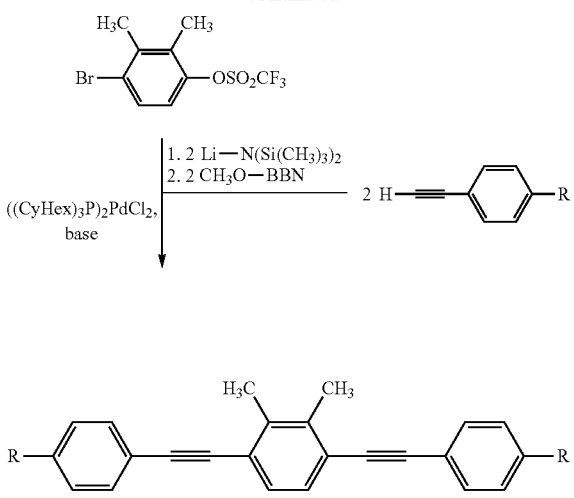

Scheme 13: Illustrative synthesis of the compounds of the formula IB where $X^1 = L^1$ = alkyl and containing symmetrical end groups, where R has the meaning of $R^{11}$ and where the two alkyl groups "alkyl" may be identical to or different from one another and in addition one or both may be an alkenyl group.

The compounds of the formula IB-2 can advantageously be prepared as evident from the following illustrative synthesis (Scheme 14):

Scheme 14: Illustrative synthesis of the compounds of the formula IB-2 containing asymmetrical end groups, where R is defined corresponding to $R^{11}$ and R' is defined corresponding to $R^{12}$.

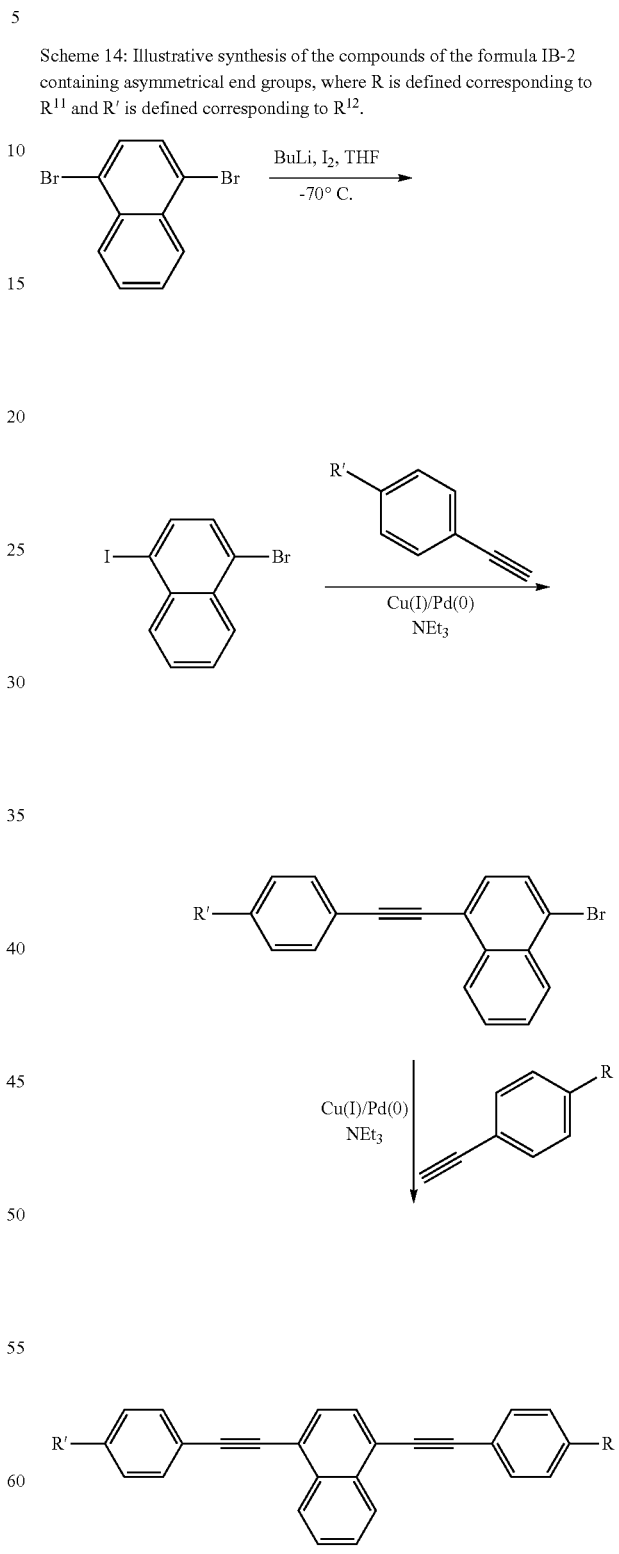

The compounds of the formulae IB-3 and IB-4 can advantageously be obtained in accordance with the following general reaction scheme (Reaction Scheme 15).

Scheme 15: Illustrative synthesis of the compounds of the formulae IB-3 and IB-4 containing symmetrical end groups, in which R has the meaning of $R^{11}$ or $R^{12}$.

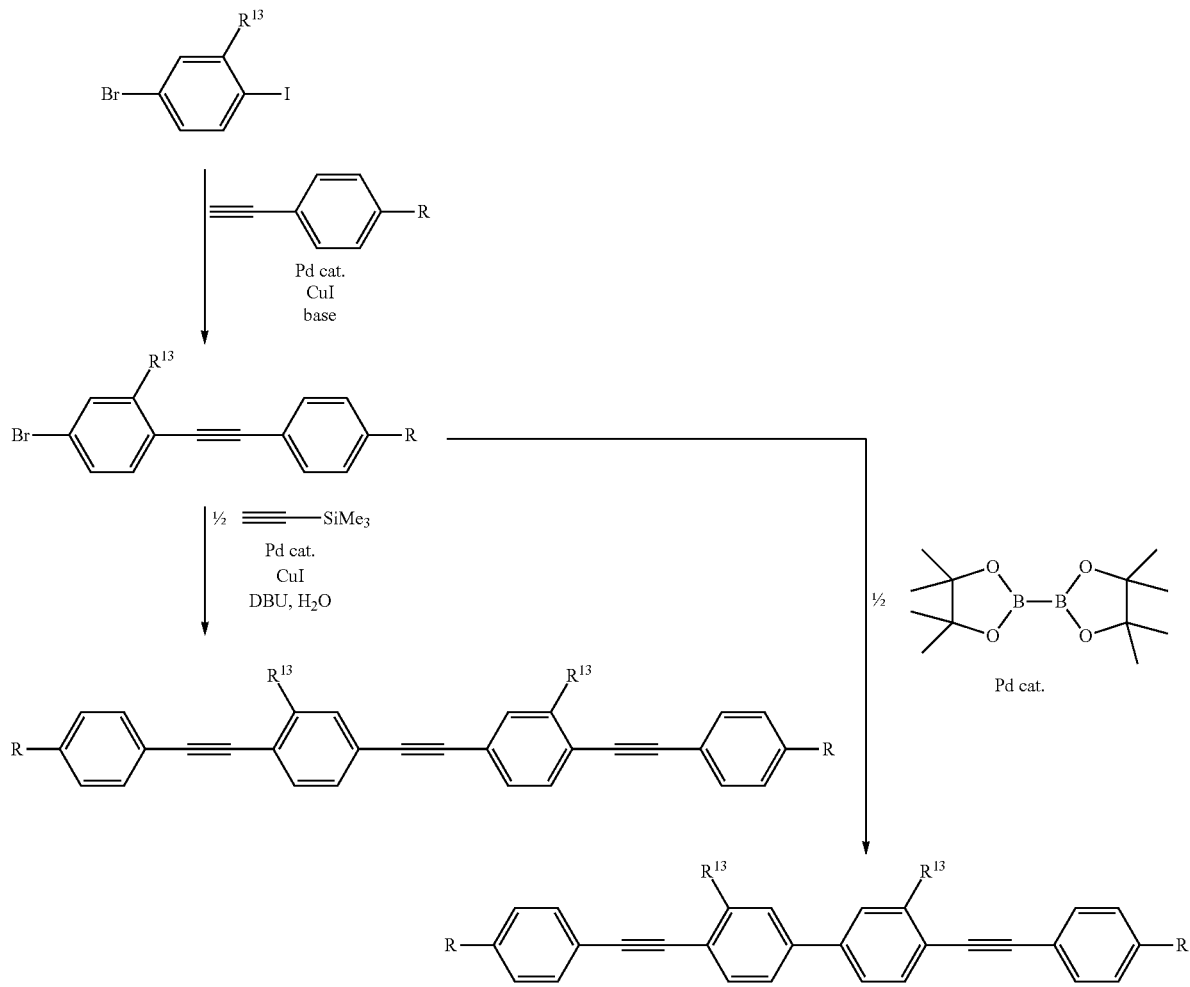

Besides component A, these media according to the invention preferably comprise a component selected from the two components B and C and optionally additionally component D and/or component E.

These media according to the invention preferably comprise two, three or four, particularly preferably two or three, components selected from the group of components A to E. These media preferably comprise
  component A and component B, or
  component A, component B and component D and/or E, or
  component A and component C, or
  component A, component B and component C, or
  component A, component C and component D and/or E.

These media according to the invention preferably comprise a component B and no component C or vice versa.

The strongly dielectrically positive component, component B, preferably has a dielectric anisotropy of 20.0 or more, more preferably 25.0 or more, particularly preferably 30.0 or more and very particularly preferably 40.0 or more.

The strongly dielectrically negative component, component C, preferably has a dielectric anisotropy of −7.0 or less, more preferably −8.0 or less, particularly preferably −10.0 or less and very particularly preferably −15.0 or less.

In a preferred embodiment of the present invention, component B comprises one or more compounds selected from the group of the compounds of the formulae IIA and IIB:

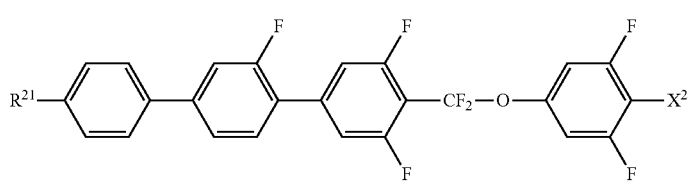

IIA

IIB

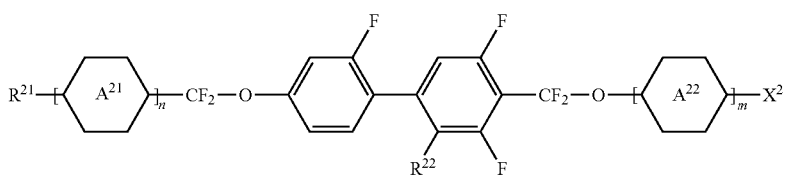

$R^{21}$ denotes unfluorinated alkyl or unfluorinated alkoxy, each having 1 to 15 C atoms, or unfluorinated alkenyl, unfluorinated alkenyloxy or unfluorinated alkoxyalkyl, each having 2 to 15 C atoms, preferably alkyl, particularly preferably n-alkyl, $R^{22}$ denotes H, unfluorinated alkyl or unfluorinated alkoxy, each having 1 to 5, preferably 1 to 3, particularly preferably 3, C atoms,

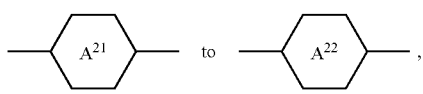

independently of one another and, if they occur more than once, these also in each case independently of one another, denote

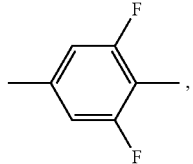

preferably

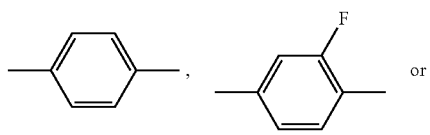

n and m, independently of one another, denote 1 or 2, preferably (n+m) denotes 3 or 4, and particularly preferably n denotes 2, $X^2$ denotes F, Cl, —$CF_3$ or —$OCF_3$, preferably F or Cl, particularly preferably F, $Y^2$ denotes F, Cl, —$CF_3$, —$OCF_3$ or CN, preferably CN, and $Z^2$ denotes H or F.

Preferred compounds of the formula IIA are the compounds of the corresponding sub-formula IIA-1

IIA-1

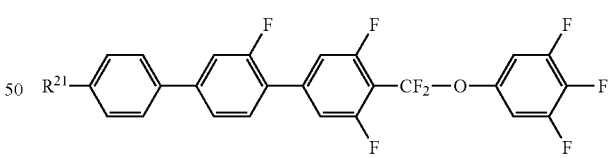

in which $R^{21}$ has the meaning given above.

Preferred compounds of the formula IIB are the compounds of the corresponding sub-formulae IIB-1 and IIB-2:

IIB-1

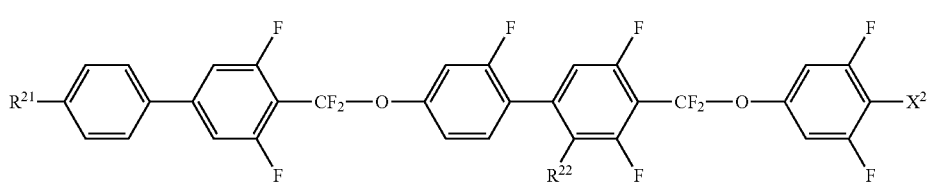

-continued

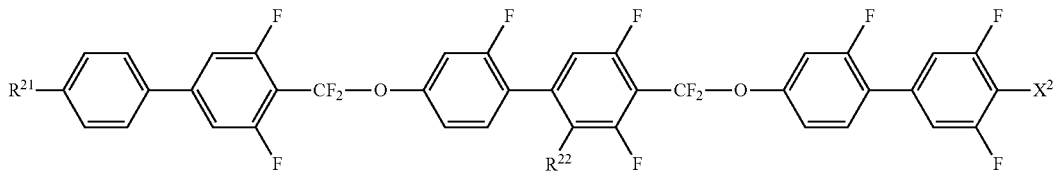
IIB-2 in which $R^{21}$, $R^{22}$ and $X^2$ have the respective meanings given above.

In a preferred embodiment of the present invention, component C comprises one or more compounds selected from the group of the compounds of the formulae IIIA and IIIB:

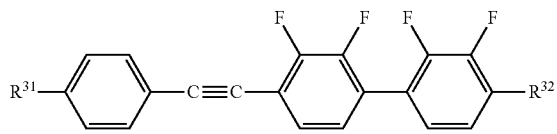
IIIA

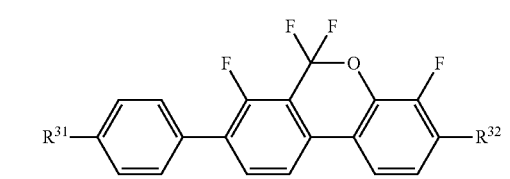
IIIB in which $R^{31}$ and $R^{32}$, independently of one another, have the meanings indicated above for $R^{21}$ under formula IIA, and preferably $R^{31}$ denotes $C_nH_{2n+1}$ or $CH_2=CH—(CH_2)_Z$ and $R^{32}$ denotes $C_mH_{2m+1}$ or $O—C_mH_{2m+1}$ or $(CH_2)_Z—CH=CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{31}$ and $R^{32}$) here are, in particular, ($C_nH_{2n+1}$ and $C_mH_{2m+1}$) and ($C_nH_{2n+1}$ and $O—C_mH_{2m+1}$).

Preferred compounds of the formula IIIB are the compounds of the sub-formulae IIIB-1 and IIIB-2:

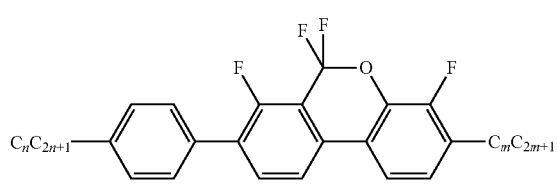
IIIB-1

-continued

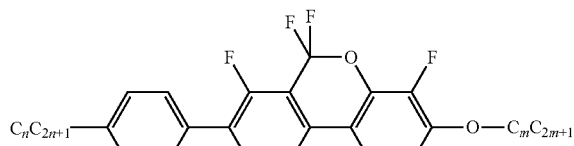
IIIB-2 in which n and m each have the meanings given above for formula IIIB and preferably, independently of one another, denote an integer in the range from 1 to 7.

In a preferred embodiment of the present invention, component D comprises one or more compounds of the following formula IV:

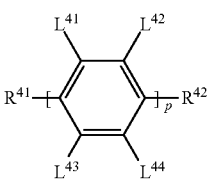
IV in which $R^{41}$ and $R^{42}$, independently of one another, have one of the meanings indicated above for $R^{11}$ under formula I, $L^{41}$ to $L^{44}$ on each appearance, in each case independently of one another, denote H, alkyl having 1 to 5 C atoms, F or Cl, and p denotes an integer in the range from 7 to 14, preferably from 8 to 12 and particularly preferably from 9 to 10, and preferably at least two of the substituents $L^{41}$ to $L^{44}$ present have a meaning other than H, and $R^{41}$ denotes $C_nH_{2n+1}$ or $CH_2=CH—(CH_2)_Z$, and $R^{42}$ denotes $C_mH_{2m+1}$ or $O—C_mH_{2m+1}$ or $(CH_2)_Z—CH=CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

In a preferred embodiment of the present application, the liquid-crystal medium additionally comprises a further component, component E, which preferably consists of one or more compounds selected from the group of the compounds of the formulae V to IX:

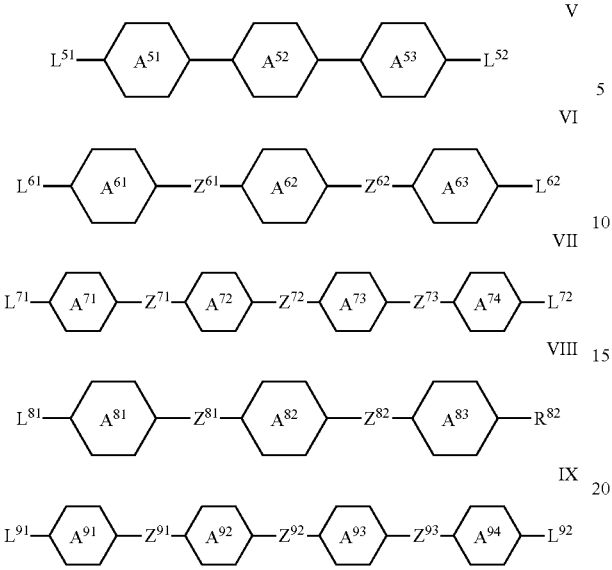

V

VI

VII

VIII

IX in which
L$^{51}$ denotes R$^{51}$ or X$^{51}$,
L$^{52}$ denotes R$^{52}$ or X$^{52}$,
R$^{51}$ and R$^{52}$, independently of one another, denote H, unfluorinated alkyl or unfluorinated alkoxy having 1 to 17, preferably 3 to 10, C atoms or unfluorinated alkenyl, unfluorinated alkenyloxy or unfluorinated alkoxyalkyl having 2 to 15, preferably 3 to 10, C atoms, preferably alkyl or unfluorinated alkenyl,
X$^{51}$ and X$^{52}$, independently of one another, denote H, F, Cl, —CN, —NCS, —SF$_5$, fluorinated alkyl or fluorinated alkoxy having 1 to 7 C atoms or fluorinated alkenyl, unfluorinated or fluorinated alkenyloxy or unfluorinated or fluorinated alkoxyalkyl having 2 to 7 C atoms, preferably fluorinated alkoxy, fluorinated alkenyloxy, F or Cl, and

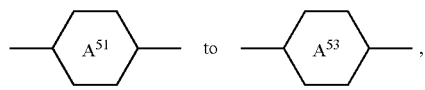

independently of one another, denote

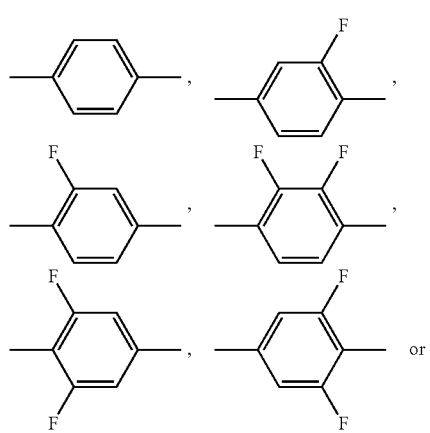

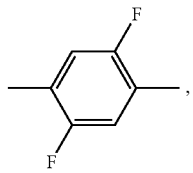

preferably

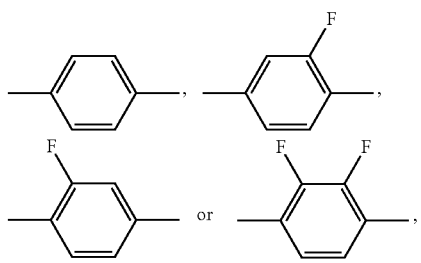

L$^{61}$ denotes R$^{61}$ and, in the case where Z$^{61}$ and/or Z$^{62}$ denote trans-CH═CH— or trans-CF═CF—, alternatively also denotes X$^{61}$,
L$^{62}$ denotes R$^{62}$ and, in the case where Z$^{61}$ and/or Z$^{62}$ denote trans-CH═CH— or trans-CF═CF—, alternatively also denotes X$^{62}$,
R$^{61}$ and R$^{62}$, independently of one another, denote H, unfluorinated alkyl or unfluorinated alkoxy having 1 to 17, preferably 3 to 10, C atoms or unfluorinated alkenyl, unfluorinated alkenyloxy or unfluorinated alkoxyalkyl having 2 to 15, preferably 3 to 10, C atoms, preferably alkyl or unfluorinated alkenyl,
X$^{61}$ and X$^{62}$, independently of one another, denote F or Cl, —CN, —NCS, —SF$_5$, fluorinated alkyl or alkoxy having 1 to 7 C atoms or fluorinated alkenyl, alkenyloxy or alkoxyalkyl having 2 to 7 C atoms, preferably —NCS, one of
Z$^{61}$ and Z$^{62}$ denotes trans-CH═CH—, trans-CF═CF— or —C≡C— and the other, independently thereof, denotes trans-CH═CH—, trans-CF═CF— or a single bond, preferably one of them denotes —C≡C— or trans-CH═CH— and the other denotes a single bond, and

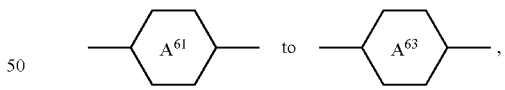

independently of one another, denote

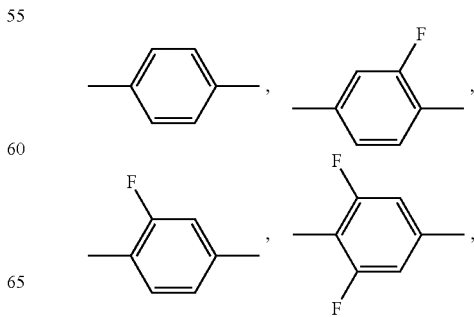

-continued

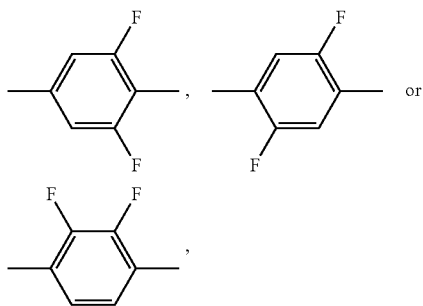

preferably

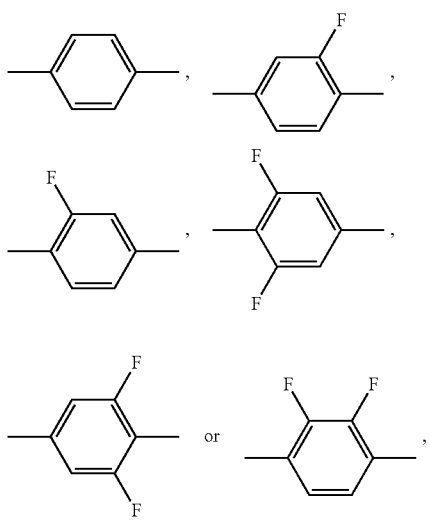

$L^{71}$ denotes $R^{71}$ or $X^{71}$, $L^{72}$ denotes $R^{72}$ or $X^{72}$, $R^{71}$ and $R^{72}$, independently of one another, denote H, unfluorinated alkyl or unfluorinated alkoxy having 1 to 17, preferably 3 to 10, C atoms or unfluorinated alkenyl, unfluorinated alkenyloxy or unfluorinated alkoxyalkyl having 2 to 15, preferably 3 to 10, C atoms, preferably alkyl or unfluorinated alkenyl, $X^{71}$ and $X^{72}$, independently of one another, denote H, F, Cl, —CN, —NCS, —SF$_5$, fluorinated alkyl or fluorinated alkoxy having 1 to 7 C atoms or fluorinated alkenyl, unfluorinated or fluorinated alkenyloxy or unfluorinated or fluorinated alkoxyalkyl having 2 to 7 C atoms, preferably fluorinated alkoxy, fluorinated alkenyloxy, F or Cl, and $Z^{71}$ to $Z^{73}$, independently of one another, denote trans-CH=CH—, trans-CF=CF—, —C≡C— or a single bond, preferably one or more of them denote a single bond, particularly preferably all denote a single bond and

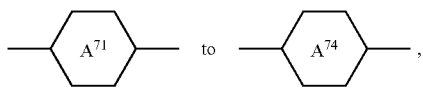

independently of one another, denote

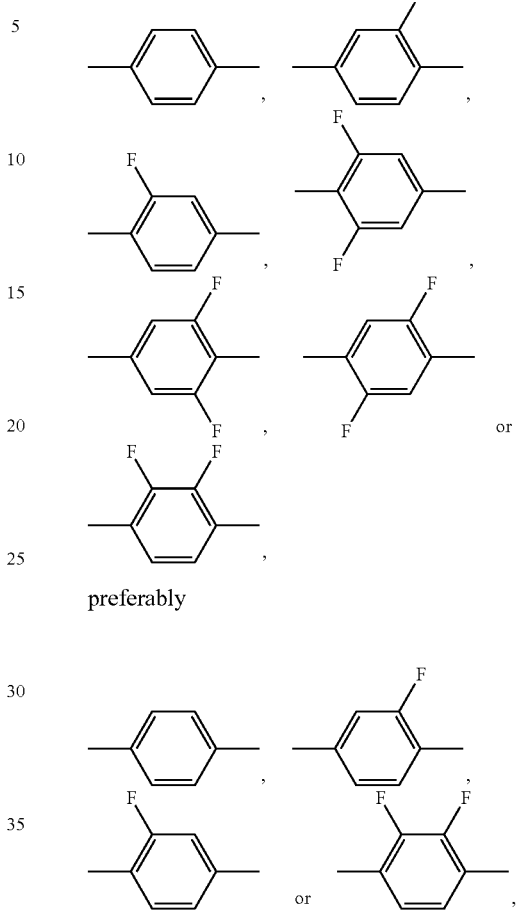

preferably $R^{81}$ and $R^{82}$, independently of one another, denote H, unfluorinated alkyl or alkoxy having 1 to 15, preferably 3 to 10, C atoms or unfluorinated alkenyl, alkenyloxy or alkoxyalkyl having 2 to 15, preferably 3 to 10, C atoms, preferably unfluorinated alkyl or alkenyl, one of $Z^{81}$ and $Z^{82}$ denotes trans-CH=CH—, trans-CF=CF— or —C≡C— and the other, independently thereof, denotes trans-CH=CH—, trans-CF=CF— or a single bond, preferably one of them denotes —C≡C— or trans-CH=CH— and the other denotes a single bond, and

denotes

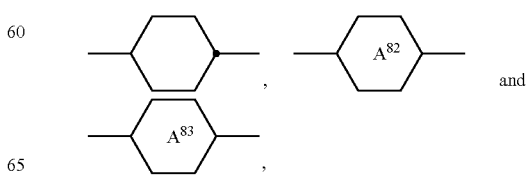

and independently of one another, denote

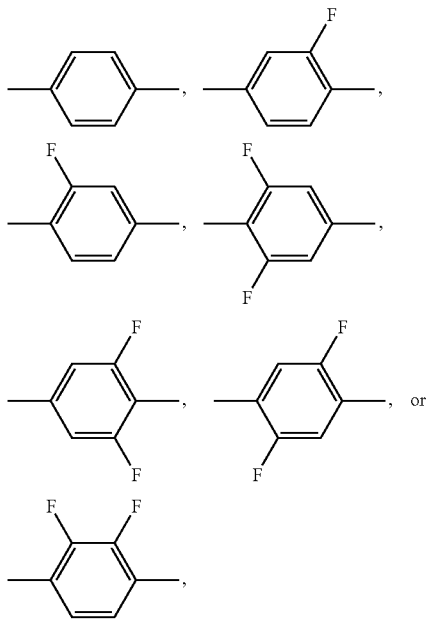

$L^{91}$ denotes $R^{91}$ or $X^{91}$,
$L^{92}$ denotes $R^{92}$ or $X^{92}$,
$R^{91}$ and $R^{92}$, independently of one another, denote H, unfluorinated alkyl or alkoxy having 1 to 15, preferably 3 to 10, C atoms or unfluorinated alkenyl, alkenyloxy or alkoxyalkyl having 2 to 15, preferably 3 to 10, C atoms, preferably unfluorinated alkyl or alkenyl,
$X^{91}$ and $X^{92}$, independently of one another, denote H, F, Cl, —CN, —NCS, —SF$_5$, fluorinated alkyl or fluorinated alkoxy having 1 to 7 C atoms or fluorinated alkenyl, unfluorinated or fluorinated alkenyloxy or unfluorinated or fluorinated alkoxyalkyl having 2 to 7 C atoms, preferably fluorinated alkoxy, fluorinated alkenyloxy, F or Cl, and
$Z^{91}$ to $Z^{93}$, independently of one another, denote trans-CH=CH—, trans-CF=CF—, —C≡C— or a single bond, preferably one or more of them denotes a single bond, and particularly preferably all denote a single bond,

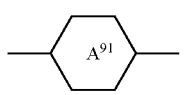

denotes

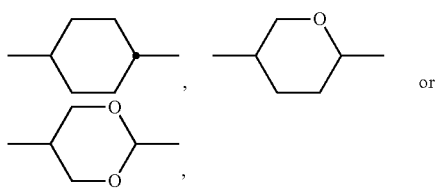

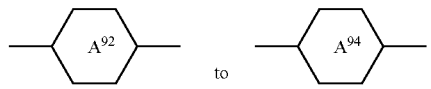

independently of one another, denote

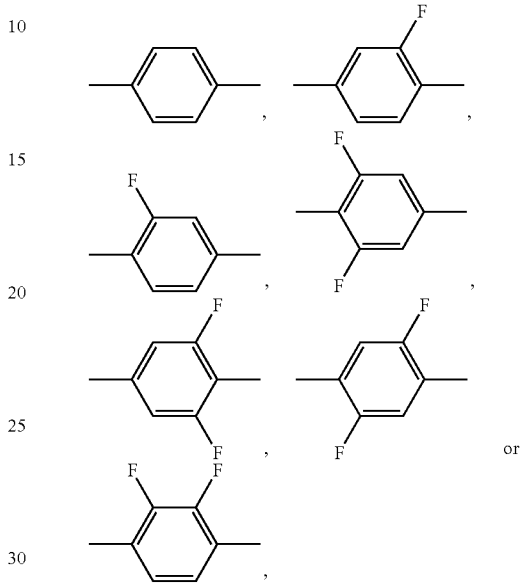

and where compounds of the formula IIIA are excluded from the compounds of the formula VI.

In a preferred embodiment of the present invention, the liquid-crystal medium comprises, more preferably predominantly consists of, even more preferably essentially consists of and very particularly preferably completely consists of one or more compounds of the formula V, preferably selected from the group of the compounds of the formulae V-1 to V-3, preferably of the formulae V-1 and/or V-2 and/or V-3, preferably of the formulae V-1 and V-2:

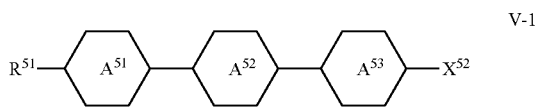

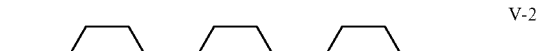

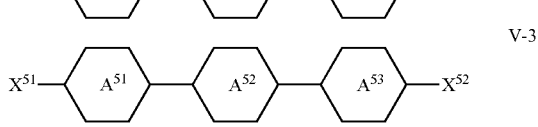

in which the parameters have the respective meanings indicated above formula V and preferably
$R^{51}$ denotes unfluorinated alkyl having 1 to 7 C atoms or unfluorinated alkenyl having 2 to 7 C atoms,
$R^{52}$ denotes unfluorinated alkyl having 1 to 7 C atoms or unfluorinated alkenyl having 2 to 7 C atoms or unfluorinated alkoxy having 1 to 7 C atoms,
$X^{51}$ and $X^{52}$, independently of one another, denote F, Cl, —OCF$_3$, —CF$_3$, —CN, —NCS or —SF$_5$, preferably F, Cl, —OCF$_3$ or —CN.

The compounds of the formula V-1 are preferably selected from the group of the compounds of the formulae V-1a to V-1d, more preferably these compounds of the formula V predominantly consist, even more preferably essentially consist and very particularly preferably completely consist thereof:

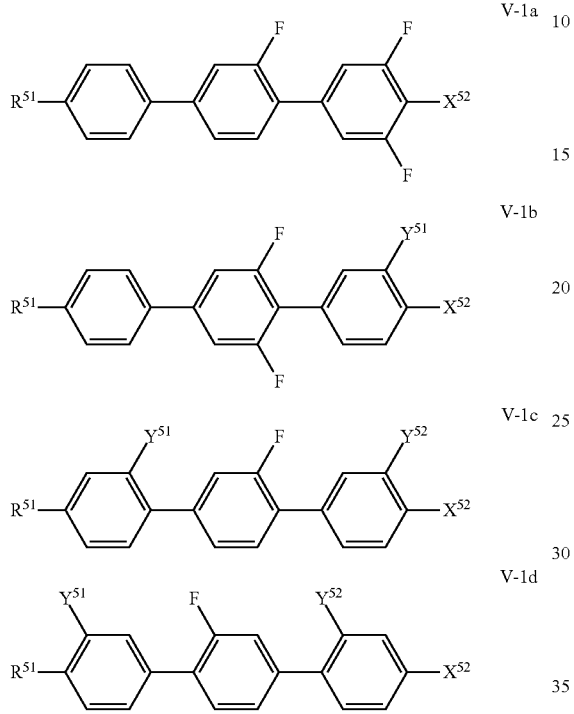

in which the parameters have the respective meanings indicated above formula V-1 and in which $Y^{51}$ and $Y^{52}$, in each case independently of one another, denote H or F, and preferably $R^{51}$ denotes alkyl or alkenyl, and $X^{51}$ denotes F, Cl or —OCF$_3$.

The compounds of the formula V-2 are preferably selected from the group of the compounds of the formulae V-2a to V-2g and/or from the group of the compounds of the formulae V-2f and V-2g, more preferably these compounds of the formula V predominantly consist, even more preferably essentially consist and very particularly preferably completely consist thereof:

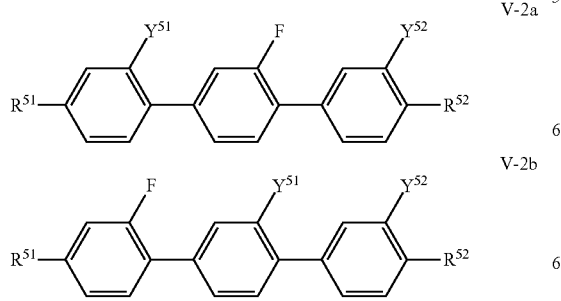

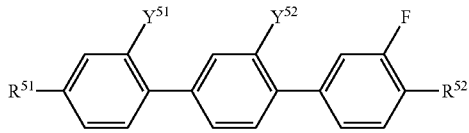

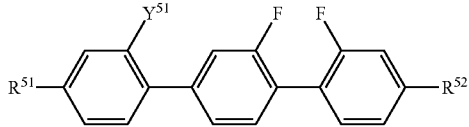

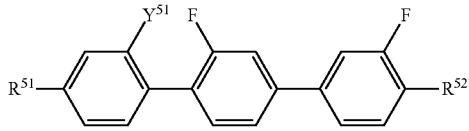

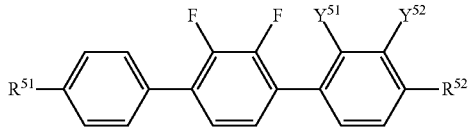

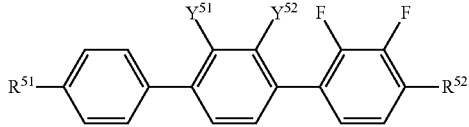

where in each case the compounds of the formula V-2a are excluded from the compounds of the formulae V-2b and V-2c, the compounds of the formula V-2b are excluded from the compounds of the formula V-2c and the compounds of the formula V-2e are excluded from the compounds of the formula V-2f, and in which the parameters have the respective meanings indicated above formula V-1 and in which $Y^{51}$ and $Y^{52}$, in each case independently of one another, denote H or F, and preferably $R^{51}$ denotes alkyl or alkenyl, $X^{51}$ denotes F, Cl or —OCF$_3$, and preferably one of $Y^{51}$ and $Y^{52}$ denotes H and the other denotes H or F, preferably likewise denotes H.

The compounds of the formula V-3 are preferably compounds of the formula V-3a:

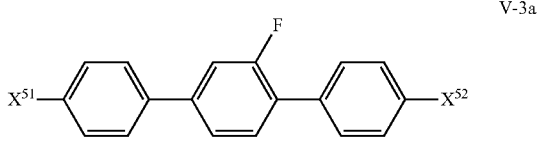

in which the parameters have the respective meanings indicated above formula V-1 and in which preferably $X^{51}$ denotes F, Cl, preferably F, $X^{52}$ denotes F, Cl or —OCF$_3$, preferably —OCF$_3$.

In an even more preferred embodiment of the present invention, the compounds of the formula V are selected from the group of the compounds V-1a to V-1d, preferably selected from the group of the compounds V-1c and V-1d, more preferably these compounds of the formula V predominantly consist, even more preferably essentially consist and very particularly preferably completely consist thereof:

The compounds of the formula V-1a are preferably selected from the group of the compounds of the formulae V-1a-1 and V-1a-2, more preferably these compounds of the formula V predominantly consist, even more preferably essentially consist and very particularly preferably completely consist thereof:

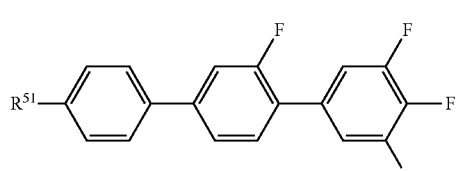

V-1a-1

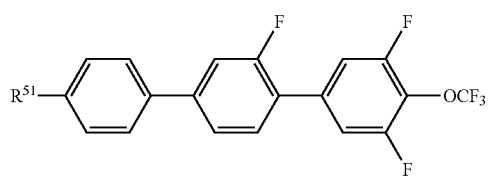

V-1a-2 in which
R$^{51}$ has the meaning indicated above and preferably denotes C$_n$H$_{2n+1}$, in which
n denotes an integer in the range from 0 to 7, preferably in the range from 1 to 5 and particularly preferably 3 or 7.

The compounds of the formula V-1b are preferably compounds of the formula V-1b-1:

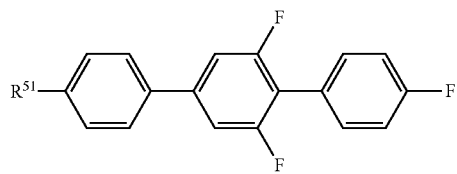

V-1b-1 in which
R$^{51}$ has the meaning indicated above and preferably denotes C$_n$H$_{2n+1}$, in which
n denotes an integer in the range from 0 to 15, preferably in the range from 1 to 7 and particularly preferably 1 to 5.

The compounds of the formula V-1c are preferably selected from the group of the compounds of the formulae V-1c-1 to V-1c-4, preferably selected from the group of the compounds of the formulae V-1c-1 and V-1c-2, more preferably these compounds of the formula V predominantly consist, even more preferably essentially consist and very particularly preferably completely consist thereof:

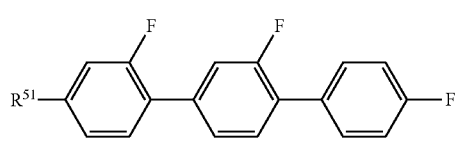

V-1c-1

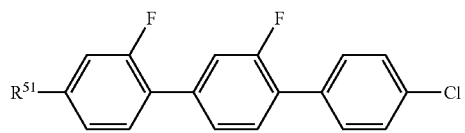

V-1c-2

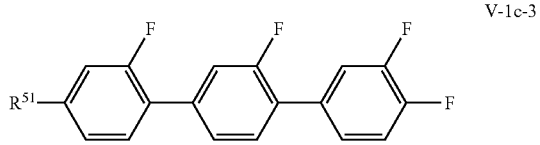

V-1c-3

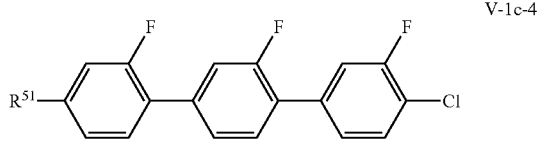

V-1c-4 in which
R$^{51}$ has the meaning indicated above and preferably denotes C$_n$H$_{2n+1}$, in which
n denotes an integer in the range from 0 to 15, preferably in the range from 1 to 7 and particularly preferably 1 to 5.

The compounds of the formula V-1d are preferably selected from the group of the compounds of the formulae V-1d-1 and V-1d-2, preferably the compound of the formula V-1d-2, more preferably these compounds of the formula V predominantly consist, even more preferably essentially consist and very particularly preferably completely consist thereof:

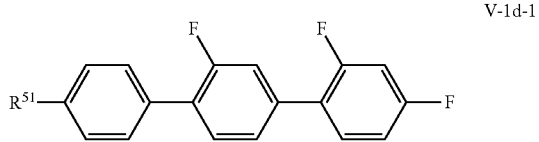

V-1d-1

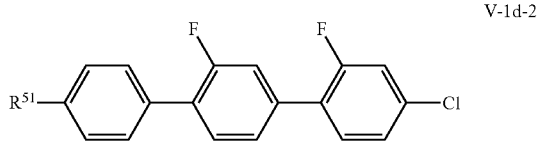

V-1d-2 in which
R$^{51}$ has the meaning indicated above and preferably denotes C$_n$H$_{2n+1}$, in which
n denotes an integer in the range from 0 to 15, preferably in the range from 1 to 7 and particularly preferably 1 to 5.

The compounds of the formula V-2a are preferably selected from the group of the compounds of the formulae V-2a-1 and V-2a-2, preferably the compounds of the formula V-2a-1, more preferably these compounds of the formula V predominantly consist, even more preferably essentially consist and very particularly preferably completely consist thereof:

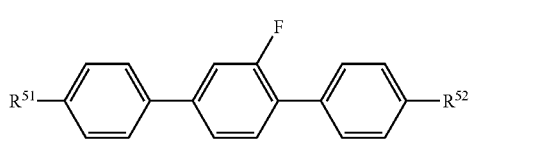

V-2a-1

-continued

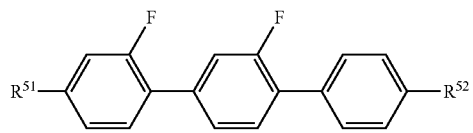

V-2a-2 in which
R$^{51}$ has the meaning indicated above and preferably denotes
  C$_n$H$_{2n+1}$ or CH$_2$=CH—(CH$_2$)$_Z$, and
R$^{52}$ has the meaning indicated above and preferably denotes
  C$_m$H$_{2m+1}$ or O—C$_m$H$_{2m+1}$ or (CH$_2$)$_Z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

Preferred combinations of (R$^{51}$ and R$^{52}$), in particular in the case of formula V-2a-1, are (C$_n$H$_{2n+1}$ and C$_m$H$_{2m+1}$), (C$_n$H$_{2n+1}$ and O—C$_m$H$_{2m+1}$), (CH$_2$=CH—(CH$_2$)$_Z$ and C$_m$H$_{2m+1}$), (CH$_2$=CH—(CH$_2$)$_Z$ and O—C$_m$H$_{2m+1}$) and (C$_n$H$_{2n+1}$ and (CH$_2$)$_Z$—CH=CH$_2$).

Preferred compounds of the formula V-2b are the compounds of the formula V-2b-1:

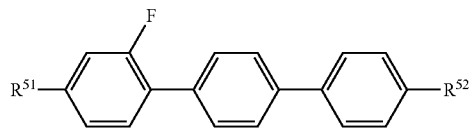

V-2b-1 in which
R$^{51}$ has the meaning indicated above and preferably denotes
  C$_n$H$_{2n+1}$ or CH$_2$=CH—(CH$_2$)$_Z$, and
R$^{52}$ has the meaning indicated above and preferably denotes
  C$_m$H$_{2m+1}$ or O—C$_m$H$_{2m+1}$ or (CH$_2$)$_Z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combination of (R$^{51}$ and R$^{52}$) here is, in particular, (C$_n$H$_{2n+1}$ and C$_m$H$_{2m+1}$).

Preferred compounds of the formula V-2c are the compounds of the formula V-2c-1:

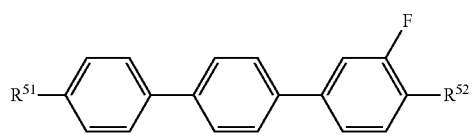

V-2c-1 in which
R$^{51}$ has the meaning indicated above and preferably denotes
  C$_n$H$_{2n+1}$ or CH$_2$=CH—(CH$_2$)$_Z$, and
R$^{52}$ has the meaning indicated above and preferably denotes
  C$_m$H$_{2m+1}$ or O—C$_m$H$_{2m+1}$ or (CH$_2$)$_Z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combination of (R$^{51}$ and R$^{52}$) here is, in particular, (C$_n$H$_{2n+1}$ and C$_m$H$_{2m+1}$).

Preferred compounds of the formula V-2d are the compounds of the formula V-2d-1:

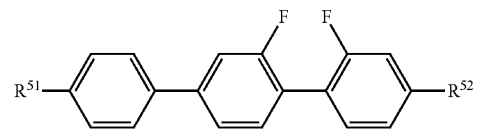

V-2d-1 in which
R$^{51}$ has the meaning indicated above and preferably denotes
  C$_n$H$_{2n+1}$ or CH$_2$=CH—(CH$_2$)$_Z$, and
R$^{52}$ has the meaning indicated above and preferably denotes
  C$_m$H$_{2m+1}$ or O—C$_m$H$_{2m+1}$ or (CH$_2$)$_Z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combination of (R$^{51}$ and R$^{52}$) here is, in particular, (C$_n$H$_{2n+1}$ and C$_m$H$_{2m+1}$).

Preferred compounds of the formula V-2e are the compounds of the formula V-2e-1:

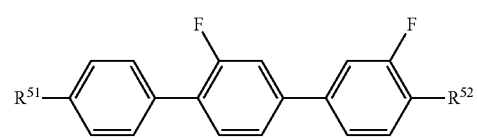

V-2e-1 in which
R$^{51}$ has the meaning indicated above and preferably denotes
  C$_n$H$_{2n+1}$ or CH$_2$=CH—(CH$_2$)$_Z$, and
R$^{52}$ has the meaning indicated above and preferably denotes
  C$_m$H$_{2m+1}$ or O—C$_m$H$_{2m+1}$ or (CH$_2$)$_Z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combination of (R$^{51}$ and R$^{52}$) here is, in particular, (C$_n$H$_{2n+1}$ and O—C$_m$H$_{2m+1}$).

Preferred compounds of the formula V-2f are the compounds of the formula V-2f-1:

V-2f-1 in which
R$^{51}$ has the meaning indicated above and preferably denotes C$_n$H$_{2n+1}$ or CH$_2$=CH—(CH$_2$)$_Z$, and
R$^{52}$ has the meaning indicated above and preferably denotes C$_m$H$_{2m+1}$ or O—C$_m$H$_{2m+1}$ or (CH$_2$)$_Z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{51}$ and R$^{52}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$).

Preferred compounds of the formula V-2g are the compounds of the formula V-2g-1:

V-2g-1

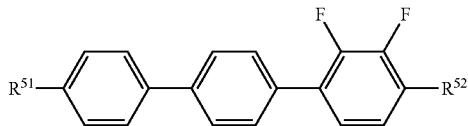

in which
R$^{51}$ has the meaning indicated above and preferably denotes C$_n$H$_{2n+1}$ or CH$_2$=CH—(CH$_2$)$_Z$, and
R$^{52}$ has the meaning indicated above and preferably denotes C$_m$H$_{2m+1}$ or O—C$_m$H$_{2m+1}$ or (CH$_2$)$_Z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{51}$ and R$^{52}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and O—C$_m$H$_{2m+1}$).

The compounds of the formula VI are preferably selected from the group of the compounds of the formulae VI-1 to VI-4, more preferably these compounds of the formula VI predominantly consist, even more preferably essentially consist and very particularly preferably completely consist thereof:

VI-1

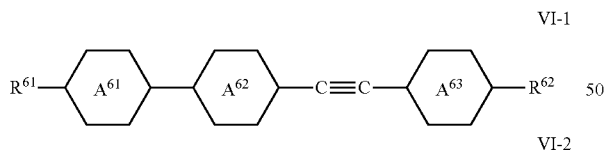

VI-2

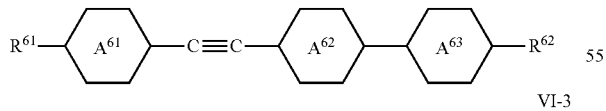

VI-3

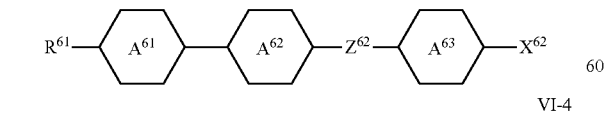

VI-4

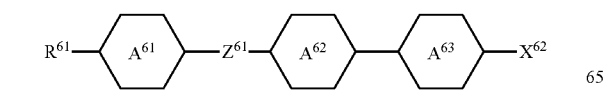

in which
Z$^{61}$ and Z$^{62}$ denote trans-CH=CH— or trans-CF=CF—, preferably trans-CH=CH—, and the other parameters have the meaning given above under formula VI and preferably
R$^{61}$ and R$^{62}$, independently of one another, denote H, unfluorinated alkyl or alkoxy having 1 to 7 C atoms or unfluorinated alkenyl having 2 to 7 C atoms,
X$^{62}$ denotes F, Cl, —CN or —NCS, preferably —NCS,
and one of

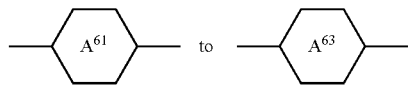

denotes

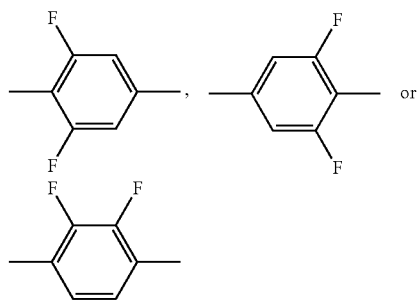

and the others, independently of one another, denote

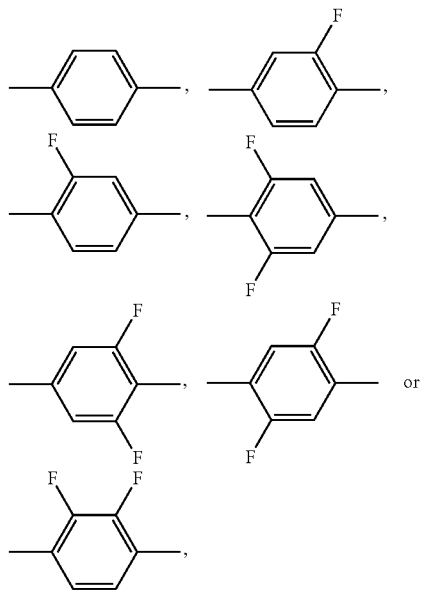

preferably

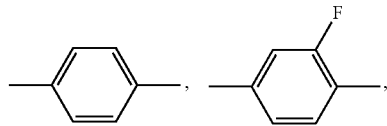

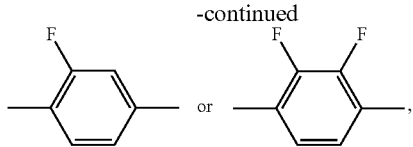

and preferably $R^{61}$ denotes $C_nH_{2n+1}$ or $CH_2$=$CH$—$(CH_2)_z$, and $R^{62}$ denotes $C_mH_{2m+1}$ or O—$C_mH_{2m+1}$ or $(CH_2)_z$—$CH$=$CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The compounds of the formula VI-1 are preferably selected from the group of the compounds of the formulae VI-1a and VI-1b, preferably selected from compounds of the formula VI-1a, more preferably these compounds of the formula VI predominantly consist, even more preferably essentially consist and very particularly preferably completely consist thereof:

VI-1a

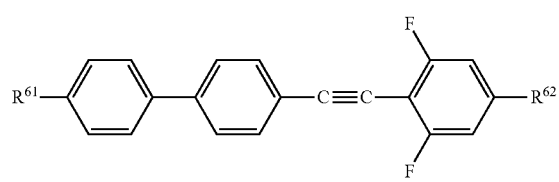

VI-1b

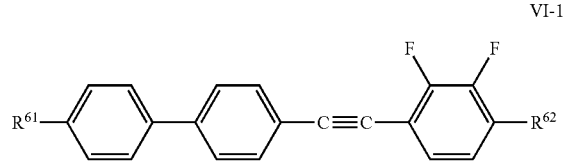

in which $R^{61}$ has the meaning indicated above and preferably denotes $C_nH_{2n+1}$ or $CH_2$=$CH$—$(CH_2)_z$, and $R^{62}$ has the meaning indicated above and preferably denotes $C_mH_{2m+1}$ or O—$C_mH_{2m+1}$ or $(CH_2)_z$—$CH$=$CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{61}$ and $R^{62}$) here are, in particular, ($C_nH_{2+1}$ and $C_mH_{2m+1}$) and ($C_nH_{2n+1}$ and O—$C_mH_{2m+1}$), in the case of formula VI-1a particularly preferably ($C_nH_{2n+1}$ and $C_mH_{2m+1}$) and in the case of formula VI-1b particularly preferably ($C_nH_{2n+1}$ and O—$C_mH_{2m+1}$).

The compounds of the formula VI-3 are preferably compounds of the formula VI-3a:

VI-3a

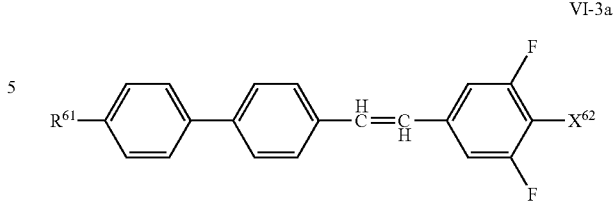

in which the parameters have the meaning given above under formula VI-3 and preferably $R^{61}$ has the meaning indicated above and preferably denotes $C_nH_{2n+1}$, in which n denotes an integer in the range from 0 to 7, preferably in the range from 1 to 5, and $X^{62}$ denotes —F, —Cl, —OCF$_3$, —CN or —NCS, particularly preferably —NCS.

The compounds of the formula VI-4 are preferably compounds of the formula VI-4a:

VI-4a

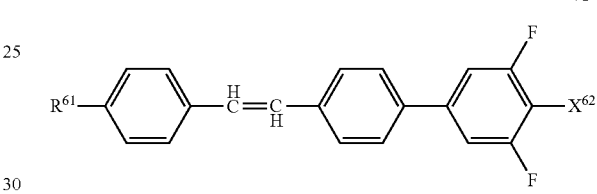

in which the parameters have the meaning given above under formula VI-4 and preferably $R^{61}$ has the meaning indicated above and preferably denotes $C_nH_{2n+1}$, in which n denotes an integer in the range from 0 to 7, preferably in the range from 1 to 5, and $X^{62}$ denotes F, Cl, OCF$_3$, —CN or —NCS, particularly preferably —NCS.

Further preferred compounds of the formula VI are the compounds of the following formulae:

in which n denotes an integer in the range from 0 to 7, preferably in the range from 1 to 5.

The compounds of the formula VII are preferably selected from the group of the compounds of the formulae VII-1 to VII-6, more preferably these compounds of the formula VII predominantly consist, even more preferably essentially consist and very particularly preferably completely consist thereof:

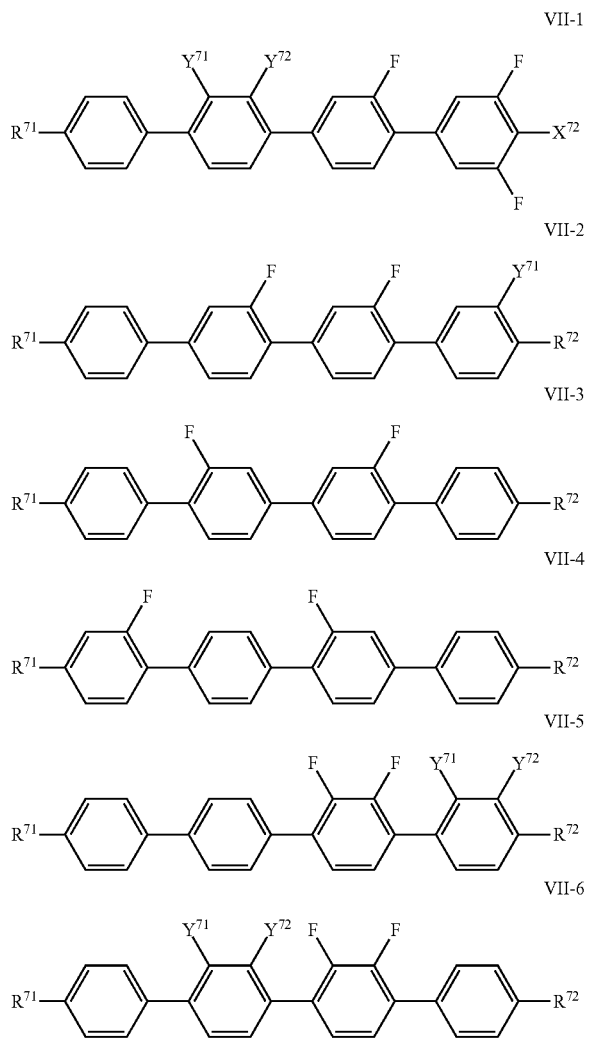

where the compounds of the formula VII-5 are excluded from the compounds of the formula VII-6, and
in which the parameters have the respective meanings indicated above formula VII, and preferably
$R^{71}$ denotes unfluorinated alkyl or alkoxy, each having 1 to 7 C atoms, or unfluorinated alkenyl having 2 to 7 C atoms,
$R^{72}$ denotes unfluorinated alkyl or alkoxy, each having 1 to 7 C atoms, or unfluorinated alkenyl having 2 to 7 C atoms, and
$X^{72}$ denotes F, Cl or —$OCF_3$, preferably F, and
particularly preferably
$R^{71}$ has the meaning indicated above and preferably denotes $C_nH_{2n+1}$ or $CH_2$=CH—$(CH_2)_Z$, and
$R^{72}$ has the meaning indicated above and preferably denotes $C_mH_{2m+1}$ or O—$C_mH_{2m+1}$ or $(CH_2)_Z$—CH=$CH_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The compounds of the formula VII-1 are preferably selected from the group of the compounds of the formulae VII-1a to VII-1d, more preferably these compounds of the formula VII-1 predominantly consist, even more preferably essentially consist and very particularly preferably completely consist thereof:

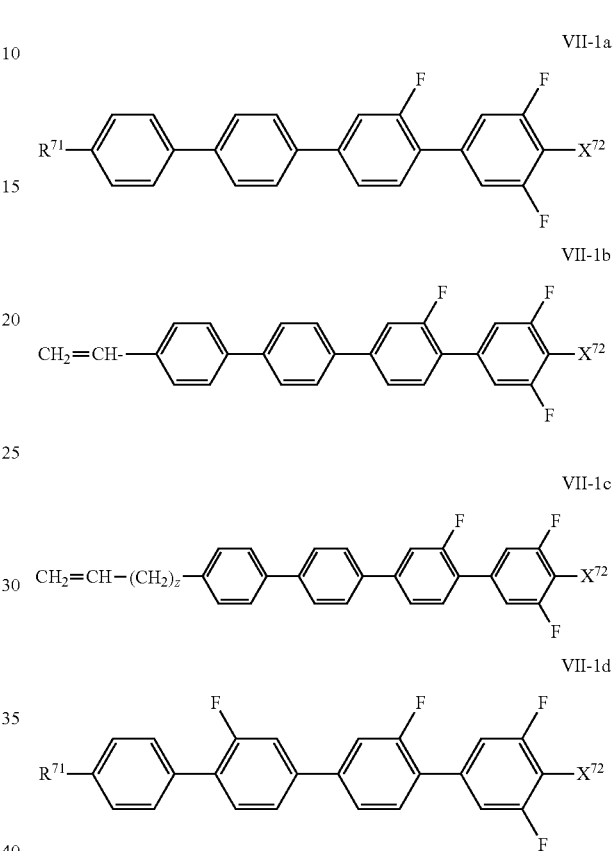

in which $X^{72}$ has the meaning given above for formula VII-2 and
$R^{71}$ has the meaning indicated above and preferably denotes $C_nH_{2n+1}$, in which
n denotes 1 to 7, preferably 2 to 6, particularly preferably 2, 3 or 5, and
z denotes 0, 1, 2, 3 or 4, preferably 0 or 2, and
$X^{72}$ preferably denotes F.

The compounds of the formula VII-2 are preferably selected from the group of the compounds of the formulae VII-2a and VII-2b, preferably of the formula VII-2a, more preferably these compounds of the formula VII-2 predominantly consist, even more preferably essentially consist and very particularly preferably completely consist thereof:

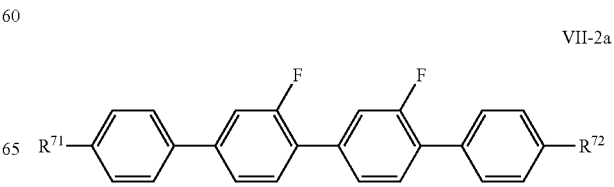

-continued

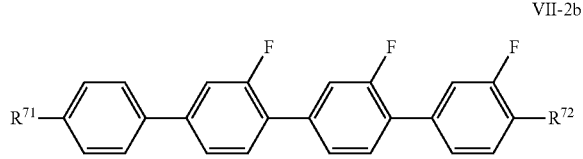
VII-2b in which
R$^{71}$ has the meaning indicated above and preferably denotes C$_n$H$_{2n+1}$ or CH$_2$=CH—(CH$_2$)$_Z$, and
R$^{72}$ has the meaning indicated above and preferably denotes C$_m$H$_{2m+1}$ or O—C$_m$H$_{2m+1}$ or (CH$_2$)$_Z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{71}$ and R$^{72}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$).

The compounds of the formula VII-3 are preferably compounds of the formula VII-3a:

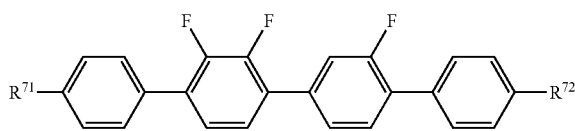
VII-3a in which
R$^{71}$ has the meaning indicated above and preferably denotes C$_n$H$_{2n+1}$ or CH$_2$=CH—(CH$_2$)$_Z$, and
R$^{72}$ has the meaning indicated above and preferably denotes C$_m$H$_{2m+1}$ or O—C$_m$H$_{2m+1}$ or (CH$_2$)$_Z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{71}$ and R$^{72}$) here are, in particular, (C$_n$H$_{2n+1}$ C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$).

The compounds of the formula VII-4 are preferably compounds of the formula VII-4a:

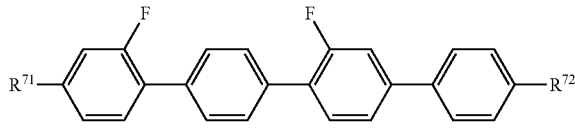
VII-4a in which
R$^{71}$ has the meaning indicated above and preferably denotes C$_n$H$_{2n+1}$ or CH$_2$=CH—(CH$_2$)$_Z$, and
R$^{72}$ has the meaning indicated above and preferably denotes C$_m$H$_{2m+1}$ or O—C$_m$H$_{2m+1}$ or (CH$_2$)$_Z$—CH=CH$_2$, and in which n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{71}$ and R$^{72}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$).

The compounds of the formula VII-5 are preferably selected from the group of the compounds of the formulae VII-5a and VII-5b, preferably of the formula VII-5a, more preferably these compounds of the formula VII-5 predominantly consist, even more preferably essentially consist and very particularly preferably completely consist thereof:

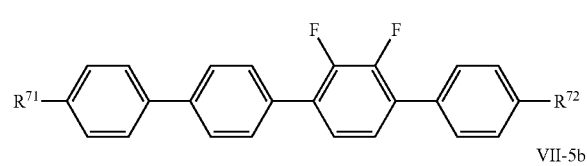
VII-5a

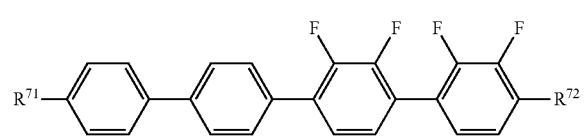
VII-5b in which
R$^{71}$ has the meaning indicated above and preferably denotes C$_n$H$_{2n+1}$ or CH$_2$=CH—(CH$_2$)$_Z$, and
R$^{72}$ has the meaning indicated above and preferably denotes C$_m$H$_{2m+1}$ or O—C$_m$H$_{2m+1}$ or (CH$_2$)$_Z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{71}$ and R$^{72}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$).

The compounds of the formula VII-6 are preferably selected from the group of the compounds of the formulae VII-6a and VII-6b, more preferably these compounds of the formula VII-6 predominantly consist, even more preferably essentially consist and very particularly preferably completely consist thereof:

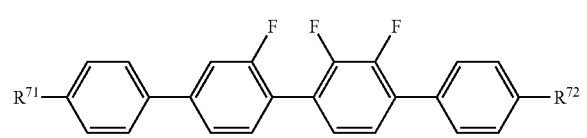
VII-6a

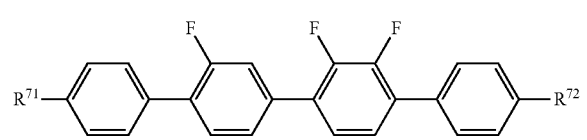
VII-6b in which $R^{71}$ has the meaning indicated above and preferably denotes $C_nH_{2n+1}$ or $CH_2=CH-(CH_2)_Z$, and $R^{72}$ has the meaning indicated above and preferably denotes $C_mH_{2m+1}$ or $O-C_mH_{2m+1}$ or $(CH_2)_Z-CH=CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{71}$ and $R^{72}$) here are, in particular, ($C_nH_{2n+1}$ and $C_mH_{2m+1}$) and ($C_nH_{2n+1}$ and $O-C_mH_{2m+1}$), particularly preferably ($C_nH_{2n+1}$ and $C_mH_{2m+1}$).

The liquid-crystalline media in accordance with the present application preferably comprise in total 0 to 40%, preferably 0 to 30% and particularly preferably 5 to 25%, of compounds of the formula VIII.

The compounds of the formula VIII are preferably selected from the group of the compounds of the formulae VIII-1 to VIII-3, more preferably these compounds of the formula VIII predominantly consist, even more preferably essentially consist and very particularly preferably completely consist thereof:

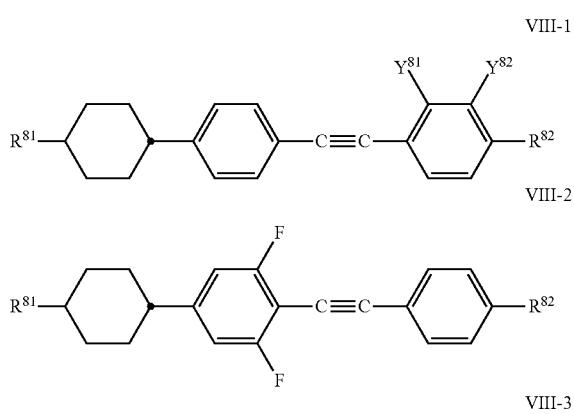

VIII-1

VIII-2

VIII-3 in which one of $Y^{81}$ and $Y^{82}$ denotes H and the other denotes H or F, and $R^{81}$ has the meaning indicated above and preferably denotes $C_nH_{2n+1}$ or $CH_2=CH-(CH_2)_Z$, and $R^{82}$ has the meaning indicated above and preferably denotes $C_mH_{2m+1}$ or $O-C_mH_{2m+1}$ or $(CH_2)_Z-CH=CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{81}$ and $R^{82}$) here are, in particular, ($C_nH_{2n+1}$ and $C_mH_{2m+1}$) and ($C_nH_{2n+1}$ and $O-C_mH_{2m+1}$), particularly preferably ($C_nH_{2n+1}$ and $C_mH_{2m+1}$).

The compounds of the formula VIII-1 are preferably selected from the group of the compounds of the formulae VIII-1a to VIII-1c, more preferably these compounds of the formula VIII-1 predominantly consist, even more preferably essentially consist and very particularly preferably completely consist thereof:

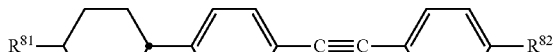

VIII-1a

VIII-1b

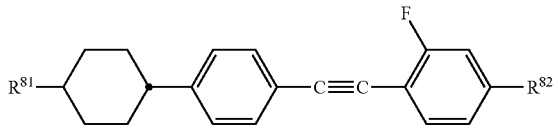

VIII-1c in which $R^{81}$ has the meaning indicated above and preferably denotes $C_nH_{2n+1}$ or $CH_2=CH-(CH_2)_Z$, and $R^{82}$ has the meaning indicated above and preferably denotes $C_mH_{2m+1}$ or $O-C_mH_{2m+1}$ or $(CH_2)_Z-CH=CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{81}$ and $R^{82}$) here are, in particular, ($C_nH_{2n+1}$ and $C_mH_{2m+1}$) and ($C_nH_{2n+1}$ and $O-C_mH_{2m+1}$), particularly preferably ($C_nH_{2n+1}$ and $C_mH_{2m+1}$).

The compounds of the formula VIII-2 are preferably compounds of the formula VIII-2a:

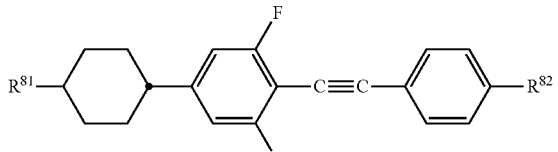

VIII-2a in which $R^{81}$ has the meaning indicated above and preferably denotes $C_nH_{2n+1}$ or $CH_2=CH-(CH_2)_Z$, and $R^{82}$ has the meaning indicated above and preferably denotes $C_mH_{2m+1}$ or $O-C_mH_{2m+1}$ or $(CH_2)_Z-CH=CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{81}$ and $R^{82}$) here are, in particular, ($C_nH_{2n+1}$ and $C_mH_{2m+1}$), ($C_nH_{2n+1}$ and $O-C_mH_{2m+1}$) and ($CH_2=CH-(CH_2)_Z$ and $C_mH_{2m+1}$), particularly preferably ($C_nH_{2n+1}$ and $C_mH_{2m+1}$).

The compounds of the formula VIII-3 are preferably compounds of the formula VIII-3a:

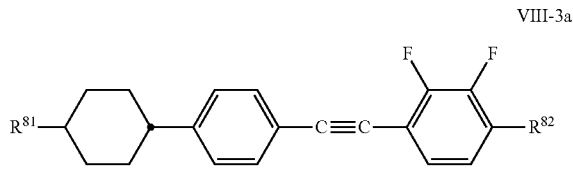
VIII-3a in which
R$^{81}$ has the meaning indicated above and preferably denotes C$_n$H$_{2n+1}$ or CH$_2$=CH—(CH$_2$)$_Z$, and
R$^{82}$ has the meaning indicated above and preferably denotes C$_m$H$_{2m+1}$ or O—C$_m$H$_{2m+1}$ or (CH$_2$)$_Z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{81}$ and R$^{82}$) here are, in particular, (C$_n$H$_{2n+1}$ and C$_m$H$_{2m+1}$) and (C$_n$H$_{2n+1}$ and O—C$_m$H$_{2m+1}$).

The compounds of the formula IX are preferably selected from the group of the compounds of the formulae IX-1 to IX-3, more preferably these compounds of the formula IX predominantly consist, even more preferably essentially consist and very particularly preferably completely consist thereof:

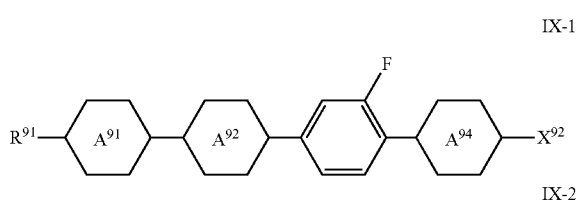
IX-1

IX-2

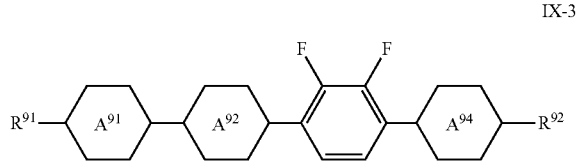
IX-3 in which the parameters have the respective meaning indicated above under formula IX and preferably
one of

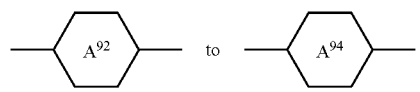
to denotes

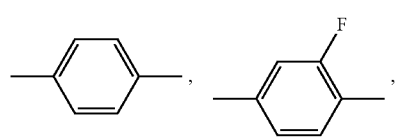

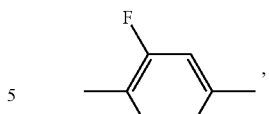
, and
in which
R$^{91}$ has the meaning indicated above and preferably denotes C$_n$H$_{2n+1}$ or CH$_2$=CH—(CH$_2$)$_Z$, and
R$^{92}$ has the meaning indicated above and preferably denotes C$_m$H$_{2m+1}$ or O—C$_m$H$_{2m+1}$ or (CH$_2$)$_Z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{91}$ and R$^{92}$) here are, in particular, (C$_n$H$_{2n+1}$ and C$_m$H$_{2m+1}$) and (C$_n$H$_{2n+1}$ and O—C$_m$H$_{2m+1}$).

The liquid-crystalline media in accordance with the present application preferably comprise in total 5 to 30%, preferably 10 to 25% and particularly preferably 15 to 20%, of compounds of the formula IX.

The compounds of the formula IX-1 are preferably selected from the group of the compounds of the formulae IX-1a to IX-1e, more preferably these compounds of the formula IX-1 predominantly consist, even more preferably essentially consist and very particularly preferably completely consist thereof:

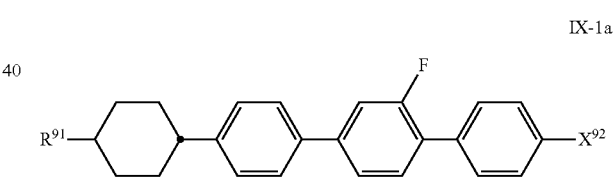
IX-1a

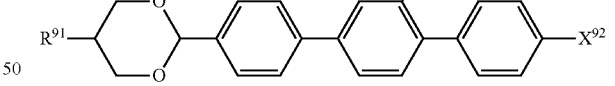
IX-1b

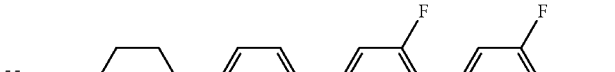
IX-1c

IX-1d

-continued

IX-1e

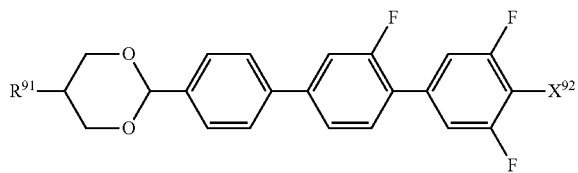

in which the parameters have the meaning given above and preferably $R^{91}$ has the meaning indicated above and preferably denotes $C_nH_{2n+1}$, and n denotes an integer in the range from 0 to 15, preferably in the range from 1 to 7 and particularly preferably 1 to 5, and $X^{92}$ preferably denotes F or Cl.

The compounds of the formula IX-2 are preferably selected from the group of the compounds of the formulae IX-2a and IX-2b, more preferably these compounds of the formula IX-2 predominantly consist, even more preferably essentially consist and very particularly preferably completely consist thereof:

IX-2a

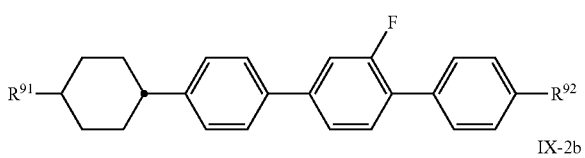

IX-2b

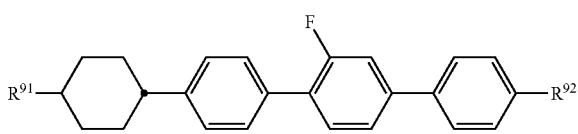

in which $R^{91}$ has the meaning indicated above and preferably denotes $C_nH_{2n+1}$ or $CH_2=CH-(CH_2)_z$, and $R^{92}$ has the meaning indicated above and preferably denotes $C_mH_{2m+1}$ or $O-C_mH_{2m+1}$ or $(CH_2)_z-CH=CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combination of ($R^{91}$ and $R^{92}$) here is, in particular, ($C_nH_{2n+1}$ and $C_mH_{2m+1}$).

The compounds of the formula IX-3 are preferably compounds of the formulae IX-3a and IX-3b:

IX-3a

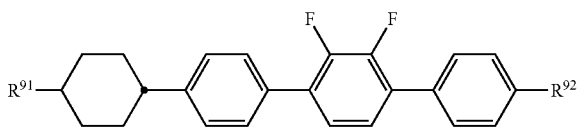

IX-3b

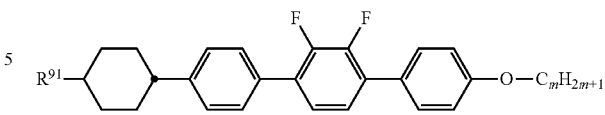

in which $R^{91}$ has the meaning indicated above and preferably denotes $C_nH_{2n+1}$ or $CH_2=CH-(CH_2)_z$, and $R^{92}$ has the meaning indicated above and preferably denotes $C_mH_{2m+1}$ or $O-C_mH_{2m+1}$ or $(CH_2)_z-CH=CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{91}$ and $R^{92}$) here are, in particular, ($C_nH_{2n+1}$ and $C_mH_{2m+1}$) and ($C_nH_{2n+1}$ and $O-C_mH_{2m+1}$), particularly preferably ($C_nH_{2n+1}$ and $O-C_mH_{2m+1}$).

In a preferred embodiment of the present invention, the medium comprises one or more dielectrically positive compounds of the formula V-1 having a dielectric anisotropy of greater than 3.

The liquid-crystalline media in accordance with the present invention preferably comprise 10% or less, preferably 5% or less, particularly preferably 2% or less, very particularly preferably 1% or less, and in particular absolutely no compound having only two or fewer five- and/or six-membered rings.

In a preferred embodiment of the present invention, the medium comprises one or more compounds of the formula VI.

In a further preferred embodiment of the present invention, the medium comprises one or more compounds of the formula VII.

The definitions of the abbreviations (acronyms) used for the compounds in the present application are indicated below in Table D or are evident from Tables A to C.

In a preferred embodiment of the present invention, the liquid-crystal medium, or component A of the liquid-crystal medium, comprises one or more compounds of the formulae IB-1 and/or IB-2 and/or IB-3 and/or IB-4.

The liquid-crystal medium, or component A of the liquid-crystal medium, preferably comprises one or more compounds selected from the compounds of the formulae IB-1a-1 to IB-1a-12, particularly preferably of the formula IB-1a-2, very particularly preferably one or more compounds of the formula IB-1a-2 and one or more compounds selected from the group of the compounds of the formula IB-1a-1 and formulae IB-1a-3 to IB-1a-12, and one or more compounds of the formulae IB-1b-1 to IB-1b-12 and/or IB-2 and/or IB-3 and/or IB-4.

In a further preferred embodiment of the present invention, the liquid-crystal medium, or component A of the liquid-crystal medium, comprises one or more compounds selected from the group of the compounds of the formulae IB-1b-1 to IB-1b-12, particularly preferably selected from the group of the compounds of the formulae IB-1b-5 and/or IB-1b-7 and/or IB-1b-8 and/or IB-1b-9 and/or IB-1b-10, and one or more compounds selected from the group of the compounds of the formulae IB-1a-1 to IB-1a-12, preferably of the formula IB-1a-2, and/or one or more compounds of the formulae IB-2 and/or IB-3 and/or IB-4.

In a further preferred embodiment of the present invention, the liquid-crystal medium, or component A of the liquid-crystal medium, comprises one or more compounds of the formula IB-2 and one or more compounds of the formula IB-1, preferably of the formula IB-1a, preferably of the formulae IB-1a-2, and/or IB-1b, and/or one or more compounds of the formulae IB-3 and/or IB-4.

In a further preferred embodiment of the present invention, the liquid-crystal medium, or component A of the liquid-crystal medium, comprises one or more compounds of the formula IB-3 and one or more compounds of the formula IB-1, preferably of the formula IB-1a, preferably of the formula IB-1a-2, and/or IB-1b, and/or one or more compounds of the formulae IB-2 and/or IB-4.

In a further preferred embodiment of the present invention, the liquid-crystal medium, or component A of the liquid-crystal medium, comprises one or more compounds of the formula IB-4 and one or more compounds of the formula IB-1, preferably of the formula IB-1a, preferably of the formula IB-1a-2, and/or IB-1b, and/or one or more compounds of the formulae IB-2 and/or IB-3.

The liquid-crystalline media in accordance with the present invention preferably comprise, more preferably predominantly consist of, even more preferably essentially consist of and very particularly preferably completely consist of compounds selected from the group of the compounds of the formulae IA, IB, IIA, IIB, IV and V, preferably IA, IB, IIA, IIB and IV, or selected from the group of the compounds of the formulae IA, IB, III, IV and V, preferably I, IIIA, IIIB and IV.

In this application, comprise in connection with compositions means that the entity in question, i.e. the medium or the component, comprises the component or components or compound or compounds indicated, preferably in a total concentration of 10% or more and very preferably 20% or more.

In this connection, predominantly consist of means that the entity in question comprises 55% or more, preferably 60% or more and very preferably 70% or more, of the component or components or compound or compounds indicated.

In this connection, essentially consist of means that the entity in question comprises 80% or more, preferably 90% or more and very preferably 95% or more, of the component or components or compound or compounds indicated.

In this connection, completely consist of means that the entity in question comprises 98% or more, preferably 99% or more and very preferably 100.0% of the component or components or compound or compounds indicated.

Other mesogenic compounds which are not explicitly mentioned above can optionally and advantageously also be used in the media in accordance with the present invention. Such compounds are known to the person skilled in the art.

The liquid-crystal media in accordance with the present invention preferably have a clearing point of 90° C. or more, more preferably 100° C. or more, even more preferably 120° C. or more, particularly preferably 150° C. or more and very particularly preferably 170° C. or more.

The nematic phase of the media according to the invention preferably extends at least from 20° C. or less to 90° C. or more, preferably up to 100° C. or more, more preferably at least from 0° C. or less to 120° C. or more, very preferably at least from −10° C. or less to 140° C. or more and in particular at least from −20° C. or less to 150° C. or more.

The $\Delta\varepsilon$ of the liquid-crystal medium in accordance with the invention, at 1 kHz and 20° C., is preferably 1 or more, more preferably 2 or more and very preferably 3 or more.

The $\Delta n$ of the liquid-crystal media in accordance with the present invention, at 589 nm ($Na^D$) and 20° C., is preferably in the range from 0.200 or more to 0.90 or less, more preferably in the range from 0.250 or more to 0.90 or less, even more preferably in the range from 0.300 or more to 0.85 or less and very particularly preferably in the range from 0.350 or more to 0.800 or less.

In a preferred embodiment of the present application, the $\Delta n$ of the liquid-crystal media in accordance with the present invention is preferably 0.40 or more, more preferably 0.45 or more.

In accordance with the present invention, the individual compounds of the formula I in the liquid-crystal media are preferably used in a total concentration of 10% to 100%, more preferably 30% to 95%, even more preferably 40% to 90% and very preferably 50% to 90%, of the mixture as a whole.

In the embodiment of the present invention in which the liquid-crystal media comprise one or more compounds selected from the group of the compounds of the formulae IIA and IIB, the further compounds are preferably employed as follows.

The compounds selected from the group of the compounds of the formulae IIA and IIB are preferably used in a total concentration of 1% to 30%, more preferably 2% to 20%, even more preferably 3% to 18% and very preferably 4% to 16%, of the mixture as a whole.

The compounds of the formula IV are preferably used in a total concentration of 1% to 20%, more preferably 2% to 15%, even more preferably 3% to 12% and very preferably 5% to 10%, of the mixture as a whole.

The liquid-crystal media preferably comprise, more preferably predominantly consist of and very preferably completely consist of in total 70% to 100%, more preferably 80% to 100% and very preferably 90% to 100% and in particular 95% to 100%, of the compounds of the formulae IA, IB, IIA, IIB and IV to IX, preferably of the formulae IA, IB, IIA, IIB and IV.

In the embodiment of the present invention in which the liquid-crystal media comprise one or more compounds selected from the group of the compounds of the formulae IIIA and IIIB, the further compounds are preferably employed as follows.

The compounds selected from the group of the compounds of the formulae IIIA and IIIB are preferably used in a total concentration of 1% to 60%, more preferably 5% to 55%, even more preferably 7% to 50% and very preferably 10% to 45%, of the mixture as a whole.

If the liquid-crystal media comprise only one or more compounds of the formula IIIA, but no compounds of the formula IIIB, the compounds of the formula IIIA are preferably used in a total concentration of 10% to 60%, more preferably 20% to 55%, even more preferably 30% to 50% and very preferably 35% to 45%, of the mixture as a whole.

If the liquid-crystal media comprise only one or more compounds of the formula IIIB, but no compounds of the formula IIIA, the compounds of the formula IIIB are preferably used in a total concentration of 5% to 45%, more preferably 10% to 40%, even more preferably 15% to 35% and very preferably 20% to 30%, of the mixture as a whole.

If the liquid-crystal media comprise both one or more compounds of the formula IIIA and one or more compounds of the formula IIIB, the compounds of the formula IIIA are preferably used in a total concentration of 5% to 50%, more preferably 10% to 45%, even more preferably 15% to 30% and very preferably 20% to 25%, of the mixture as a whole and the compounds of the formula IIIB are preferably used in a total concentration of 1% to 35%, more preferably 5% to 30%, even more preferably 7% to 25% and very preferably 10% to 20%, of the mixture as a whole.

The compounds of the formula IV are preferably used in a total concentration of 1% to 20%, more preferably 2% to 15%, even more preferably 3% to 12% and very preferably 5% to 10%, of the mixture as a whole.

The liquid-crystal media preferably comprise, more preferably predominantly consist of and very preferably completely consist of in total 70% to 100%, more preferably 80% to 100% and very preferably 90% to 100% and in particular 95% to 100%, of the compounds of the formulae IA, IB, IIIA, IIIB and IV to IX, preferably of the formulae IA, IB, IIIA and/or IIIB.

In a particularly preferred embodiment of the present invention, the liquid-crystalline media comprise one or more compounds of the formula V and one or more compounds of the formula VI.

In a further particularly preferred embodiment of the present invention, the liquid-crystalline media comprise one or more compounds of the formula V and one or more compounds of the formula VII.

The liquid-crystalline media in accordance with the present invention likewise preferably comprise one or more compounds of the formula V, one or more compounds of the formula VI and one or more compounds of the formula VIII.

If the liquid-crystalline media in accordance with the present application comprise one or more compounds of the formula V, the concentration of these compounds is preferably in total 10 to 30%, preferably 15 to 25% and particularly preferably 18 to 22%.

If the liquid-crystalline media in accordance with the present application comprise one or more compounds of the formula VI, the concentration of these compounds is preferably in total 15 to 35%, preferably 18 to 30% and particularly preferably 22 to 26%.

If the liquid-crystalline media in accordance with the present application comprise one or more compounds of the formula VII, the concentration of these compounds is preferably in total 4 to 25%, preferably 8 to 20% and particularly preferably 10 to 14%.

If the liquid-crystalline media in accordance with the present application comprise one or more compounds of the formula VIII, the concentration of these compounds is preferably in total 15 to 35%, preferably 18 to 30% and particularly preferably 22 to 26%.

If the liquid-crystalline media in accordance with the present application comprise one or more compounds of the formula IX, the concentration of these compounds is preferably in total 5 to 25%, preferably 10 to 20% and particularly preferably 13 to 17%.

In the present application, the expression dielectrically positive describes compounds or components where $\Delta\varepsilon > 3.0$, dielectrically neutral describes those where $-1.5 \leq \Delta\varepsilon \leq 3.0$ and dielectrically negative describes those where $\Delta\varepsilon < -1.5$. $\Delta\varepsilon$ is determined at a frequency of 1 kHz and at 20° C. The dielectric anisotropy of the respective compound is determined from the results of a solution of 10% of the respective individual compound in a nematic host mixture. If the solubility of the respective compound in the host mixture is less than 10%, the concentration is reduced to 5%. The capacitances of the test mixtures are determined both in a cell having homeotropic alignment and in a cell having homogeneous alignment. The cell thickness of both types of cells is approximately 20 µm. The voltage applied is a rectangular wave having a frequency of 1 kHz and an effective value of typically 0.5 V to 1.0 V, but it is always selected to be below the capacitive threshold of the respective test mixture.

The following definitions apply here.

$$\Delta\varepsilon \equiv (\varepsilon_{\parallel} - \varepsilon_{\perp}) \text{ and}$$

$$\varepsilon_{average} \equiv (\varepsilon_{\parallel} + 2\varepsilon_{\perp})/3.$$

The host mixture used for dielectrically positive compounds is mixture ZLI-4792 and that used for dielectrically neutral and dielectrically negative compounds is mixture ZLI-3086, both from Merck KGaA, Germany. The absolute values of the dielectric constants of the compounds are determined from the change in the respective values of the host mixture on addition of the compounds of interest. The values are extrapolated to a concentration of the compounds of interest of 100%.

Components having a nematic phase at the measurement temperature of 20° C. are measured as such, all others are treated like compounds.

The expression threshold voltage in the present application refers to the optical threshold and is quoted for 10% relative contrast ($V_{10}$), and the expression saturation voltage refers to the optical saturation and is quoted for 90% relative contrast ($V_{90}$), in both cases unless expressly stated otherwise. The capacitive threshold voltage ($V_0$), also called the Freedericks threshold ($V_{Fr}$), is only used if expressly mentioned.

The parameter ranges indicated in this application all include the limit values, unless expressly stated otherwise.

The different upper and lower limit values indicated for various ranges of properties in combination with one another give rise to additional preferred ranges.

Throughout this application, the following conditions and definitions apply, unless expressly stated otherwise. All concentrations are quoted in percent by weight and relate to the respective mixture as a whole, all temperatures are quoted in degrees Celsius and all temperature differences are quoted in differential degrees. All physical properties are determined in accordance with "Merck Liquid Crystals, Physical Properties of Liquid Crystals", Status November 1997, Merck KGaA, Germany, and are quoted for a temperature of 20° C., unless expressly stated otherwise. The optical anisotropy ($\Delta n$) is determined at a wavelength of 589.3 nm. The dielectric anisotropy ($\Delta\varepsilon$) is determined at a frequency of 1 kHz. The threshold voltages, as well as all other electro-optical properties, are determined using test cells produced at Merck KGaA, Germany. The test cells for the determination of $\Delta\varepsilon$ have a cell thickness of approximately 20 µm. The electrode is a circular ITO electrode having an area of 1.13 cm$^2$ and a guard ring. The orientation layers are SE-1211 from Nissan Chemicals, Japan, for homeotropic orientation ($\varepsilon_{\parallel}$) and polyimide AL-1054 from Japan Synthetic Rubber, Japan, for homogeneous orientation ($\varepsilon_{\perp}$). The capacitances are determined using a Solatron 1260 frequency response analyser using a sine wave with a voltage of 0.3 $V_{rms}$.

The light used in the electro-optical measurements is white light. A set-up using a commercially available DMS instrument from Autronic-Melchers, Germany, is used here. The characteristic voltages have been determined under perpendicular observation. The threshold ($V_{10}$), mid-grey ($V_{50}$) and saturation ($V_{90}$) voltages have been determined for 10%, 50% and 90% relative contrast, respectively.

The liquid-crystalline media are investigated with respect to their properties in the microwave frequency region as described in A. Penirschke et al., "Cavity Perturbation Method for Characterisation of Liquid Crystals up to 35 GHz", 34$^{th}$ European Microwave Conference—Amsterdam, pp. 545-548. Compare in this respect also A. Gaebler et al., "Direct Simulation of Material Permittivities . . . ", 12MTC 2009—International Instrumentation and Measurement Technology Conference, Singapore, 2009 (IEEE), pp. 463-467, and DE 10 2004 029 429 A, in which a measurement method is likewise described in detail.

The liquid crystal is introduced into a cylindrical polytetrafluoroethylene (PTFE) or quartz capillary. The capillary has an internal radius of 180 μm and an external radius of 350 μm. The effective length is 2.0 cm. The filled capillary is introduced into the centre of the cylindrical cavity with a resonance frequency of 19 GHz. This cavity has a length of 11.5 mm and a radius of 6 mm. The input signal (source) is then applied, and the result of the output signal is recorded using a commercial vector network analyser. For other frequencies, the dimensions of the cavity are adapted correspondingly.

The change in the resonance frequency and the Q factor between the measurement with the capillary filled with the liquid crystal and the measurement without the capillary filled with the liquid crystal is used to determine the dielectric constant and the loss angle at the corresponding target frequency by means of equations 10 and 11 of the above-mentioned publication A. Penirschke et al., "Cavity Perturbation Method for Characterisation of Liquid Crystals up to 35 GHz", 34$^{th}$ European Microwave Conference—Amsterdam, pp. 545-548, as described therein.

The values for the components of the properties perpendicular and parallel to the director of the liquid crystal are obtained by alignment of the liquid crystal in a magnetic field. To this end, the magnetic field of a permanent magnet is used. The strength of the magnetic field is 0.35 tesla. The alignment of the magnet is set correspondingly and then rotated correspondingly through 90°.

Preferred components are phase shifters, varactors, wireless and radio wave antenna arrays, matching circuit adaptive filters and others.

In the present application, the term compounds is taken to mean both one compound and a plurality of compounds, unless expressly stated otherwise.

The liquid-crystal media according to the invention preferably have nematic phases of in each case at least from −20° C. to 80° C., preferably from −30° C. to 85° C. and very particularly preferably from −40° C. to 100° C. The phase particularly preferably extends to 120° C. or more, preferably to 140° C. or more and very particularly preferably to 160° C. or more. The expression have a nematic phase here means on the one hand that no smectic phase and no crystallisation are observed at low temperatures at the corresponding temperature and on the other hand that no clearing occurs on heating from the nematic phase. The investigation at low temperatures is carried out in a flow viscometer at the corresponding temperature and checked by storage in test cells having a layer thickness of 5 μm for at least 100 hours. At high temperatures, the clearing point is measured in capillaries by conventional methods.

Furthermore, the liquid-crystal media according to the invention are characterised by high optical anisotropies in the visible region. The birefringence at 589 nm is preferably 0.20 or more, particularly preferably 0.25 or more, particularly preferably 0.30 or more, particularly preferably 0.40 or more and very particularly preferably 0.45 or more. In addition, the birefringence is preferably 0.80 or less.

In a preferred embodiment of the present invention, the liquid-crystal media employed have positive dielectric anisotropy ($\Delta\varepsilon$). This is preferably 1.8 or more and 15.0 or less, more preferably between 2.0 or more and 10.0 or less, particularly preferably between 3.0 or more and 8.0 or less and very particularly preferably between 3.5 or more and 6.0 or less.

If the liquid-crystal media employed have negative dielectric anisotropy ($\Delta\varepsilon$), this is preferably less than or equal to −2.5, particularly preferably less than or equal to −4.0 and very particularly preferably less than or equal to −5.0.

In this preferred embodiment of the present invention, in which the liquid-crystal media employed have negative dielectric anisotropy ($\Delta\varepsilon$), the value thereof is preferably between 1.5 or more and 15.0 or less, particularly preferably between 1.8 or more and 12.0 or less and very particularly preferably between 2.0 or more and 10.0 or less.

Furthermore, the liquid-crystal media according to the invention are characterised by high anisotropies in the microwave region and/or millimeter wave region. The birefringence is, for example, preferably 0.14 or more, particularly preferably 0.15 or more, particularly preferably 0.20 or more, particularly preferably 0.25 or more and very particularly preferably 0.30 or more, at about 8.3 GHz. In addition, the birefringence is preferably 0.80 or less.

The dielectric anisotropy in the microwave region is defined as $$\Delta\varepsilon_r \equiv (\varepsilon_{r,\|} - \varepsilon_{r,\perp}).$$

The tunability ($\tau$) is defined as $$\tau \equiv (\Delta\varepsilon_r / \varepsilon_{r,\|}).$$

The material quality ($\eta$) is defined as $$\eta \equiv (\tau / \tan \delta_{\varepsilon,r,max}), \text{ where}$$

the maximum dielectric loss is $$\tan \delta_{\varepsilon r,max} \equiv \max.\{\tan \delta_{\varepsilon r,\perp}; \tan \delta_{\varepsilon r,\|}\}.$$

The material quality ($\eta$) of the preferred liquid-crystal materials is 6 or more, preferably 8 or more, preferably 10 or more, preferably 15 or more, preferably 17 or more, preferably 20 or more, particularly preferably 25 or more, very particularly preferably 30 and in particular 40 or more or even 50 or more.

In the corresponding components, the preferred liquid-crystal materials have phase shifter qualities of 15°/dB or more, preferably 20°/dB or more, preferably 30°/dB or more, preferably 40°/dB or more, preferably 50°/dB or more, particularly preferably 80°/dB or more and very particularly preferably 100°/dB or more.

In some embodiments, however, it is also possible to use liquid crystals having a negative value of the dielectric anisotropy.

The liquid crystals employed are either individual substances or mixtures. They preferably have a nematic phase.

The term "alkyl" preferably encompasses straight-chain and branched alkyl groups, as well as cycloalkyl groups, each having 1 to 15 carbon atoms, in particular the straight-chain groups methyl, ethyl, propyl, butyl, pentyl, hexyl and heptyl, as well as cyclopropyl and cyclohexyl. Groups having 2 to 10 carbon atoms are generally preferred.

The term "alkenyl" preferably encompasses straight-chain and branched alkenyl groups having 2 to 15 carbon atoms, in particular the straight-chain groups. Particularly preferred alkenyl groups are $C_2$- to $C_7$-1E-alkenyl, $C_4$- to $C_7$-3E-alkenyl, $C_5$- to $C_7$-4-alkenyl, $C_6$- to $C_7$-5-alkenyl and $C_7$-6-alkenyl, in particular $C_2$- to $C_7$-1E-alkenyl, $C_4$- to $C_7$-3E-alkenyl and $C_5$- to $C_7$-4-alkenyl. Examples of further preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably encompasses straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" or "alkoxyalkyl" preferably encompasses straight-chain radicals of the formula $C_nH_{2n+1}$—O—$(CH_2)_m$, in which n and m each, independently of one another, denote an integer from 1 to 10. Preferably, n here is 1 and m is 1 to 6.

Compounds containing a vinyl end group and compounds containing a methyl end group have low rotational viscosity.

In the present application, both high-frequency technology and hyperfrequency technology denote applications having frequencies in the range from 1 MHz to 100 THz, preferably from 1 GHz to 30 THz, more preferably 2 GHz to 10 THz, particularly preferably from about 5 GHz to 5 THz.

The liquid-crystal media in accordance with the present invention may comprise further additives and chiral dopants in the usual concentrations. The total concentration of these further constituents is in the range from 0% to 10%, preferably 0.1% to 6%, based on the mixture as a whole. The concentrations of the individual compounds used are each preferably in the range from 0.1% to 3%. The concentration of these and similar additives is not taken into consideration when quoting the values and concentration ranges of the liquid-crystal components and liquid-crystal compounds of the liquid-crystal media in this application.

The liquid-crystal media according to the invention consist of a plurality of compounds, preferably 3 to 30, more preferably 4 to 20 and very preferably 4 to 15 compounds. These compounds are mixed in a conventional manner. In general, the desired amount of the compound used in the smaller amount is dissolved in the compound used in the larger amount. If the temperature is above the clearing point of the compound used in the higher concentration, it is particularly easy to observe completion of the dissolution process. It is, however, also possible to prepare the media in other conventional ways, for example using so-called pre-mixes, which can be, for example, homologous or eutectic mixtures of compounds, or using so-called "multibottle" systems, the constituents of which are themselves ready-to-use mixtures.

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

In the present invention and especially in the following examples, the structures of the mesogenic compounds are indicated by means of abbreviations, also referred to as acronyms. In these acronyms, the chemical formulae are abbreviated as follows using Tables A to C below. All groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl, preferably 1E-alkenyl, having n, m and l C atoms respectively, where n, m and l, independently of one another, denote an integer from 1 to 9, preferably 1 to 7, or from 2 to 9, preferably 2 to 7, respectively. $C_oH_{2o+1}$ denotes straight-chain alkyl having 1 to 7, preferably 1 to 4, C atoms, or branched alkyl having 1 to 7, preferably 1 to 4, C atoms.

Table A lists the codes used for the ring elements of the core structures of the compounds, while Table B shows the linking groups. Table C gives the meanings of the codes for the left-hand or right-hand end groups. Table D shows illustrative structures of compounds with their respective abbreviations.

TABLE A

| Code | Ring elements |
|---|---|
| C | cyclohexane-1,4-diyl |
| P | 1,4-phenylene |
| D | 1,3-dioxane-2,5-diyl |
| DI | 1,3-dioxane-2,5-diyl (inverted) |
| A | tetrahydropyran-2,5-diyl |
| AI | tetrahydropyran-2,5-diyl (inverted) |
| G | 2-fluoro-1,4-phenylene |
| GI | 3-fluoro-1,4-phenylene |
| U | 2,3-difluoro-1,4-phenylene |
| UI | 3,5-difluoro-1,4-phenylene |

TABLE A-continued
| | Ring elements |
|---|---|
| Y | 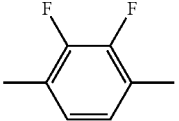 |
| fX | 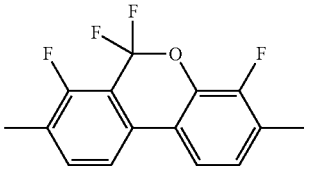 |
| fXI | 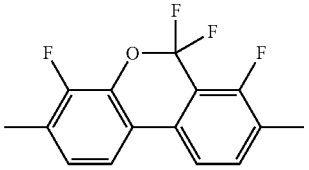 |
| M | 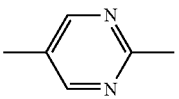 |
| MI | 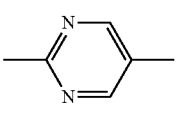 |
| N | 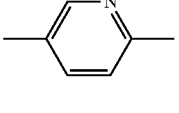 |
| NI | 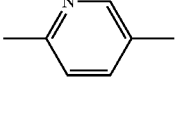 |
| fN | 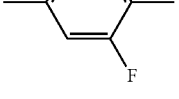 |
| fNI | 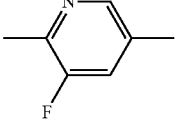 |
| dH | 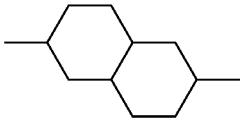 |
| N(2,6) | 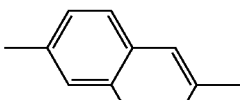 |
| N(1,4) | 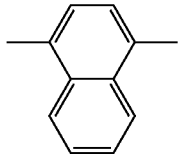 |
| N3f | 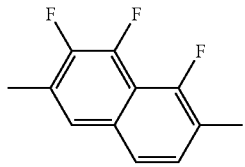 |
| N3fI | 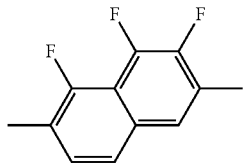 |
| tH | 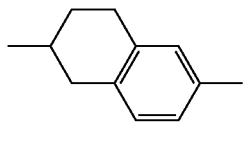 |
| tHI | 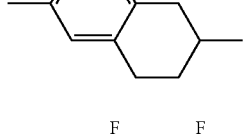 |
| tH2f | 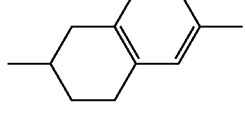 |
| tH2fI | 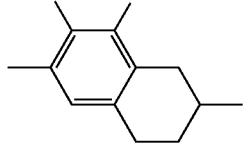 |
| K | 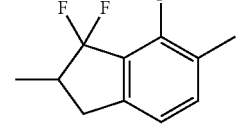 |
| KI |  |

TABLE A-continued

| Ring elements | |
|---|---|
| L | (cyclohexene, 1,4-disubstituted) |
| LI | (cyclohexene, 1,4-disubstituted isomer) |
| F | (fluoro-cyclohexene) |
| FI | (fluoro-cyclohexene isomer) |
| P(o) | phenyl with $C_oH_{2o+1}$ |
| PI(o) | phenyl with $C_oH_{2o+1}$ (isomer) |
| P(i3) | phenyl with isopropyl |
| PI(c3) | phenyl with isopropyl (isomer) |
| P(t4) | phenyl with tert-butyl |
| PI(t4) | phenyl with tert-butyl (isomer) |

TABLE A-continued

| Ring elements | |
|---|---|
| P(c3) | phenyl with cyclopropyl |
| PI(c3) | phenyl with cyclopropyl (isomer) |
| P(c4) | phenyl with cyclobutyl |
| PI(c4) | phenyl with cyclobutyl (isomer) |
| P(c5) | phenyl with cyclopentyl |
| PI(c5) | phenyl with cyclopentyl (isomer) |
| P(e5) | phenyl with cyclopentenyl |
| PI(e5) | phenyl with cyclopentenyl (isomer) |

TABLE A-continued
| Ring elements | |
|---|---|
| P(c6) | 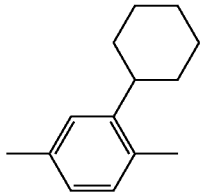 |
| PI(c6) | 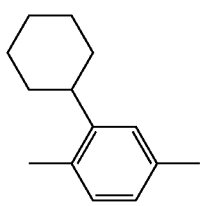 |
| P(e6) | 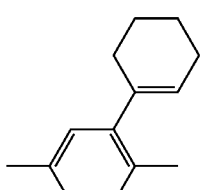 |
| PI(e6) | 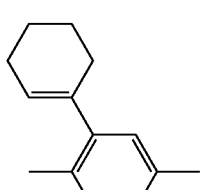 |
| P(o,5F) | 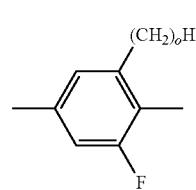<br>o ∈ {1;2;3;4;5;6} |
| PI(o,5F) | 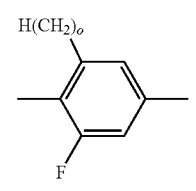<br>o ∈ {1;2;3;4;5;6} |
| P(o,6F) | 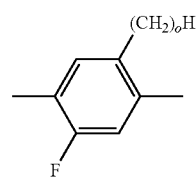<br>o ∈ {1;2;3;4;5;6} |
TABLE A-continued
| Ring elements | |
|---|---|
| PI(o,6F) | 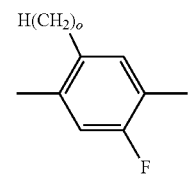<br>o ∈ {1;2;3;4;5;6} |
| GI(o) | 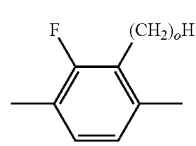<br>o ∈ {1;2;3;4;5;6} |
| G(o) | 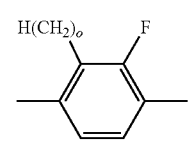<br>o ∈ {1;2;3;4;5;6} |
| GI(i3) | 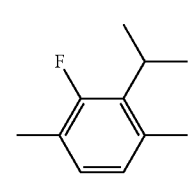 |
| G(i3) | 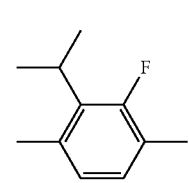 |
| GI(t4) | 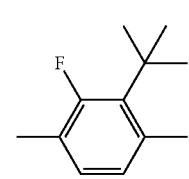 |
| G(t4) | 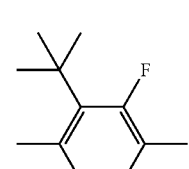 |
| GI(c3) | 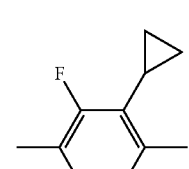 |

TABLE A-continued
Ring elements
G(c3) 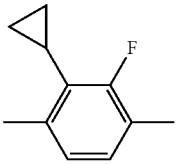
GI(c4) 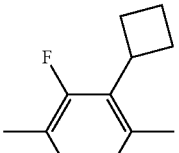
G(c4) 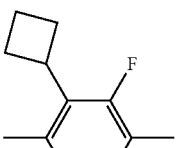
GI(c5) 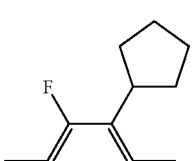
G(c5) 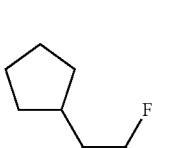
GI(e5) 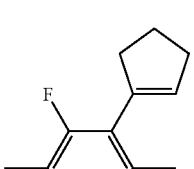
G(e5) 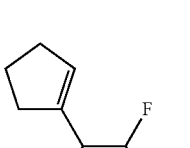
GI(c6) 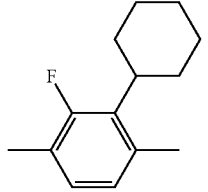
G(c6) 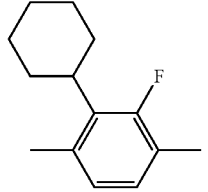
GI(e6) 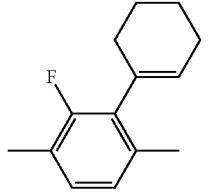
G(e6) 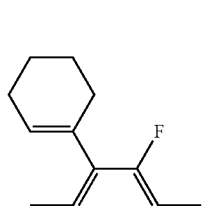
TABLE B
Linking groups
| | | | |
|---|---|---|---|
| E | —CH₂CH₂— | Z | —CO—O— |
| V | —CH=CH— | ZI | —O—CO— |
| X | —CF=CH— | O | —CH₂—O— |
| XI | —CH=CF— | OI | —O—CH₂— |
| B | —CF=CF— | Q | —CF₂—O— |
| T | —C≡C— | QI | —O—CF₂— |
| W | —CF₂CF₂— | | |

TABLE C

End groups

| Left-hand side | | Right-hand side | |
|---|---|---|---|
| Use alone | | | |
| -n- | $C_nH_{2n+1}$— | -n | —$C_nH_{2n+1}$ |
| -nO- | $C_nH_{2n+1}$—O— | -nO | —O—$C_nH_{2n+1}$ |
| -V- | $CH_2$=CH— | -V | —CH=$CH_2$ |
| -nV- | $C_nH_{2n+1}$—CH=CH— | -nV | —$C_nH_{2n}$—CH=$CH_2$ |
| -Vn- | $CH_2$=CH—$C_nH_{2n+1}$— | -Vn | —CH=CH—$C_nH_{2n+1}$ |
| -nVm- | $C_nH_{2n+1}$—CH=CH—$C_mH_{2m}$— | -nVm | —$C_nH_{2n}$—CH=CH—$C_mH_{2m+1}$ |
| -N- | N≡C— | -N | —C≡N |
| -S- | S=C=N— | -S | —N=C=S |
| -F- | F— | -F | —F |
| -CL- | Cl— | -CL | —Cl |
| -M- | $CFH_2$— | -M | —$CFH_2$ |
| -D- | $CF_2H$— | -D | —$CF_2H$ |
| -T- | $CF_3$— | -T | —$CF_3$ |
| -MO- | $CFH_2O$— | -OM | —$OCFH_2$ |
| -DO- | $CF_2HO$— | -OD | —$OCF_2H$ |
| -TO- | $CF_3O$— | -OT | —$OCF_3$ |
| -OXF- | $CF_2$=CH—O— | -OXF | —O—CH=$CF_2$ |
| -A- | H—C≡C— | -A | —C≡C—H |
| -nA- | $C_nH_{2n+1}$—C≡C— | -An | —C≡C—$C_nH_{2n+1}$ |
| -NA- | N≡C—C≡C— | -AN | —C≡C—C≡N |
| Use together with others | | | |
| -...A...- | —C≡C— | -...A... | —C≡C— |
| -...V...- | —CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | in which n and m each denote integers, and the three dots "..." are placeholders for the abbreviations from this table.

The following table shows illustrative structures together with their respective abbreviations. These are shown in order to illustrate the meaning of the rules for the abbreviations. They furthermore represent compounds which are preferably used.

TABLE D

Illustrative structures
The illustrative structures show compounds which are particularly preferably employed.

Examples of compounds of component A

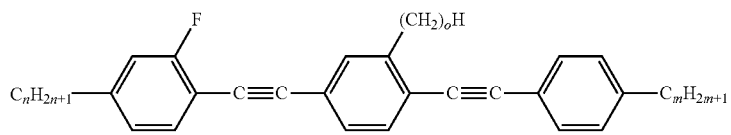

GTP(o)TP-n-m, o ∋ {1;2;3;4;5;6}, bevorzugt o = 1 oder 2

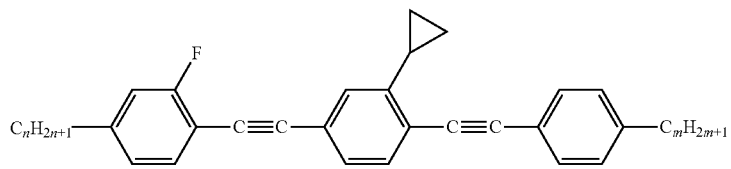

GTP(c3)TP-n-m

TABLE D-continued
Illustrative structures
The illustrative structures show compounds which are particularly preferably employed.
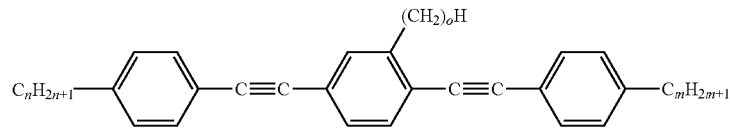
PTP(o)TP-n-m, o ∋ {1;2;3;4;5;6}
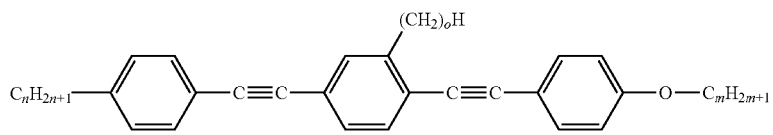
PTP(o)TP-n-Om, o ∋ {1;2;3;4;5;6}
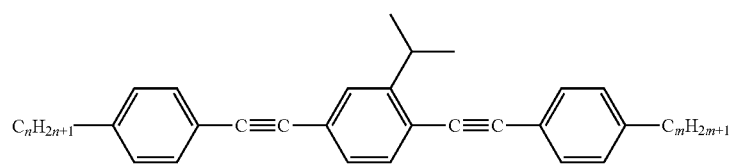
PTP(i3)TP-n-m
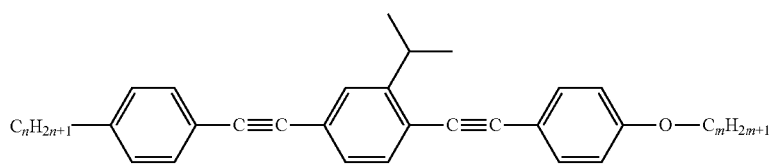
PTP(i3)TP-n-Om
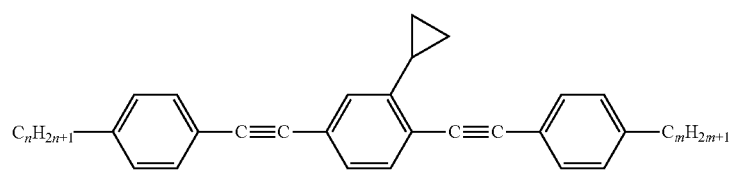
PTP(c3)TP-n-m
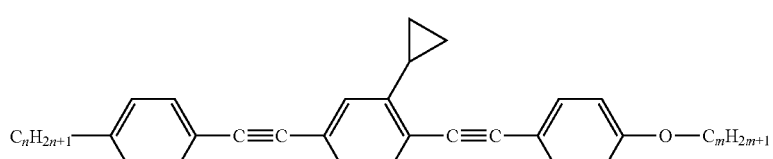
PTP(c3)TP-n-Om TABLE D-continued
Illustrative structures
The illustrative structures show compounds which are particularly preferably employed.
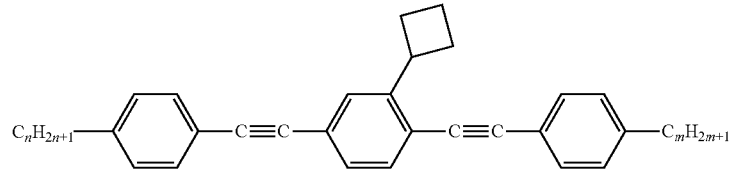
PTP(c4)TP-n-m
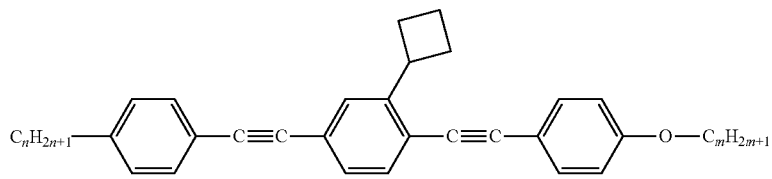
PTP(c4)TP-n-Om
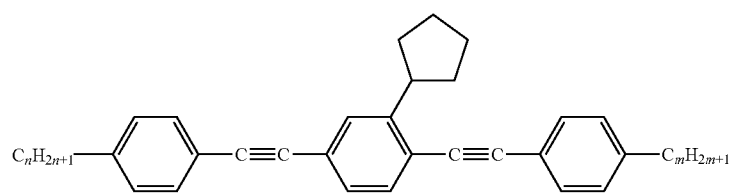
PTP(c5)TP-n-m
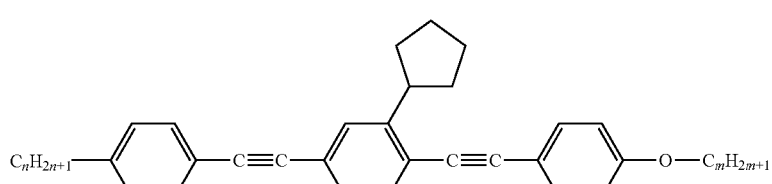
PTP(c5)TP-n-Om
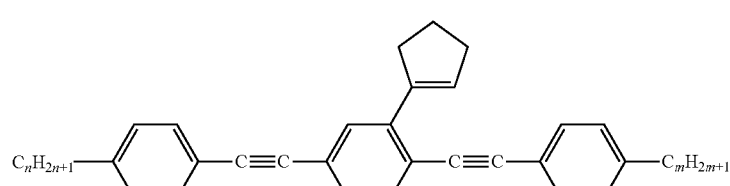
PTP(e5)TP-n-m
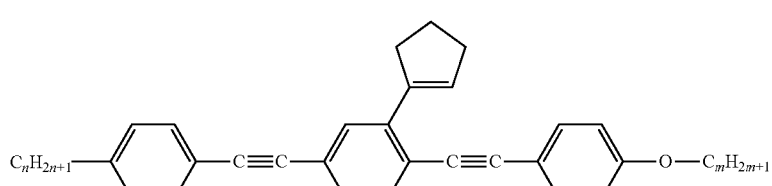
PTP(e5)TP-n-Om TABLE D-continued
Illustrative structures
The illustrative structures show compounds which are particularly preferably employed.
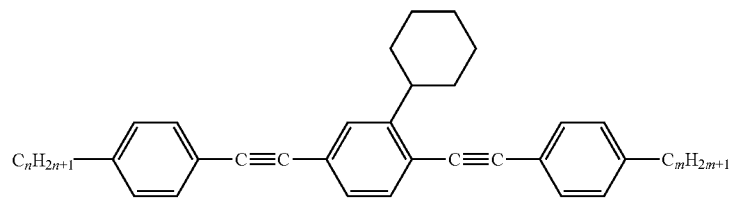
PTP(c6)TP-n-m
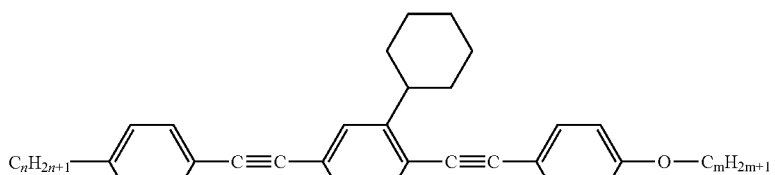
PTP(c6)TP-n-Om
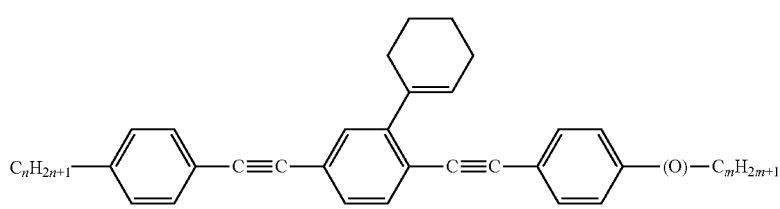
PTP(e6)TP-n-(O)m
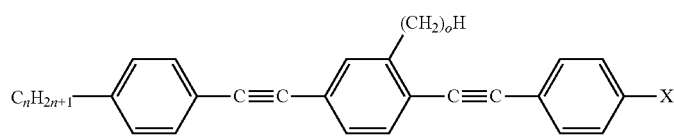
PTP(o)TP-n-X, X = F, Cl, o∋ {1;2;3;4;5;6}
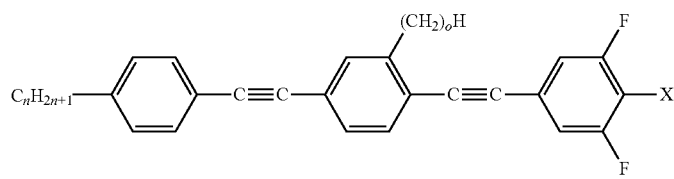
PTP(o)TU-n-X, X = F, Cl, o∈ [1;2;3;4;5;6]
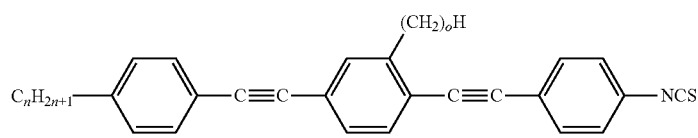
PTP(o)TP-n-S o∋ {1;2;3;4;5;6}

TABLE D-continued
Illustrative structures
The illustrative structures show compounds which are particularly preferably employed.
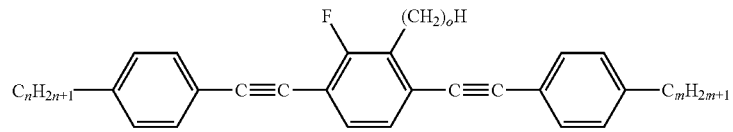
PTGI(o)TP-n-m, o ∋ {1;2;3;4;5;6}
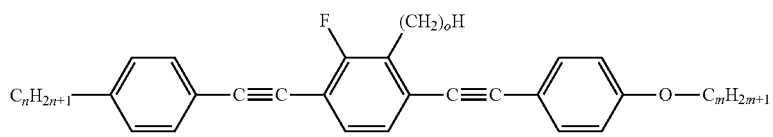
PGI(o)TP-n-Om, o ∋ {1;2;3;4;5;6}
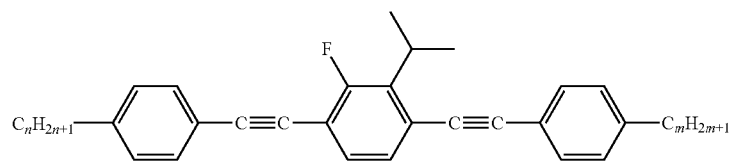
PTGI(i3)TP-n-m
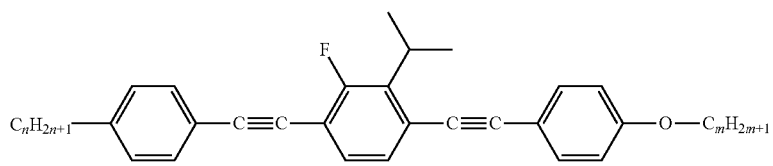
PTGI(i3)TP-n-Om
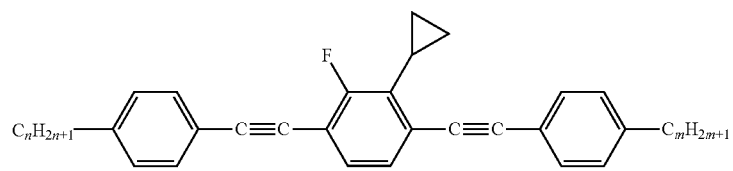
PTGI(c3)TP-n-m
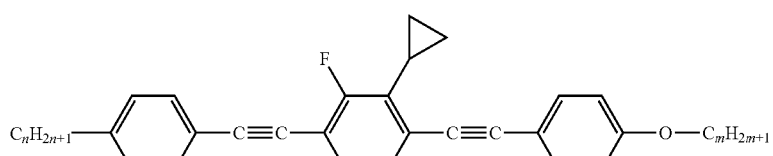
PTGI(c3)TP-n-Om TABLE D-continued
Illustrative structures
The illustrative structures show compounds which are particularly preferably employed.
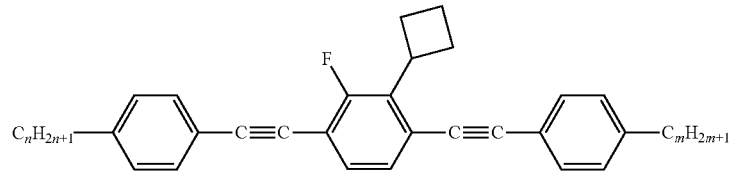
PTGI(c4)TP-n-m
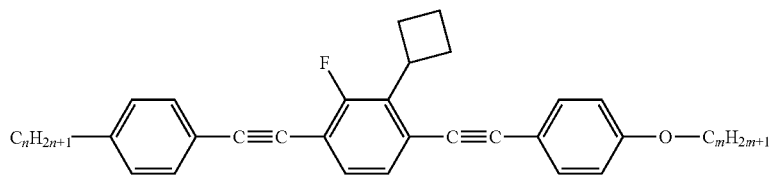
PTGI(c4)TP-n-Om
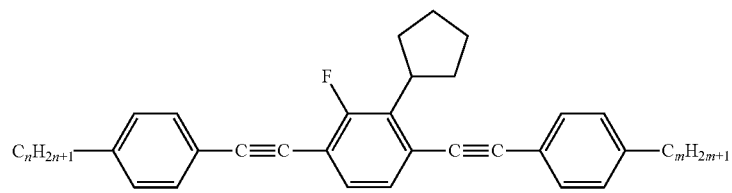
PTGI(c5)TP-n-m
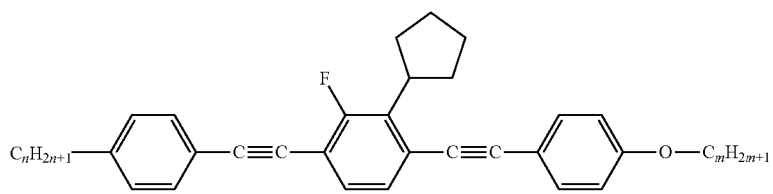
PTGI(c5)TP-n-Om
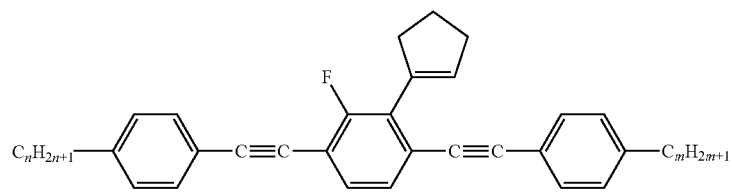
PTGI(e5)TP-n-m TABLE D-continued
Illustrative structures
The illustrative structures show compounds which are particularly preferably employed.
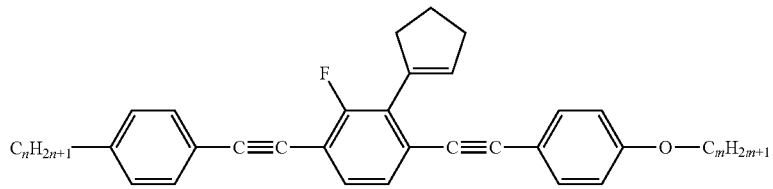
PTGI(e5)TP-n-Om
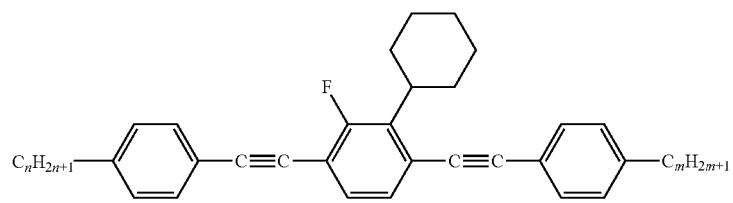
PTGI(c6)TP-n-m
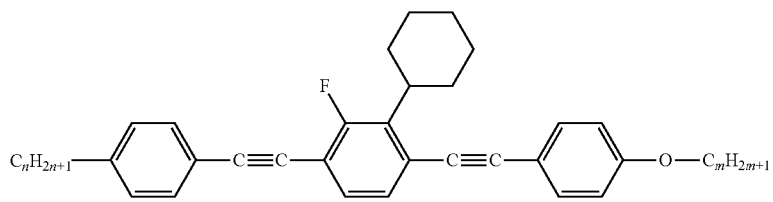
PTGI(c6)TP-n-Om
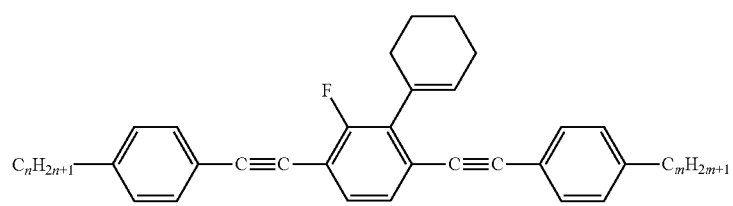
PTGI(e6)TP-n-m
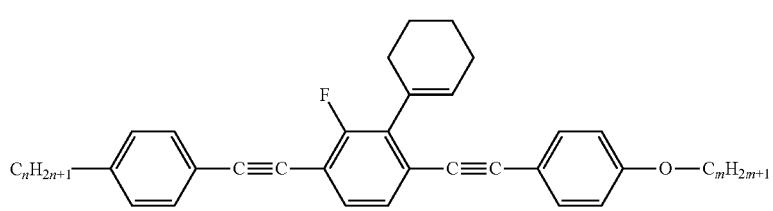
PTGI(c6)TP-n-Om TABLE D-continued
Illustrative structures
The illustrative structures show compounds which are particularly preferably employed.
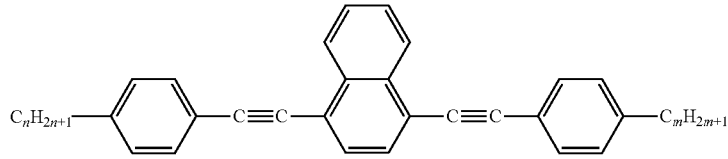
PTN(1,4)TP-n-m
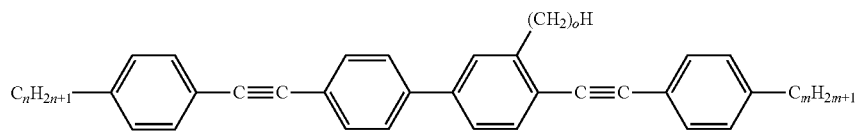
PTPP(o)TP-n-m, o ɜ {1;2;3;4;5;6}
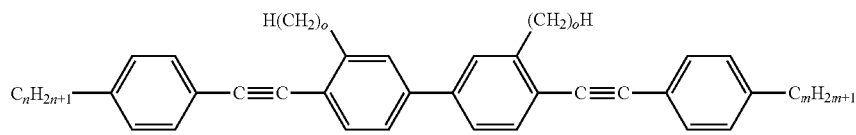
PTPI(o)P(o)TP-n-m, o ɜ {1;2;3;4;5;6}
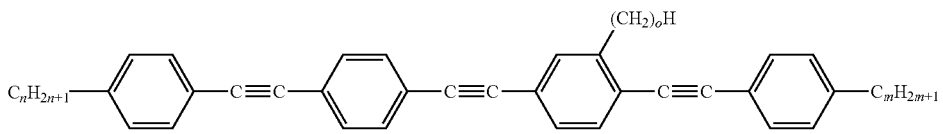
PTPTP(o)P-n-m, o ɜ {1;2;3;4;5;6}
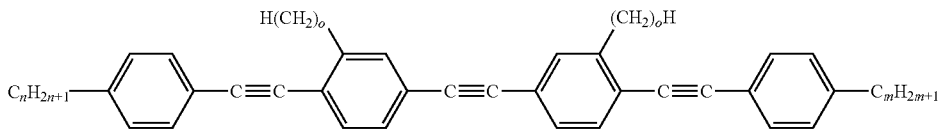
PTPI(o)TP(o)P-n-m, o ɜ {1;2;3;4;5;6}
(n ɜ {1;2;3;4;5;6;7} and m ɜ {1;2;3;4;5;6;7}.)
Examples of compounds of component B
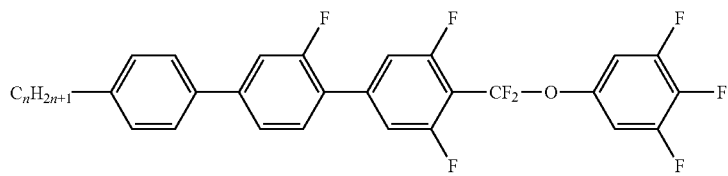
PGUQU-n-F
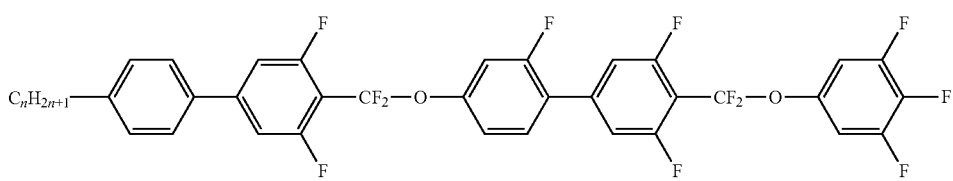
PUQGUQU-n-F TABLE D-continued
Illustrative structures
The illustrative structures show compounds which are particularly preferably employed.
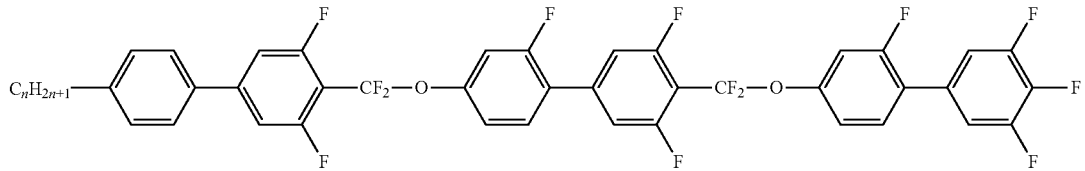
PUQGUQGU-n-F = PU[QGU]$_2$-n-F
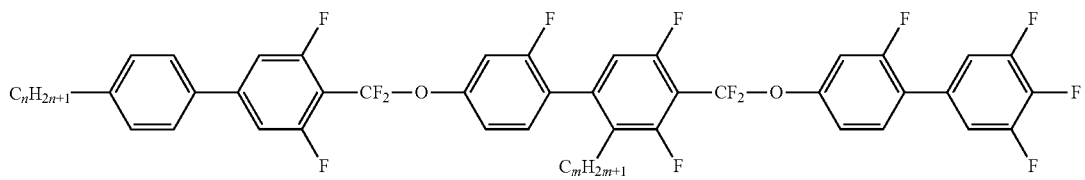
PUQGU(m)QGU-n-F = PU[QGU]$_2^{(m)}$-n-F
(n ∍ {1;2;3;4;5;6;7} and m ∍ {1;2;3;4}.)
Examples of compounds of component C
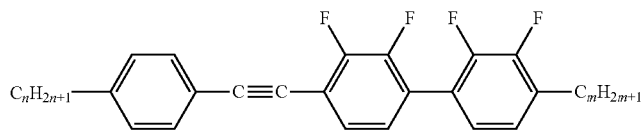
PTYY-n-m
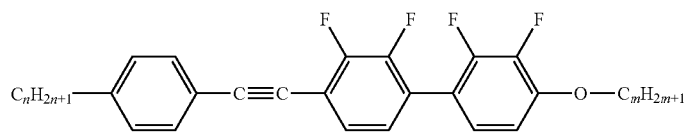
PTYY-n-Om
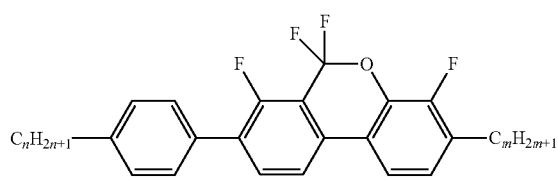
PfX-n-m
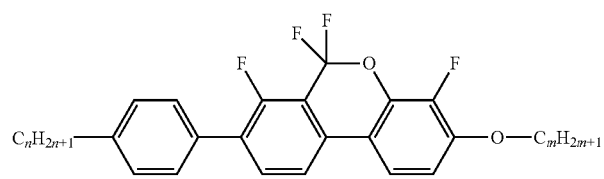
PfX-n-Om
(n ∍ {1;2;3;4;5;6;7} and m ∍ {1;2;3;4;5;6;7})

TABLE D-continued
*Illustrative structures*
*The illustrative structures show compounds which are particularly preferably employed.*
Examples of compounds of component E
Compounds having three 6-membered rings
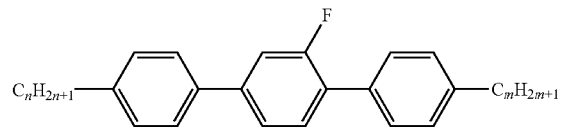
PGP-n-m
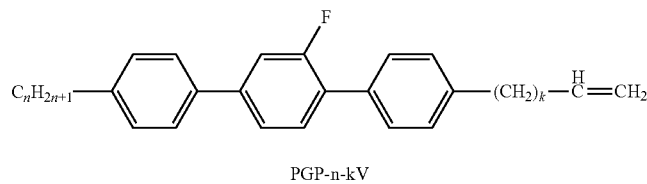
PGP-n-kV
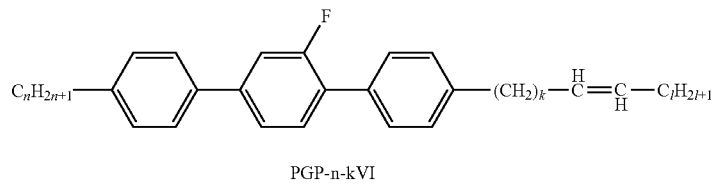
PGP-n-kVI
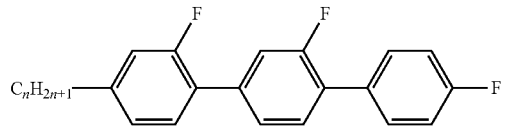
GGP-n-F
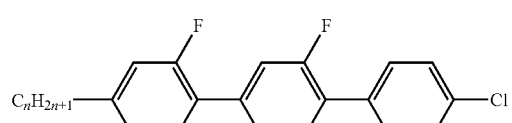
GGP-n-CL
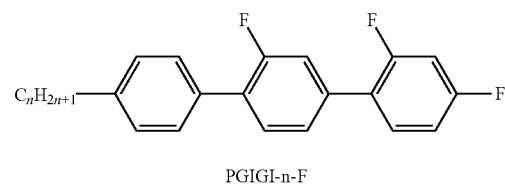
PGIGI-n-F TABLE D-continued
Illustrative structures
The illustrative structures show compounds which are particularly preferably employed.
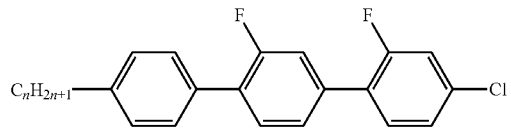
PGIGI-n-CL
(n ∋ {1;2;3;4;5;6;7}, m ∋ {1;2;3;4;5;6;7}, and k ∋ {0;1;2;3;4}, preferably 0 or 2, and l ∋ {0;1;2;3}.)
Compounds having four 6-membered rings
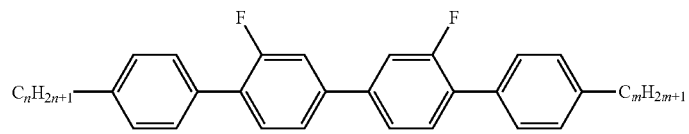
PGIGP-n-m
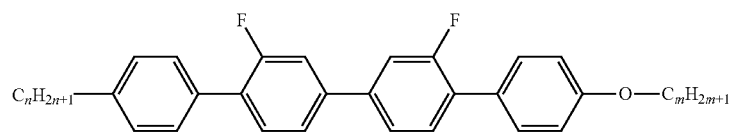
PGIGP-n-Om
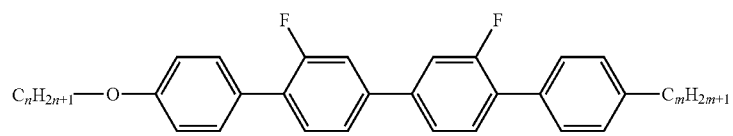
PGIGP-nO-m
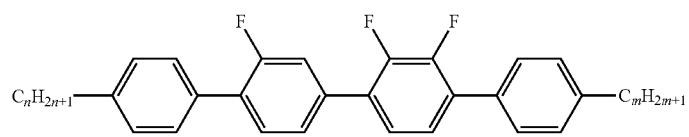
PGIYP-n-m
(n ∋ {1;2;3;4;5;6;7} and m ∋ {1;2;3;4;5;6;7})
Illustrative structures of polar compounds employed:
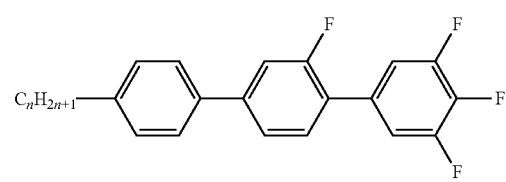
PGU-n-F TABLE D-continued
Illustrative structures
The illustrative structures show compounds which are particularly preferably employed.
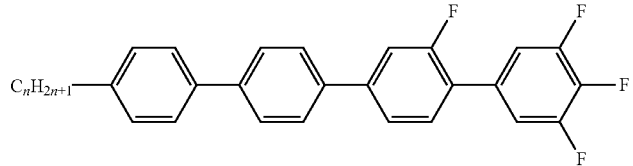
PPGU-n-F
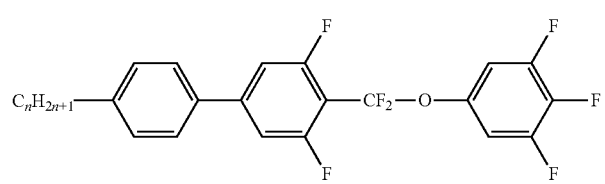
PUQU-n-F
(n ∋ {1;2;3;4;5;6;7}.)
Illustrative structures of further neutral compounds employed:
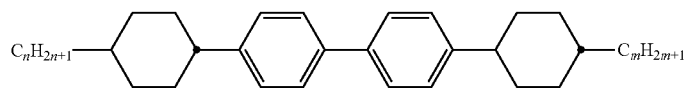
CPPC-n-m
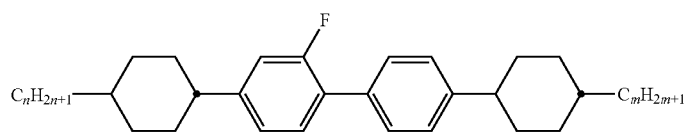
CGPC-n-m
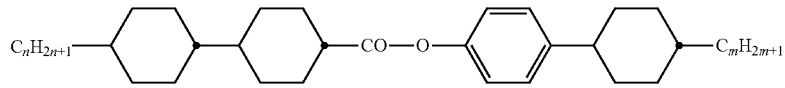
CCZPC-n-m
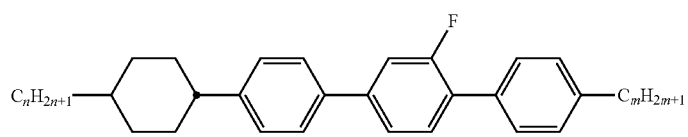
CPGP-n-m
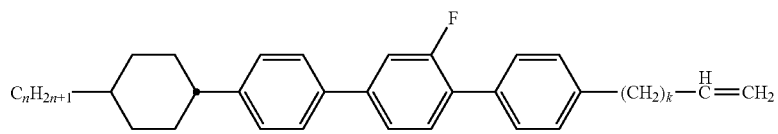
CPGP-n-kV TABLE D-continued
Illustrative structures
The illustrative structures show compounds which are particularly preferably employed.
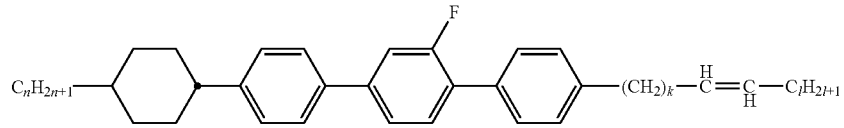
CPGP-n-kVI
(n ∈ {1;2;3;4;5;6;7}, m ∈ {1;2;3;4;5;6;7}, and k ∈ {0;1;2;3;4}, preferable 0 or 2, and l ∈ {0;1;2;3}.)
Illustrative structures of further polar compounds employed:
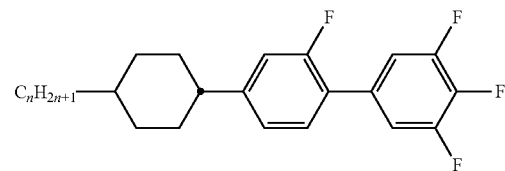
CGU-n-F
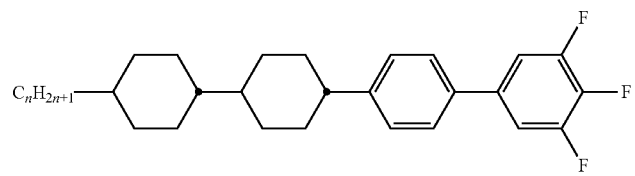
CCPU-n-F
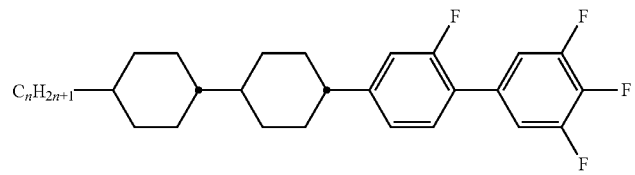
CCGU-n-F
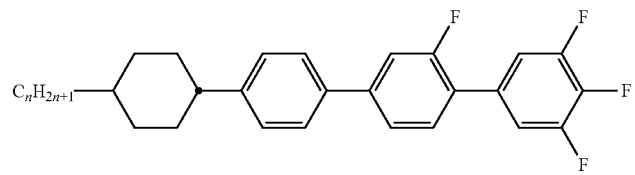
CPGU-n-F
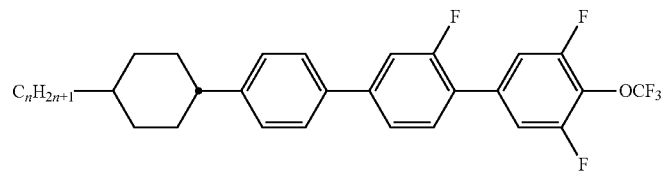
CPGU-n-OT
(n ∈ {1;2;3;4;5;6;7}.)

The following table, Table E, shows illustrative compounds which can be used as stabiliser in the mesogenic media in accordance with the present invention. The total concentration of these and similar compounds in the media is preferably 5% or less.
TABLE E
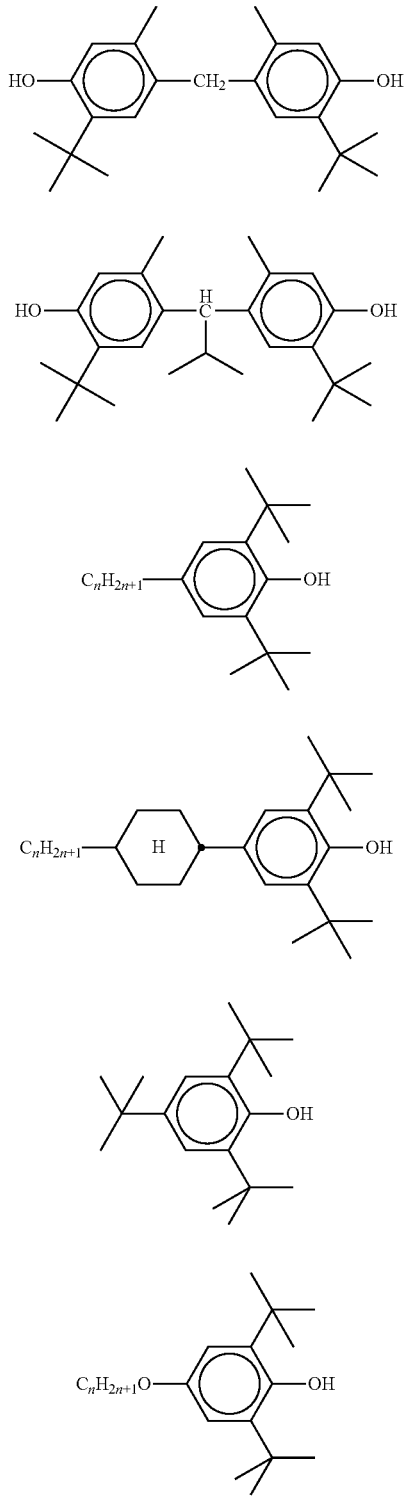
TABLE E-continued
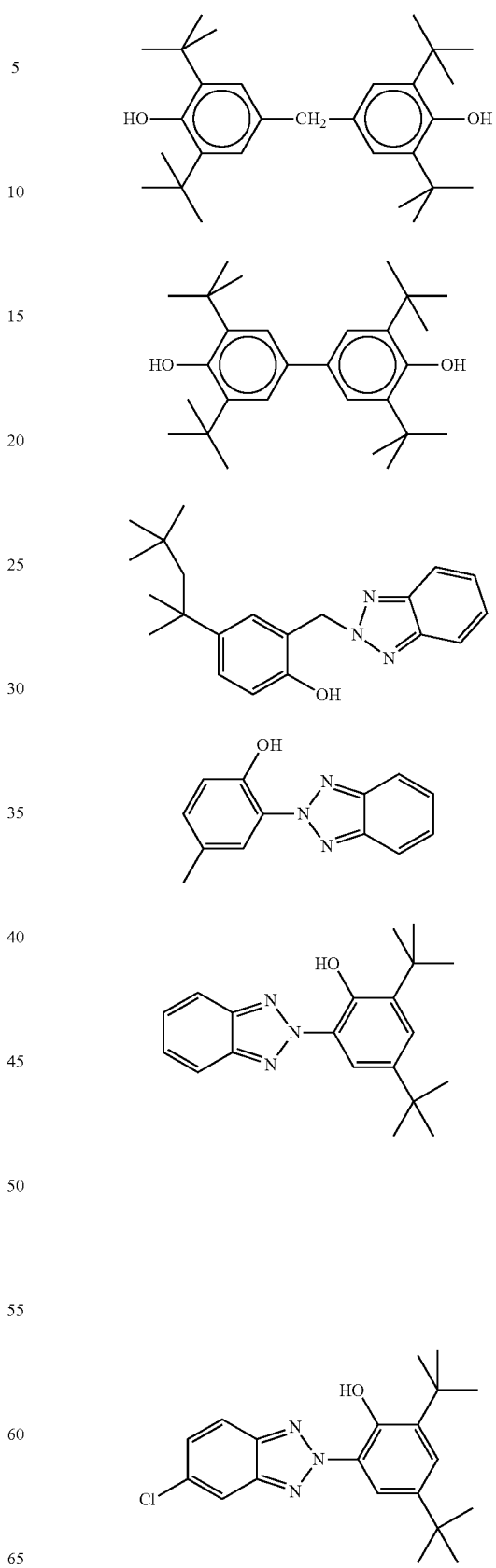

TABLE E-continued
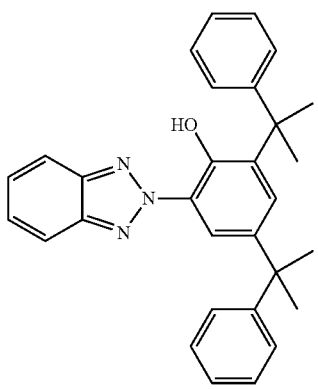 [SMILES: CC(C)(c1ccccc1)c1cc(-n2nc3ccccc3n2)c(O)c(C(C)(C)c2ccccc2)c1]
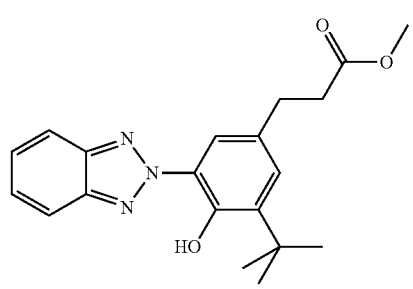 [SMILES: COC(=O)CCc1cc(-n2nc3ccccc3n2)c(O)c(C(C)(C)C)c1]
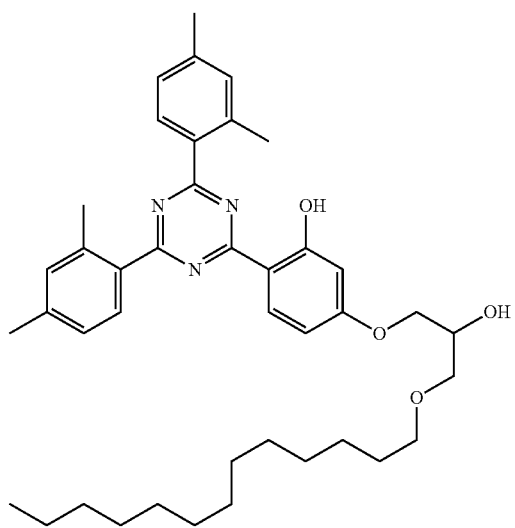 [SMILES: CCCCCCCCCCCCCOCC(O)COc1ccc(-c2nc(-c3ccc(C)cc3C)nc(-c3ccc(C)cc3C)n2)c(O)c1]
TABLE E-continued
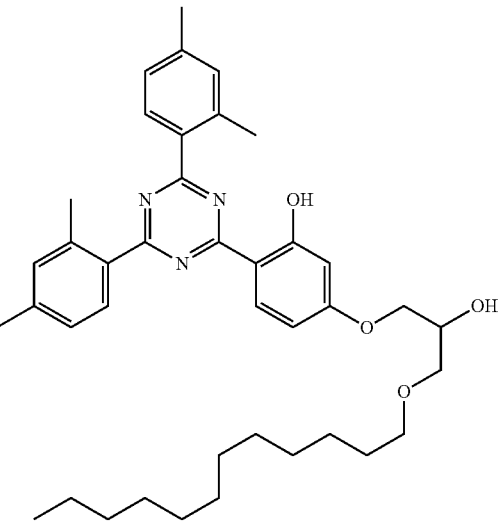
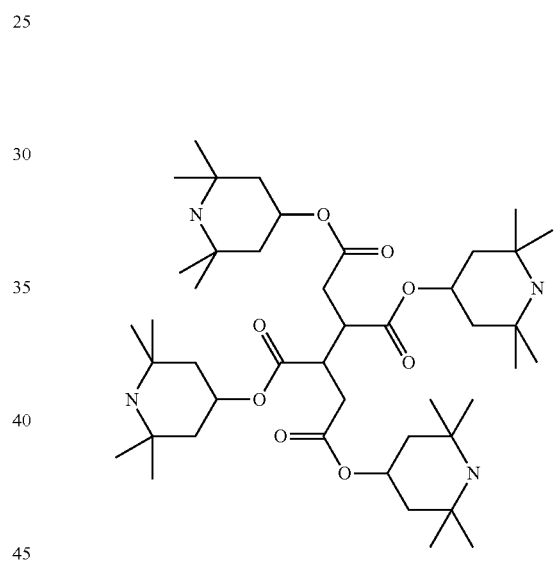
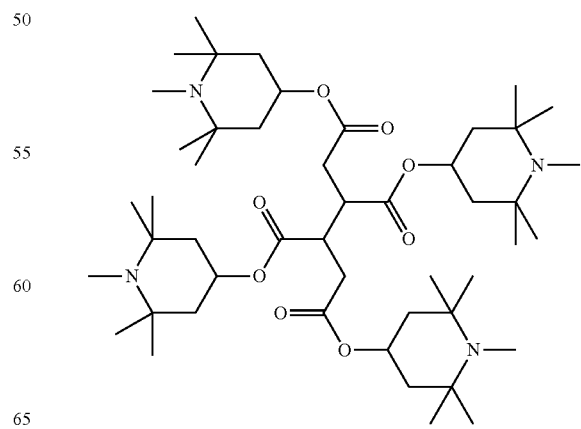

TABLE E-continued

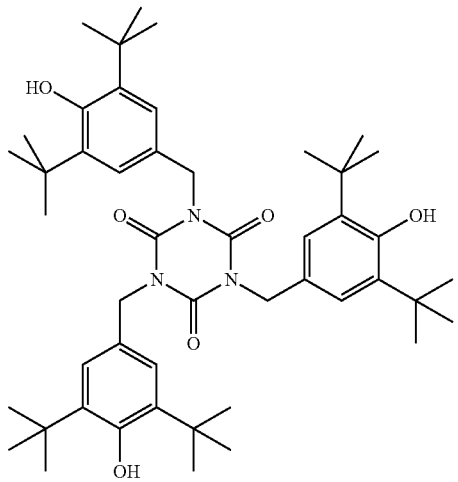 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

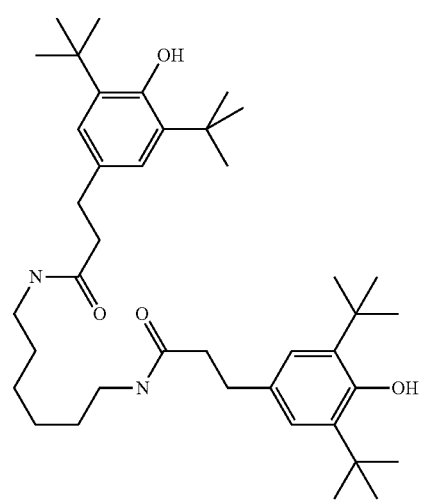 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]

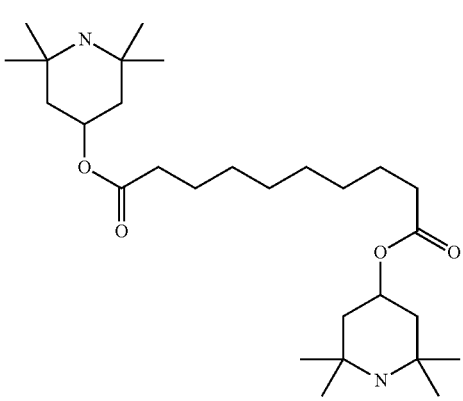

TABLE E-continued

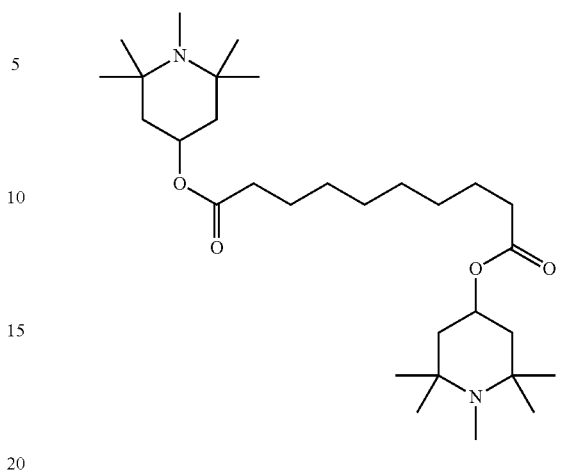

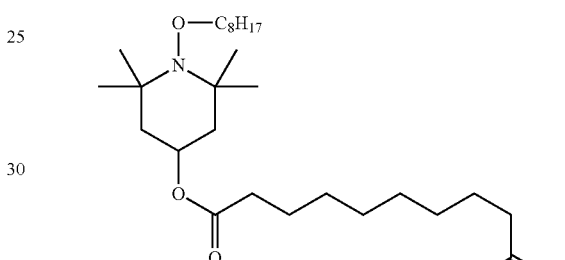

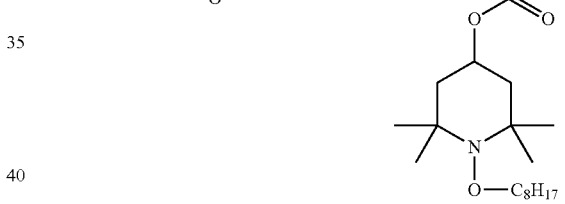

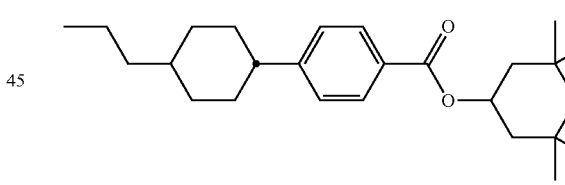

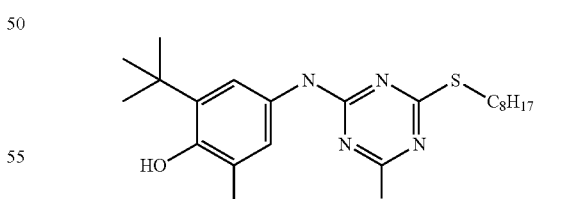

In a preferred embodiment of the present invention, the mesogenic media comprise one or more compounds selected from the group of the compounds from Table E.

The following table, Table F, shows illustrative compounds which can preferably be used as chiral dopants in the mesogenic media in accordance with the present invention.

TABLE F

| Structure | Label |
|---|---|
| C₂H₅–*CH(CH₃)–CH₂O–C₆H₄–C₆H₄–CN | C 15 |
| C₂H₅–*CH(CH₃)–CH₂–C₆H₄–C₆H₄–CN | CB 15 |
| C₆H₁₃–*CH(CH₃)–O–C₆H₄–C(=O)O–C₆H₄–C₅H₁₁ | CM 21 |
| C₃H₇–Cy–Cy–C₆H₄–CH₂–*CH(CH₃)–C₂H₅ | CM 44 |
| C₅H₁₁–C₆H₄–C₆H₄–C(=O)O–*CH(C₂H₅)–C₆H₅ | CM 45 |
| C₈H₁₇O–C₆H₄–C₆H₄–C(=O)O–*CH(C₂H₅)–C₆H₅ | CM 47 |
| Cholesteryl chloride | CC |
| Cholesteryl nonanoate | CN |
| C₆H₁₃O–C₆H₄–C(=O)O–C₆H₄–C(=O)O–*CH(CH₃)–C₆H₁₃ | R/S-811 |

TABLE F-continued

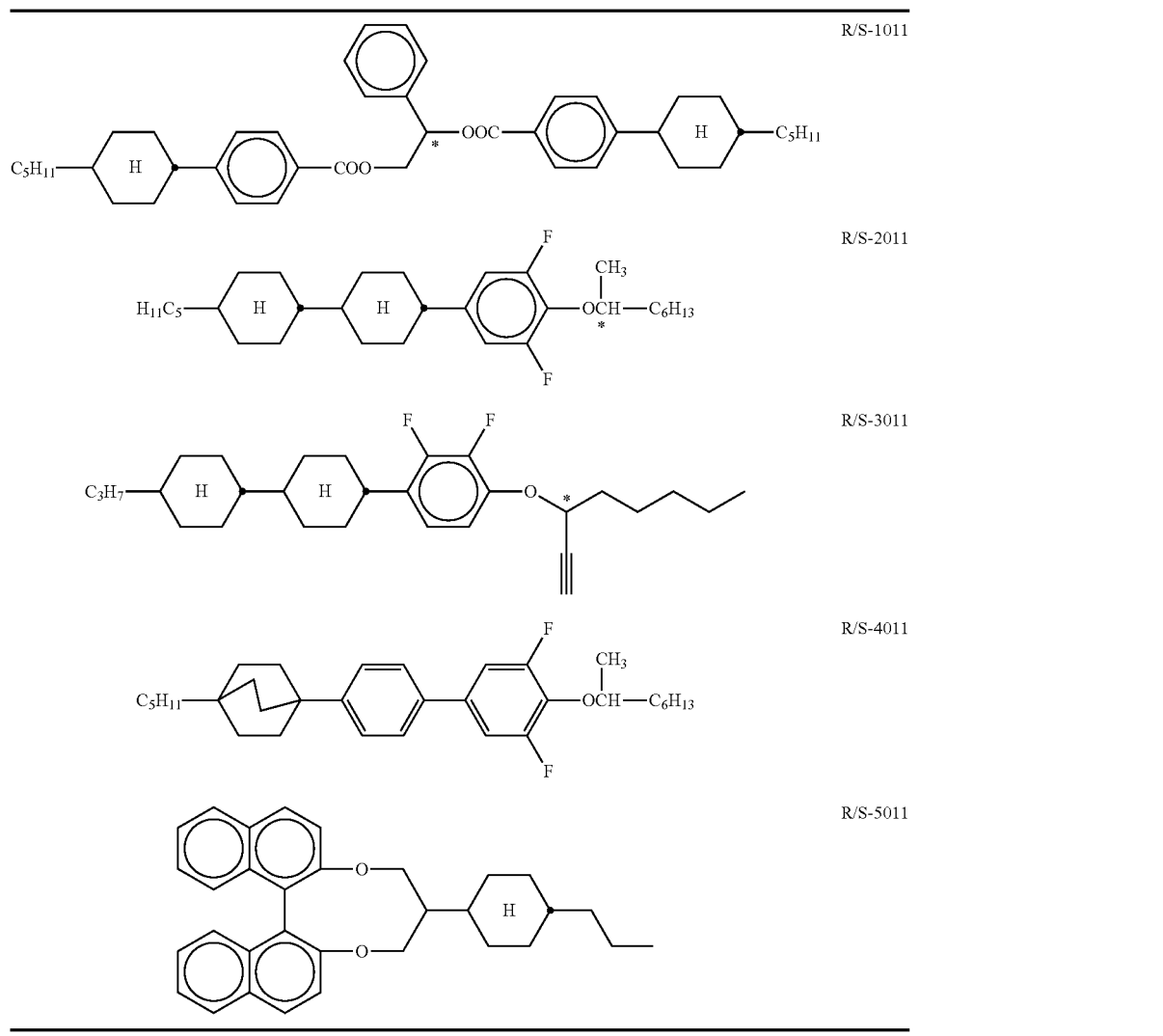

In a preferred embodiment of the present invention, the mesogenic media comprise one or more compounds selected from the group of the compounds from Table F.

The mesogenic media in accordance with the present application preferably comprise two or more, preferably four or more, compounds selected from the group consisting of the compounds from the above tables.

The liquid-crystal media in accordance with the present invention preferably comprise
- seven or more, preferably eight or more, compounds, preferably compounds having three or more, preferably four or more, different formulae, selected from the group of the compounds from Table D.

EXAMPLES

The following examples illustrate the present invention without limiting it in any way. However, it becomes clear to the person skilled in the art from the physical properties what properties can be achieved and in what ranges they can be modified. In particular, the combination of the various properties which can preferably be achieved is thus well defined for the person skilled in the art.

The acetylenes employed, if not commercially available, are synthesised in accordance with standard laboratory procedures.

Substance Examples A

Illustrative Compounds of the Formula IA for Component A

Synthesis Example 1a

Synthesis of 1-(2-fluoro-4-n-butylphenylethynyl)-3-cyclopropyl-4-(4-n-butylphenylethynyl)benzene

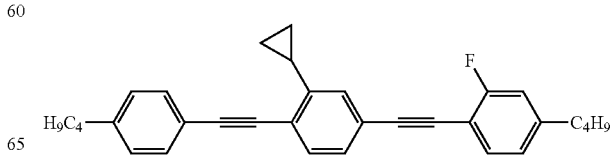

1a.1 Synthesis of 2-cyclopropyl-4-chlorophenol

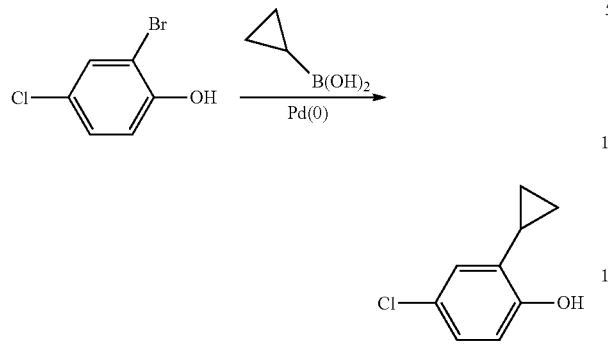

58.5 g (282 mmol) of 2-bromo-4-chlorophenol are initially introduced in 400 ml of N,N-dimethylformamide, and 48.5 g (564 mmol) of cyclopropylboronic acid and 123.5 g (48.2 mmol) of potassium phosphate are added. 3.25 g (5.6 mmol) of bis(dibenzylideneacetone)palladium(0) and 8 g (11.3 mmol) of 1,2,3,4,5-pentaphenyl-1-(di-tert-butylphosphino)ferrocene are subsequently added, and the mixture is stirred at 120° C. for 16 h. The reaction mixture is then cooled, water and MTB are added, and the mixture is acidified using dilute hydrochloric acid. The phases are separated, and the aqueous phase is extracted once with MTB. The combined organic phases are washed once with water, dried over sodium sulfate, filtered and evaporated in a rotary evaporator (100 mbar, water-bath temperature=40° C.). The residue is purified by column chromatography ($SiO_2$, toluene), giving the product as a clear, slightly yellowish liquid, which is employed directly in the next reaction without further purification.

1a.2 Synthesis of 2-cyclopropyl-4-chlorophenol

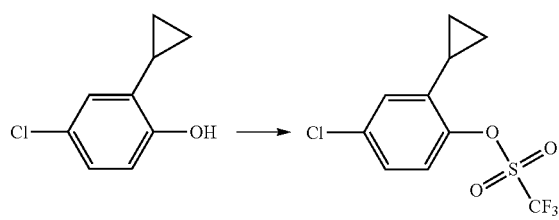 [SMILES: Oc1ccc(Cl)cc1C1CC1 ; O=S(=O)(Oc1ccc(Cl)cc1C1CC1)C(F)(F)F]

17.8 g (67 mmol) of 2-cyclopropyl-4-chlorophenol, 13 ml (93 mmol) of triethylamine and 163 mg of 4-dimethylaminopyridine (1.3 mmol) are initially introduced in 200 ml of dichloromethane, the mixture is cooled in an ice bath, and 12 ml (73 mmol) of trifluoromethanesulfonic anhydride are added dropwise. The batch is stirred overnight, during which it warms to RT. Water and dilute hydrochloric acid are subsequently carefully added, and the phases are separated. The organic phase is washed with saturated sodium chloride soln., dried over sodium sulfate, filtered and evaporated in a rotary evaporator. The residue is purified by column chromatography ($SiO_2$, heptane), giving the product as a colourless oil.

1a.3 Synthesis of 1-chloro-3-cyclopropyl-4-(4-n-butylphenylethynyl)benzene

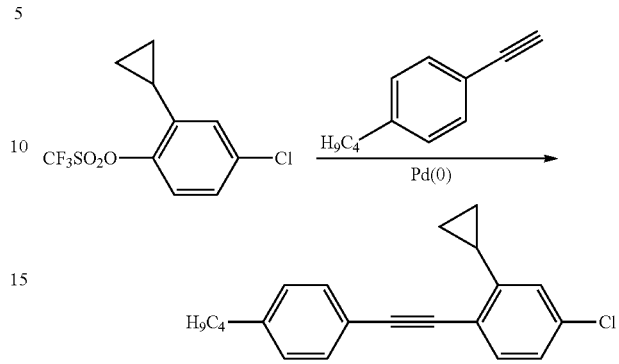

28.3 g (94 mmol) of the trifluoromethanesulfonate obtained in the preceding reaction, 14.9 g (94 mmol) of 4-n-butylphenylacetylene and 67.5 g (207 mmol) of caesium carbonate are initially introduced in 280 ml of 1,4-dioxane, 250 mg (1 mmol) of bis(acetonitrile)palladium(II) chloride and 1.35 g (2.8 mmol) of 2-dicyclohexylphosphino-2',4',6'-triisopropylbiphenyl are added, and the mixture is stirred at 100° C. for 16 h. The batch is diluted with water and MTB, the phases are separated, and the aqueous phase is extracted once with MTB. The combined organic phases are washed with saturated sodium chloride solution, dried over sodium sulfate, filtered and evaporated in a rotary evaporator. The residue is pre-purified by column chromatography ($SiO_2$, heptane), and the final purification is carried out by means of vacuum distillation using a bulb-tube apparatus (0.2 mbar, 200° C.).

1a.4 Synthesis of 1-(trimethylsilylethynyl)-3-cyclopropyl-4-(4-n-butylphenylethynyl)benzene

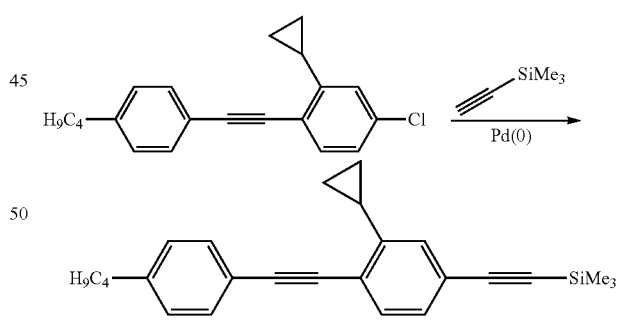

10.6 g (34.3 mmol) of the tolan obtained in the preceding reaction and 14.5 ml (103 mmol) of trimethylsilylacetylene are initially introduced in 100 ml of 1,4-dioxane, 24.6 g (75.5 mmol) of caesium carbonate, 90 mg (0.35 mmol) of bis(acetonitrile)palladium(II) chloride and 500 mg (1 mmol) of 2-dicyclohexylphosphino-2',4',6'-triisopropylbiphenyl are added, and the mixture is stirred at 70° C. for 16 h. The batch is cooled, and MTB and water are added. The phases are separated, and the aqueous phase is extracted twice with MTB. The combined organic phases are washed with water, dried over sodium sulfate, filtered and evaporated in a rotary evaporator. The residue is purified by column chromatography (SiO₂, heptane), giving the product as a colourless oil, which is employed in the next reaction without further purification.

1a.5 Synthesis of 3-cyclopropyl-4-(4-n-butylphenylethynyl)phenylacetylene

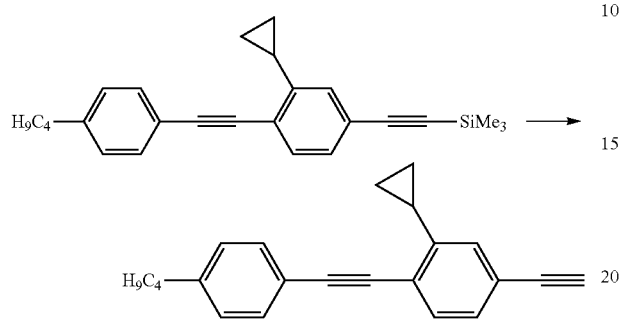

12.8 g (24.4 mmol) of the trimethylsilylacetylene obtained in the preceding reaction are initially introduced in 70 ml of tetrahydrofuran, 9.6 g (36.6 mmol) of tetra-n-butylammonium fluoride trihydrate are added, and the mixture is stirred at RT for 16 h. MTB and water are added to the batch, the phases are separated, and the aqueous phase is extracted once with MTB. The combined organic phases are washed with water, dried over sodium sulfate, filtered and evaporated in a rotary evaporator. The residue is purified by column chromatography (RP-18 silica gel, acetonitrile), giving the product as a colourless oil.

1a.6 Synthesis of 1-(2-fluoro-4-n-butylphenylethynyl)-3-cyclopropyl-4-(4-n-butylphenylethynyl)benzene

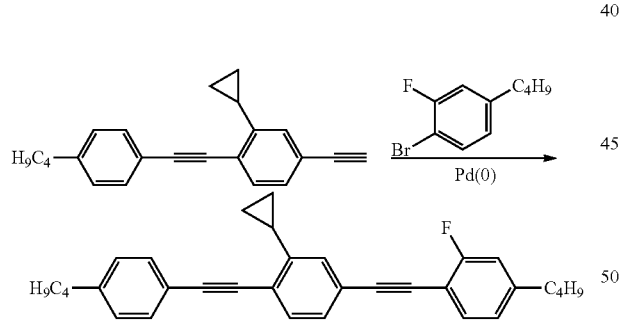

2.1 g (7 mmol) of the acetylene obtained in the preceding reaction and 1.6 g (7 mmol) of 2-fluoro-4-n-butylbromobenzene are initially introduced in 20 ml of 1,4-dioxane, 5 g (15.5 mmol) of caesium carbonate, 18 mg (70 μmol) of bis-(acetonitrile)palladium(II) chloride and 100 mg (100 μmol) of 2-dicyclohexylphosphino-2',4',6'-triisopropylbiphenyl are added, and the mixture is stirred at 100° C. for 16 h. MTB and water are added to the batch, the phases are separated, and the aqueous phase is extracted once with MTB. The combined organic phases are washed with water, dried over sodium sulfate, filtered and evaporated in a rotary evaporator. The residue is purified by column chromatography (SiO₂, heptane), and the further purification is carried out by recrystallisation from heptane.

MS (EI): m/e (%)=448 (100, M⁺), 405 (21, [M-propyl]⁺), 391 (21), 159 (25).
Phase sequence: C, 57; N, 66.0 I.
Data extrapolated from 10% solution in ZLI-4792:
$\Delta\epsilon=+0.7$; $\Delta n=0.369$ and $\gamma_1=1420$ mPa·s.

Substance Example 2a

Compound 2a

The following compound is prepared analogously to the synthesis described under Synthesis Example 1a:

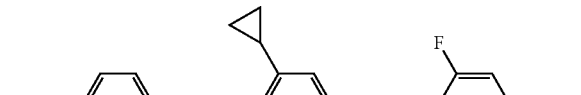

Substance Examples B

Illustrative Compounds of the Formula IB for Component A

Substance Example 1b

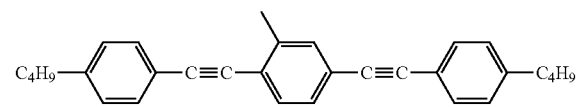

Phase sequence: C 87° C. N 178.5° C. I; $\Delta n=0.436$; $\Delta\epsilon=2.8$.

Substance Example 2b

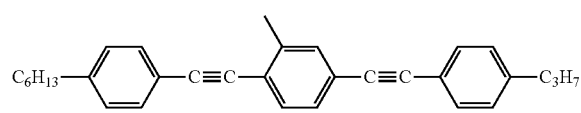

Phase sequence: C 78° C. N 172.3° C. I; $\Delta n=0.437$; $\Delta\epsilon=2.6$.

Substance Example 3b

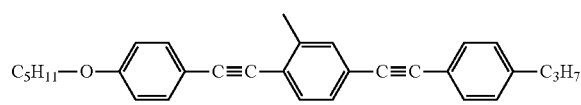

Phase sequence: C 107° C. N 211.0° C. I; $\Delta n=0.464$; $\Delta\epsilon=3.1$.

Substance Example 4b

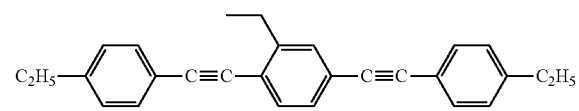

Phase sequence: C 87° C. N 130.7° C. I; Δn=0.451; Δε=2.1.

Substance Example 5b

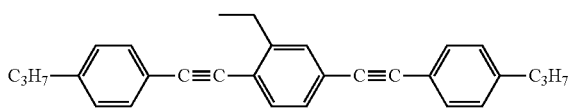

Phase sequence: C 57° C. N 151.7° C. I; Δn=0.445; Δε=2.0.

Substance Example 6b

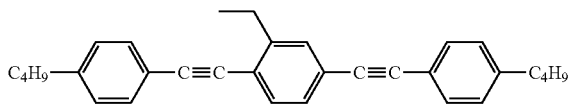

Phase sequence: C 29° C. N 119.2° C. I; Δn=0.402; Δε=1.7.

Substance Example 7b

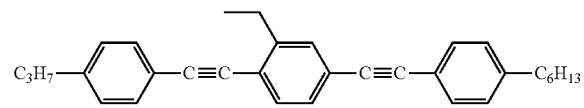

Phase sequence: $T_g$ −54° C. C 14° C. N 119.2° C. I; Δn=0.393; Δε=1.8.

Substance Example 8b

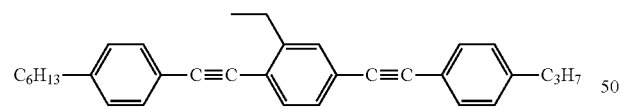

Phase sequence: C 60° C. N 121.8° C. I; Δn=0.394; Δε=1.7.

Substance Example 9b

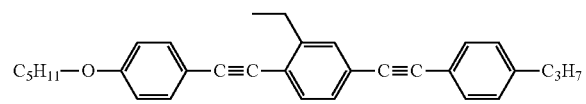

Phase sequence: C 81° C. N 160.7° C. I; Δn=0.432; Δε=3.2.

Substance Example 10b

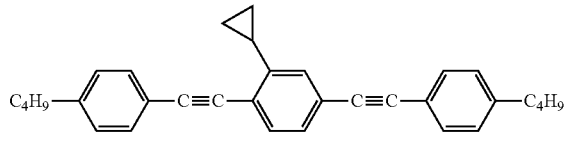

Synthesis Example 10

1,4-Bis(2-(4-butylphenyl)ethynyl)-2-cyclopropylbenzene 10b.1) 1,4-Dichloro-2-cyclopropylbenzene (2)

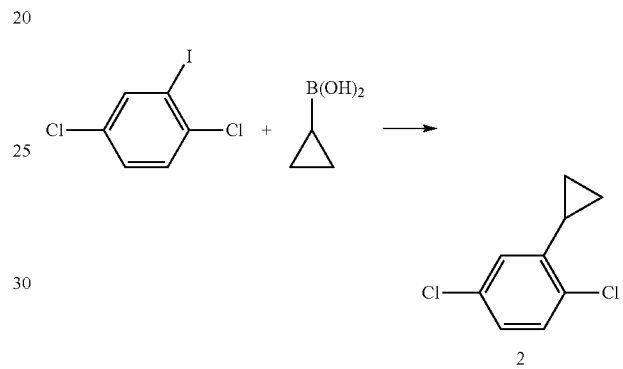

20 g (73 mmol) of 1,4-dichloro-2-iodobenzene, 9.4 g (110 mmol) of cyclopropylboronic acid, 32 g (147 mmol) of potassium phosphate, 421 mg (0.7 mmol) of bis(dibenzylideneacetone)palladium(0) (Pd(dba)$_2$) and 1096 mg (1.5 mmol) of 1,2,3,4,5-pentaphenyl-1-(di-t-butylphosphine)ferrocene (CTC-Q-PHOS) are dissolved in 600 ml of toluene and heated at 100° C. overnight. 100 ml of water are added to the cooled solution, and the mixture is extracted twice with toluene (100 ml). The combined organic phases are washed with water, dried over sodium sulfate and evaporated in vacuo. The residue is purified by column chromatography, giving the title compound as a colourless solid.

10b.2) 1,4-Bis(2-(4-butylphenyl)ethynyl)-2-cyclopropylbenzene (1)

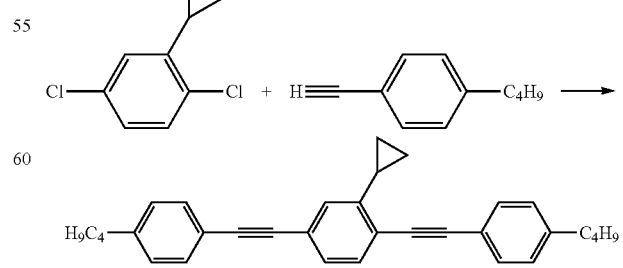

5 g (26 mmol) of 1,4-dichloro-2-cyclopropylbenzene, 9.4 g (58 mmol) of 1-n-butyl-4-ethynylbenzene, 19 g (58 mmol) of caesium carbonate, 69 mg (0.3 mmol) of bis(acetonitrile)palladium(II) chloride and 382 mg (0.8 mmol) of 2-dicyclohexylphosphino-2',4',6'-triisopropylbiphenyl are dissolved in 80 ml of dioxane under nitrogen, and the mixture is heated at 100° C. overnight. 100 ml of water are added to the cooled solution, and the mixture is extracted twice with methyl t-butyl ether (100 ml). The combined organic phases are washed with water, dried over sodium sulfate and evaporated in vacuo. The residue is purified by column chromatography and recrystallised from ethanol, giving the title compound 1 as a solid.

$^1$H-NMR (250 MHz, CDCl$_3$): 7.4-7.08 (11H, m); 2.5 (4H, m); 1.6-1.3 (9H, m); 0.96 (6H, m); 0.6-0.4 (4H, m).

Phase sequence: C 72° C. N, 84.5° C. I; Δn=0.378; Δε=1.5.

Substance Example 11b

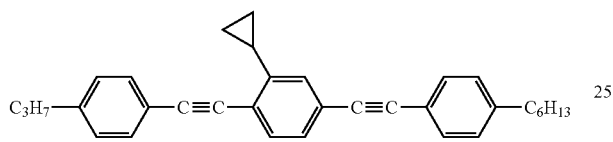

Phase sequence: T$_g$ -43° C. C 46° C. N 86.0° C. I; Δn=0.379; Δε=1.1.

Substance Example 12b

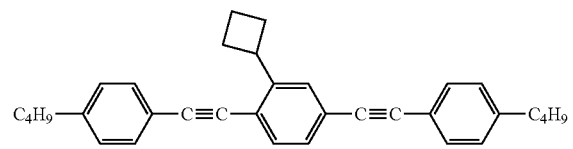

Synthesis Example 12b 1,4-Bis(2-(4-butylphenyl)ethynyl)-2-cyclobutylbenzene (3)

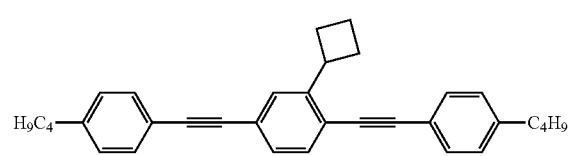

12b.1) 1-(2,5-Dibromophenyl)cyclobutanol (4)

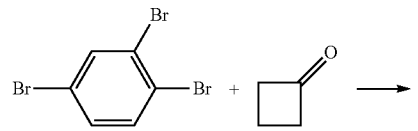

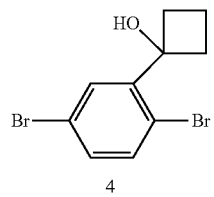

21.09 g (67 mmol) of 1,2,4-tribromobenzene are initially introduced in 100 ml of THF under nitrogen, cooled to -45° C., and a solution (1.3 M) of 51.54 ml (67 mmol) of isopropylmagnesium chloride/lithium chloride complex in THF is added dropwise. After 1 hour, the batch is warmed to -10° C., and 5 ml (66.34 ml) of cyclobutanone are added dropwise at this temperature. The batch is allowed to thaw, and sat. NH$_4$Cl solution is added, the mixture is extracted with methyl t-butyl ether, the organic phase is dried over sodium sulfate and filtered, the solvent is removed in vacuo, and the residue is filtered through silica gel with dichloromethane, giving 4, which is employed in the next step without further purification.

12b.2) 1,4-Dibromo-2-cyclobutylbenzene (5)

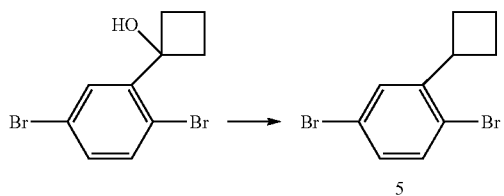 [SMILES: OC1(c2cc(Br)ccc2Br)CCC1 ; Brc1ccc(Br)c(C2CCC2)c1]

14.5 g (47.39 mmol) of 4 are dissolved in 50 ml of THF under nitrogen, and 35.72 ml (284.4 mmol) of boron trifluoride/diethyl ether complex are added dropwise at room temperature, and 12.54 g (189.6 mmol) of sodium cyanoborohydride are added dropwise in portions. The batch is heated under reflux overnight. The batch is allowed to cool to room temperature, sat. NaHCO$_3$ solution is added, the mixture is extracted with methyl t-butyl ether, the organic phase is dried over sodium sulfate and filtered, the solvent is removed in vacuo, and the residue is filtered through silica gel with 1-chlorobutane, giving 5 as a yellow liquid.

12b.3) 1,4-Bis(2-(4-butylphenyl)ethynyl)-2-cyclobutylbenzene (3)

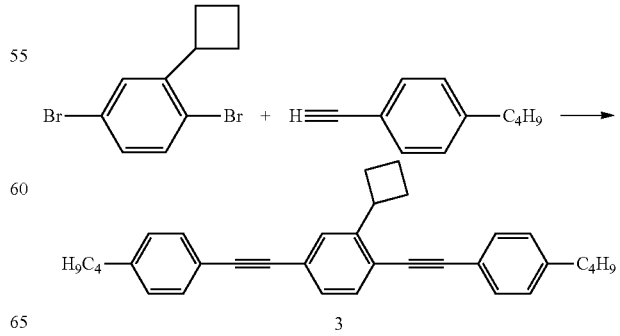

7.8 g (47.0 mmol) of 1-butyl-4-ethynylbenzene are initially introduced in 100 ml of THF under nitrogen, cooled to −78° C., and 63.32 ml (63.20 mmol) of a 1 M solution of lithium bis(trimethylsilyl)amide in hexane are added dropwise. After 1 hour, 63.22 ml (63.20 mmol) of a 1 M solution of 9-methoxy-9-BBN in hexane are added, and the mixture is left to stir at −78° C. for 2 hours. In a second apparatus, 6.8 g (23.45 mmol) of 5, 0.916 g (1.0 mmol) of tris-(dibenzylideneacetone)dipalladium(0) and 1.64 g (4.0 mmol) of 2-dicyclohexylphosphino-2',6'-dimethoxybiphenyl in 100 ml of THF are initially introduced. The first solution is slowly added dropwise, and the batch is heated at 100° C. overnight. 100 ml of water are added to the cooled solution, and the mixture is extracted twice with methyl t-butyl ether (100 ml). The combined organic phases are washed with water, dried over sodium sulfate and evaporated in vacuo. The residue is purified by column chromatography and recrystallised from isopropanol, giving the title compound 3 as a solid.

Phase sequence: $T_g$ −39° C. C 69° C.; N 70.1° C. I; $\Delta n$=0.359; $\Delta \varepsilon$=0.9.

Substance Example 13b

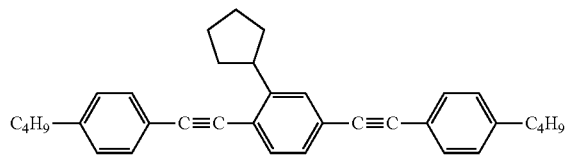

Phase sequence: $T_g$ −36° C. C 57° C.; N (?) (7.0)° C. I; $\Delta n$=0.334; $\Delta \varepsilon$=−0.1.

Substance Example 14b

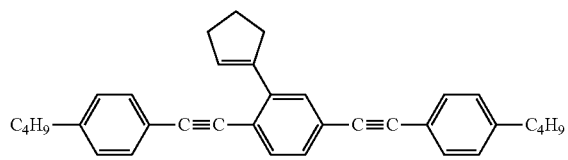

Phase sequence: $T_g$ −34° C. C 47° C. N 53.1° C. I; $\Delta n$=0.337; $\Delta \varepsilon$=0.0.

Substance Example 15b

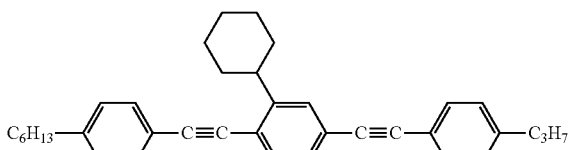

Synthesis Example 15b

2-Cyclohexyl-4-(4-hexylphenylethynyl)-1-(4-propylphenylethynyl)benzene (6)

15b.1) 4-Chloro-2-cyclohexylbenzene trifluoromethanesulfonate (7)

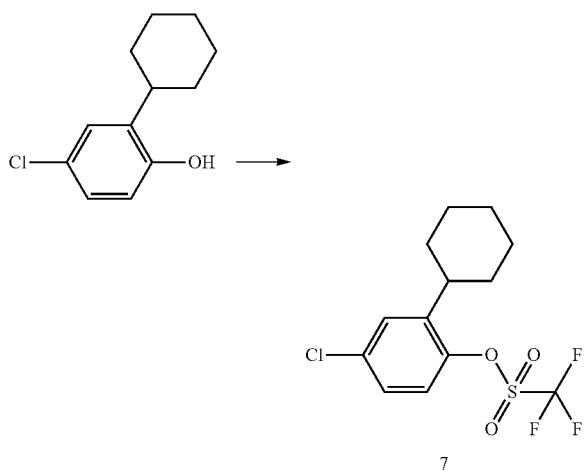

19 g (90.2 mmol) of 4-chloro-2-cyclohexylbenzene are dissolved in 264 ml of dichloromethane, cooled to −5° C., and 4.64 ml (33.18 mmol) of triethylamine and 223 mg (1.8 mmol) of 4-(dimethylamino)pyridine are added dropwise. The batch is stirred at room temperature overnight and filtered through silica gel with dichloromethane, giving the product 7, which is employed in the next step without further purification.

15b.2) (4-Chloro-2-cyclohexylphenylethynyl)trimethylsilane (8)

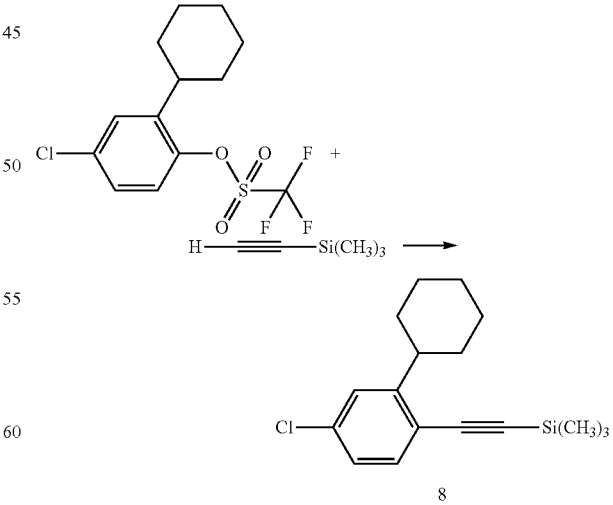

21 g (61.3 mmol) of 7, 25.8 ml (183.8 mmol) of trimethylsilylacetylene, 2.15 g (3 mmol) of bis(triphenylphosphine)palladium(II) chloride and 21.2 ml (153.2 mmol) of triethylamine are dissolved in 60 ml of N,N-dimethylformamide under nitrogen, and the mixture is heated at 100° C. overnight. 100 ml of water are added to the cooled solution, and the mixture is extracted twice with methyl t-butyl ether (100 ml). The combined organic phases are washed with water, dried over sodium sulfate and evaporated in vacuo. The residue is purified by column chromatography, giving the product 8, which is employed in the next step without further purification.

15b.3) 4-Chloro-2-cyclohexyl-1-ethynylbenzene (9)

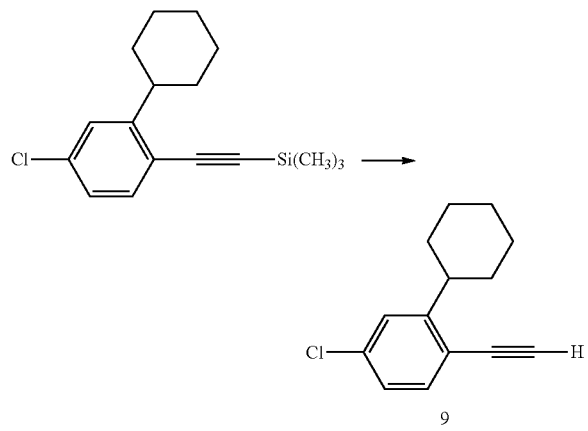

16.6 g (57.1 mmol) of 8 are dissolved in 154 ml of tetrahydrofuran, cooled to 0° C., and a 1 M solution of tetra-n-butylammonium fluoride (68.48 mmol) is added dropwise. The batch is stirred at room temperature overnight, water is added, the mixture is extracted with methyl t-butyl ether, the organic phase is dried over sodium sulfate and filtered, the solvent is removed in vacuo, and the residue is filtered through silica gel with heptane/toluene, giving the product 9, which is employed in the next step without further purification.

15b.4)
4-Chloro-2-cyclohexyl-1-p-tolylethynylbenzene (10)

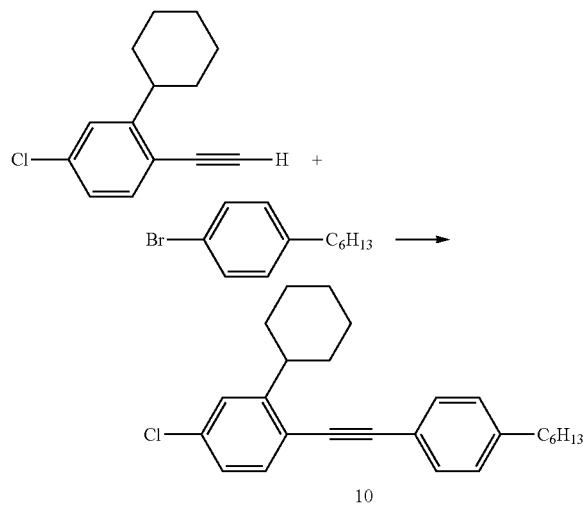

6.6 g (30.17 mmol) of 9, 7.28 g (30.17 mmol) of 1-bromo-4-hexylbenzene, 21.63 g (66.39 mmol) of caesium carbonate, 78 mg (0.3 mmol) of bis(acetonitrile)palladium(II) chloride and 431 mg (0.9 mmol) of 2-dicyclohexylphosphino-2',4',6'-triisopropylbiphenyl are dissolved in 90 ml of dioxane under nitrogen and heated at 100° C. overnight. 100 ml of water are added to the cooled solution, and the mixture is extracted twice with methyl t-butyl ether (100 ml). The combined organic phases are washed with water, dried over sodium sulfate and evaporated in vacuo. The residue is purified by column chromatography.

15b.5) 2-Cyclohexyl-4-(4-hexylphenylethynyl)-1-(4-propylphenylethynyl)benzene (6)

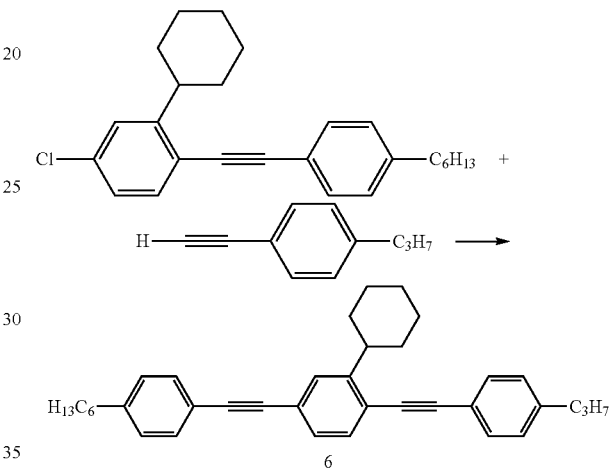

4.5 g (11.87 mmol) of 10, 1.7 g (11.87 mmol) of 1-n-propyl-4-ethynylbenzene, 8.5 g (26.12 mmol) of caesium carbonate, 30 mg (0.1 mmol) of bis(acetonitrile)-palladium(II) chloride and 170 mg (0.35 mmol) of 2-dicyclohexylphosphino-2',4',6'-triisopropylbiphenyl are dissolved in 35 ml of dioxane under nitrogen and heated at 100° C. overnight. 100 ml of water are added to the cooled solution, and the mixture is extracted twice with methyl t-butyl ether (100 ml). The combined organic phases are washed with water, dried over sodium sulfate and evaporated in vacuo. The residue is purified by column chromatography, giving the title compound 6 as a solid.

Phase sequence: $T_g$ −23° C. I; $\Delta n$=0.294; $\Delta \varepsilon$=−0.6.

Substance Example 16b

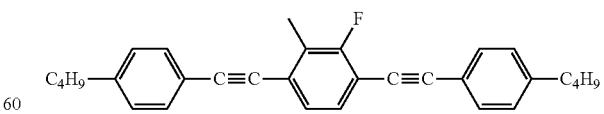

The compound is prepared in accordance with Scheme 10 and analogously to compounds already described in the present application.

Phase sequence: C 90° C. N 193.9° C. I; $\Delta n$=0.435; $\Delta \varepsilon$=3.0.

Substance Example 17b

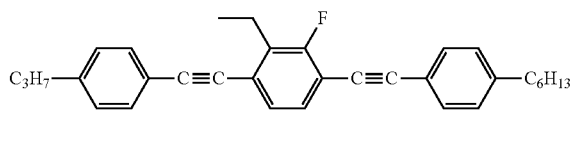

The compound is prepared in accordance with Scheme 10 and analogously to compounds already described in the present application.

Phase sequence: C 53° C. N 143.5° C. I; $\Delta n=0.401$; $\Delta\varepsilon=2.5$.

Substance Example 18b

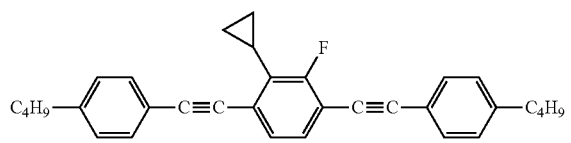

The compound is prepared in accordance with Scheme 10 and analogously to compounds already described in the present application.

Phase sequence: $T_g$ −50 C 55° C. N 138.2° C. I; $\Delta n=0.389$; $\Delta\varepsilon=1.6$.

Substance Example 19b

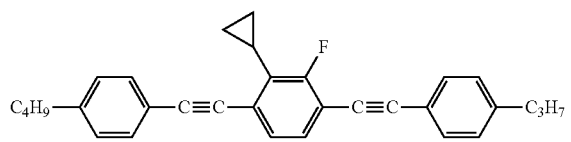

Phase sequence: $T_g$ −45 C 49° C. N 155° C. I; $\Delta n=0.403$; $\Delta\varepsilon=1.9$.

Substance Example 20b

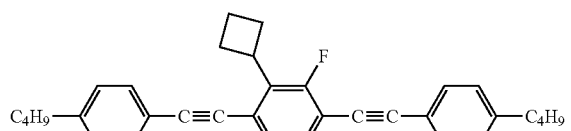

Phase sequence: $T_g$ −45° C. C 60° C. N 89.1° C. I; $\Delta n=0.348$; $\Delta\varepsilon=1.3$.

Substance Example 21b

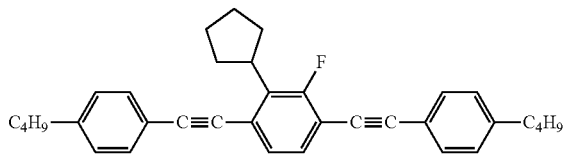

Phase sequence: $T_g$ −32° C. C 66° C. N, (44.1)° C. I; $\Delta n=0.322$; $\Delta\varepsilon=0.6$.

Substance Example 22b

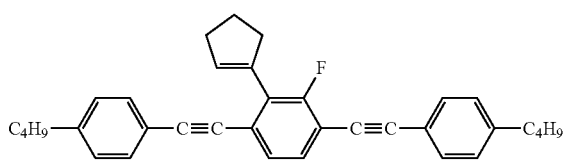

Phase sequence: $T_g$ −37° C. C 52° C. N 78.2° C. I; $\Delta n=0.339$; $\Delta\varepsilon=0.9$.

Synthesis Example 23b

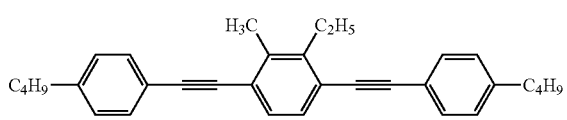

Step 23b.1

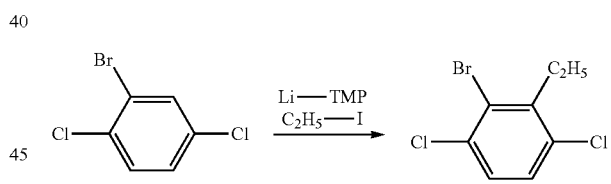

25.4 g of 2-bromo-1,4-dichlorobenzene, 8.9 ml of iodoethane and 13.3 ml of DMPU are dissolved in 230 ml of THF, and a solution of 16.2 g of lithium tetramethylpiperidite in THF is added dropwise at −70° C. After a further 2 h at −70° C., the reaction mixture is allowed to warm to ambient temperature, and the batch is hydrolysed using water and subjected to extractive work-up.

The crude product is purified by fractional distillation. B.p.: 73° C./0.1 bar. Colourless liquid.

Step 23b.2

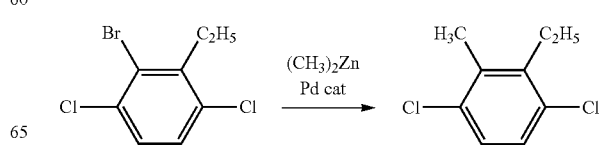

12.5 ml of a 5% solution of methyllithium in diethyl ether are added to 2.4 g of anhydrous zinc bromide in 50 ml of THF at 25-40° C. 0.3 g of PdCl$_2$-dppf, bis-(diphenylphosphinoferrocene)palladium dichloride, is then added, the mixture is heated to the boil, and 4.6 g of the product from step 1.1, dissolved in a little THF, are added dropwise. The reaction mixture is subsequently heated under reflux for 15 h. The batch is hydrolysed using water and subjected to extractive work-up. The crude product is purified by chromatography (pentane/silica gel). Colourless liquid.

Step 23b.3

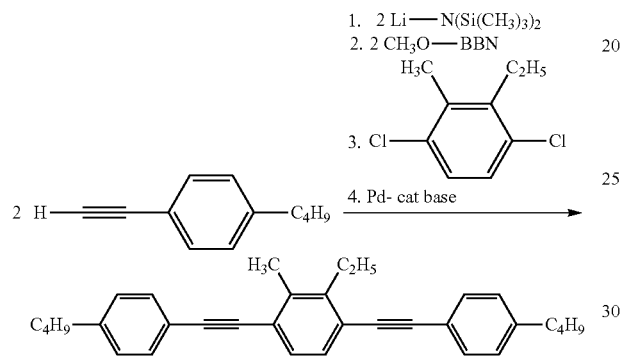

2.4 g of 4-butylphenylacetylene are initially introduced in 30 ml of THF and cooled to −78° C. 14.3 ml of a 1 M solution of lithium bis(trimethylsilyl)amide in hexane are added dropwise to this solution and allowed to react at −78° C. for a further 1 h. 14.3 ml of a 1 M solution of methoxy-9-BBN are then added dropwise, and the mixture is stirred at −78° C. for a further 2 h. In a second apparatus, 1.0 g of the product from the last step, dissolved in 40 ml of THF, is initially introduced with the catalyst comprising 0.2 g of tris(dibenzylideneacetone)dipalladium and 0.35 g of 2-dicyclohexylphosphino-2',6'-dimethoxybiphenyl, and the reaction solution from the first reaction is added at room temperature. The mixture is heated at the boil for 15 h. The batch is hydrolysed using water and subjected to extractive work-up. The crude product is purified by chromatography (pentane/silica gel). Recrystallisation from pentane gives the purified title product.

Phase sequence: C 45 N 180 I.

Substance Example 24b

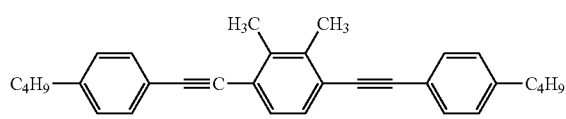

The compound is prepared analogously to Example 23b.
Phase sequence: C 118 N 222 I; Δn=0.435; Δε=2.6.

Substance Example 25b

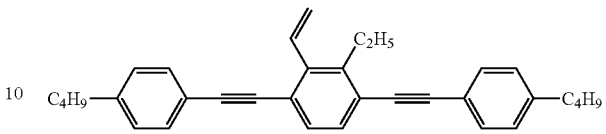

The title compound is prepared analogously to Example 23b.
Phase sequence: C 41 N 161 I.

Substance Example 26b

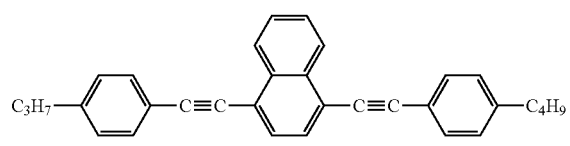

Synthesis Example 26b 26b.1) Synthesis of 1-iodo-4-bromonaphthalene

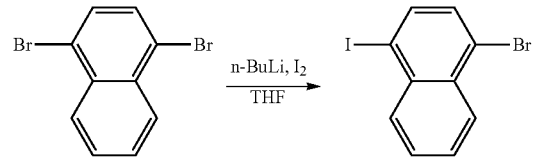

100 g (350 mmol) of 1,4-dibromonaphthalene are initially introduced in 1 l of THF, cooled to −70° C., and 235 ml of n-BuLi (1.6 M in hexane, 370 mmol) are added dropwise. After 1 h, 103 g (406 mmol) of I$_2$ in 250 ml of THF are added dropwise, the mixture is stirred at −70° C. for a further 2 h, warmed to 0° C. and quenched by the addition of 50 ml (644 mmol) of aqueous NaHSO$_3$ solution (w=39%). The phases are separated, and the aqueous phase is extracted once with MTB. The combined organic phases are washed with saturated sodium chloride soln., dried over sodium sulfate, filtered and evaporated in a rotary evaporator. The residue is purified by column chromatography (SiO$_2$, heptane), and the further purification is carried out by recrystallisation from isopropanol, giving 1-iodo-4-bromonaphthalene as a yellow solid.

26b.2) Synthesis of
1-bromo-4-(4-n-propylphenylethynyl)naphthalene

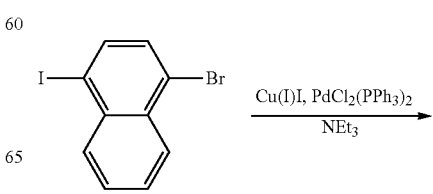

-continued

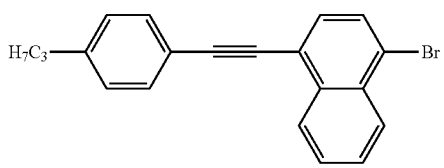

15.3 g (43.6 mmol) of 1-iodo-4-bromonaphthalene and 7.25 g (5.3 mmol) of 4-n-propylphenylacetylene are initially introduced in 200 ml of NEt$_3$, 170 mg (0.9 mmol) of copper(I) iodide and 600 mg (0.9 mmol) of bis(triphenylphosphine)palladium(II) chloride are added, and the mixture is refluxed for 30 minutes. The batch is cooled, water and heptane are added, and the phases are separated. The organic phase is washed with saturated sodium chloride soln., dried over sodium sulfate, filtered and evaporated in a rotary evaporator. The residue is purified by column chromatography (SiO$_2$, heptane), and the further purification is carried out by recrystallisation from isopropanol.

26b.3) Synthesis of 1-(4-n-butylphenylethynyl)-4-(4-n-propylphenylethynyl)-naphthalene

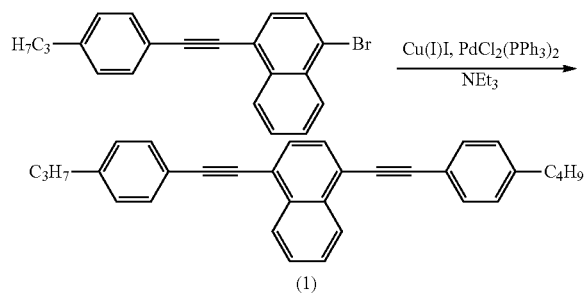

2.35 g (6.3 mmol) of 1-bromo-4-(4-n-propylphenylethynyl)naphthalene and 1.33 g (8.4 mmol) of 4-n-butylphenylacetylene are initially introduced in 40 ml of NEt$_3$, 60 mg (0.3 mmol) of copper(I) iodide and 200 mg (0.3 mmol) of bis-(triphenylphosphine)palladium(II) chloride are added, and the mixture is refluxed for 18 h.

The batch is cooled, water and heptane are added, and the phases are separated. The organic phase is washed with saturated ammonium chloride solution and subsequently with saturated sodium chloride soln., dried over sodium sulfate, filtered and evaporated in a rotary evaporator. The residue of compound (I) is purified by column chromatography (SiO$_2$, heptane), and the further purification is carried out by recrystallisation from isopropanol.

MS (EI): m/e (%)=426 (100, M$^+$), 397 (11, [M-ethyl]$^+$), 383 (16, [M-propyl]$^+$), 354 (18, [M-ethylpropyl]$^+$), 177 (14, [M-ethylpropyl]$^{2+}$).

Phase sequence: C 78 N 191 I; Δn=0.450; Δε=2.9.

Substance Example 27b

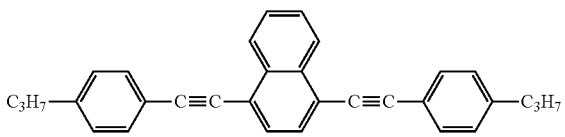

The compound is prepared analogously to Example 26b. Phase sequence: C 108° C. N 194° C. I.

Substance Example 28b

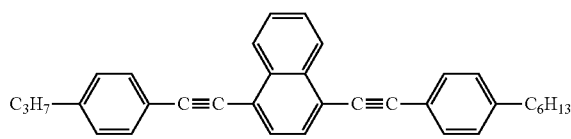

The compound is prepared analogously to Example 26b. Phase sequence: C 63° C. N 171.7° C. I; Δn=0.435; Δε=2.3.

Substance Example 29b

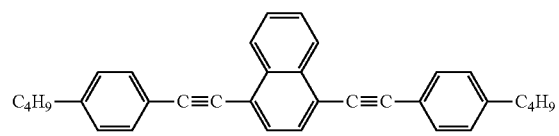

The compound is prepared analogously to Example 26b. Phase sequence: C 76° C. N 176.2° C. I; Δn=0.427; Δε=2.4.

Substance Example 30b

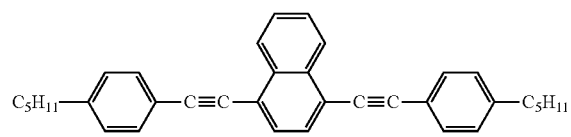

The compound is prepared analogously to Example 26b. Phase sequence: C 100° C. N 162° C. I.

Substance Example 31b

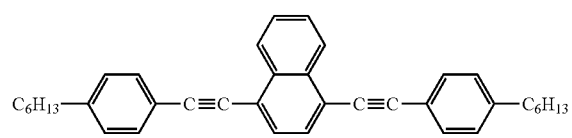

The compound is prepared analogously to Example 26b.
Phase sequence: C 61° C. N 139° C. I.

Substance Example 32b

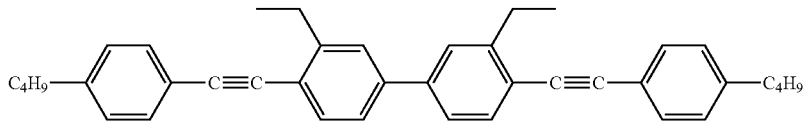

This compound is prepared analogously to the preceding compounds in accordance with the right-hand reaction path of Scheme 15.
Phase sequence: C 85° C. N 202.4° C. I; Δn=0.446; Δε=2.0.

Substance Example 33b

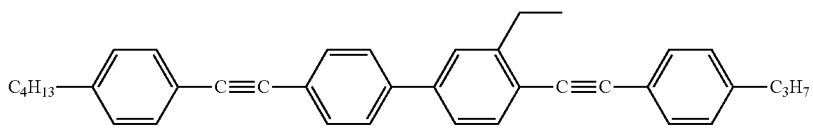

The compound is prepared analogously to Example 32b.
Phase sequence: C 112° C. N 253.5° C. I; Δn=0.484; Δε=4.1.

Substance Example 34b

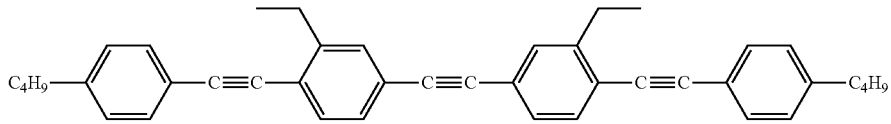

This compound is prepared analogously to the preceding compounds in accordance with the left-hand reaction path of Scheme 15.
Phase sequence: C 93° C. N 212.4° C. I; Δn=0.527; Δε=0.8.

Use Examples

Comparative Example 1

A liquid-crystalline substance having the abbreviation PTP(2)TP-6-3 is prepared by the method of Hsu, C. S., Shyu, K. F., Chuang, Y. Y. and Wu, S.-T., Liq. Cryst., 27 (2), (2000), pp. 283-287, and investigated with respect to its physical properties, in particular in the microwave region. The compound has a nematic phase and a clearing point (T(N,I)) of 114.5° C. Further physical properties at 20° C. are: $n_e$(589.3 nm)=1.8563; Δn(589.3 nm)=0.3250; $\varepsilon_{\|}$(1 kHz)=3.4; Δε(1 kHz)=0.8 and $\gamma_1$=2100 mPa·s. The compound is suitable for applications in the microwave region and/or millimeter wave region, in particular for phase shifters.

TABLE 1a

Properties of the compound PTP(2)TP-6-3 at 30 GHz

| T/° C. | $\varepsilon_{r,\|}$ | $\varepsilon_{r,\perp}$ | τ | tan $\delta_{\varepsilon,r,\|}$ | tan $\delta_{\varepsilon,r,\perp}$ | η |
|---|---|---|---|---|---|---|
| 20 | 3.22 | 2.44 | 0.242 | 0.0029 | 0.0064 | 37.9 |

TABLE 1b

Properties of the compound PTP(2)TP-6-3 at 19 GHz

| T/° C. | $\varepsilon_{r,\|}$ | $\varepsilon_{r,\perp}$ | τ | tan $\delta_{\varepsilon,r,\|}$ | tan $\delta_{\varepsilon,r,\perp}$ | η |
|---|---|---|---|---|---|---|
| 20 | 3.35 | 2.42 | 0.278 | 0.0029 | 0.0061 | 45.2 |

In addition, the properties of the compound n-1-pentyl-4'-cyanobiphenyl (also called PP-5-N or CB15) and the liquid-crystal mixture ZLI-4792 (product from Merck KGaA, Darmstadt, Germany) are investigated at 19 GHz. The results are summarised in Table 2.

TABLE 2

Comparison of the properties of the various examples at 19 GHz and 20° C.

| Example | LC | $\varepsilon_{r,\|}$ | $\varepsilon_{r,\perp}$ | τ | tan $\delta_{\varepsilon,r,max}$ | η |
|---|---|---|---|---|---|---|
| Comp. 1 | P2-6-3* | 3.35 | 2.42 | 0.278 | 0.0061 | 45.2 |
| Comp. 2 | PP-5-N$ | t.b.d. | t.b.d. | 0.131 | 0.0273 | 4.8 |
| Comp. 3 | ZLI§ | t.b.d. | t.b.d. | 0.107 | 0.0126 | 8.5 |
| 1 | M-1 | 2.64 | 2.30 | 0.127 | 0.0127 | 10.0 |
| 2 | M-2 | 2.65 | 2.31 | 0.127 | 0.0129 | 9.9 |
| 3 | M-3 | t.b.d. | t.b.d. | t.b.d. | t.b.d. | t.b.d. |
| 4 | M-4 | t.b.d. | t.b.d. | t.b.d. | t.b.d. | t.b.d. |

TABLE 2-continued

Comparison of the properties of the various examples at 19 GHz and 20° C.

| Example | LC | $\varepsilon_{r,\|\|}$ | $\varepsilon_{r,\perp}$ | $\tau$ | tan $\delta_{\varepsilon,r,max.}$ | $\eta$ |
|---|---|---|---|---|---|---|
| 5 | M-5 | t.b.d. | t.b.d. | t.b.d. | t.b.d. | t.b.d. |
| 6 | M-6 | t.b.d. | t.b.d. | t.b.d. | t.b.d. | t.b.d. |

Notes:
*) P2-6-3: PTP(2)TP-6-3,
LC: liquid crystal,
$) PP-5-N: CB15,
§) ZLI: ZLI-4792 and
t.b.d.: to be determined.

Example 1

A liquid-crystal mixture M-1 having the composition and properties as indicated in the following table is prepared.

| Composition Compound | | |
|---|---|---|
| No. | Abbreviation | c/% |
| 1 | GTP(c3)TP-4-4 | 10.0 |
| 2 | PCH-5F | 9.0 |
| 3 | PCH-6F | 7.2 |
| 4 | PCH-7F | 5.4 |
| 5 | CCP-20CF3 | 7.2 |
| 6 | CCP-30CF3 | 10.8 |
| 7 | CCP-40CF3 | 6.3 |
| 8 | CCP-50CF3 | 9.9 |
| 9 | ECCP-30CF3 | 4.5 |
| 10 | ECCP-50CF3 | 4.5 |
| 11 | BCH-3F.F | 10.8 |
| 12 | BCH-5F.F | 9.0 |
| 13 | CBC-33F | 1.8 |
| 14 | CBC-53F | 1.8 |
| 15 | CBC-55F | 1.8 |
| Σ | | 100.0 |
| Physical properties | | |

T(N, I) = 92° C.
Δn (20° C., 589.3 nm) = 0.124
Δε (20° C., 1 kHz) = 4.9
$k_{11}$ (20° C.) = t.b.d pN
$k_{33}/k_{11}$ (20° C.) = t.b.d
$\gamma_1$ (20° C.) = 167 mPa · s
$V_0$ (20° C.) = t.b.d V Note:
t.b.d.: to be determined.

This mixture is very highly suitable for applications in the microwave region and/or millimeter wave region, in particular for phase shifters.

TABLE 3

Properties of mixture M-1 at 19 GHz

| T/° C. | $\varepsilon_{r,\|\|}$ | $\varepsilon_{r,\perp}$ | $\tau$ | tan $\delta_{\varepsilon,r,\|\|}$ | tan $\delta_{\varepsilon,r,\perp}$ | $\eta$ |
|---|---|---|---|---|---|---|
| 20 | 2.64 | 2.30 | 0.127 | 0.0048 | 0.0127 | 10.0 |

Example 2

A liquid-crystal mixture M-2 having the composition and properties as indicated in the following table is prepared.

| Composition Compound | | |
|---|---|---|
| No. | Abbreviation | c/% |
| 1 | GTP(2)TP-4-4 | 10.0 |
| 2 | PCH-5F | 9.0 |
| 3 | PCH-6F | 7.2 |
| 4 | PCH-7F | 5.4 |
| 5 | CCP-20CF3 | 7.2 |
| 6 | CCP-30CF3 | 10.8 |
| 7 | CCP-40CF3 | 6.3 |
| 8 | CCP-50CF3 | 9.9 |
| 9 | ECCP-30CF3 | 4.5 |
| 10 | ECCP-50CF3 | 4.5 |
| 11 | BCH-3F.F | 10.8 |
| 12 | BCH-5F.F | 9.0 |
| 13 | CBC-33F | 1.8 |
| 14 | CBC-53F | 1.8 |
| 15 | CBC-55F | 1.8 |
| Σ | | 100.0 |
| Physical properties | | |

T(N, I) = 94° C.
Δn (20° C., 589.3 nm) = 0.125
Δε (20° C., 1 kHz) = 4.8
$k_{11}$ (20° C.) = t.b.d pN
$k_{33}/k_{11}$ (20° C.) = t.b.d
$\gamma_1$ (20° C.) = 160 mPa · s
$V_0$ (20° C.) = t.b.d V Note:
t.b.d.: to be determined.

This mixture is very highly suitable for applications in the microwave region and/or millimeter wave region, in particular for phase shifters.

TABLE 4

Properties of mixture M-2 at 19 GHz

| T/° C. | $\varepsilon_{r,\|\|}$ | $\varepsilon_{r,\perp}$ | $\tau$ | tan $\delta_{\varepsilon,r,\|\|}$ | tan $\delta_{\varepsilon,r,\perp}$ | $\eta$ |
|---|---|---|---|---|---|---|
| 20 | 2.65 | 2.31 | 0.127 | 0.0048 | 0.0129 | 9.9 |

Example 3

A liquid-crystal mixture M-3 having the composition and properties as indicated in the following table is prepared.

| Composition Compound | | |
|---|---|---|
| No. | Abbreviation | c/% |
| 1 | GTP(c3)TP-4-4 | 10.0 |
| 2 | PTP(2)TP-6-3 | 90.0 |
| Σ | | 100.0 |
| Physical properties | | |

T(N, I) = 113° C.
Δε (20° C., 1 kHz) = 0.8

This mixture is very highly suitable for applications in the microwave region and/or millimeter wave region, in particular for phase shifters.

TABLE 5

Properties of mixture M-3 at 19 GHz

| T/° C. | $\varepsilon_{r,\parallel}$ | $\varepsilon_{r,\perp}$ | $\tau$ | $\tan \delta_{\varepsilon,r,\parallel}$ | $\tan \delta_{\varepsilon,r,\perp}$ | $\eta$ |
|---|---|---|---|---|---|---|
| 20 | t.b.d. | t.b.d. | t.b.d. | t.b.d. | t.b.d. | t.b.d. |

Note:
t.b.d.: to be determined.

Example 4

A liquid-crystal mixture M-4 having the composition and properties as indicated in the following table is prepared.

| Composition Compound | | |
|---|---|---|
| No. | Abbreviation | c/% |
| 1 | GTP(2)TP-4-4 | 10.0 |
| 2 | PTP(2)TP-6-3 | 90.0 |
| Σ | | 100.0 |
| Physical properties | | |
| T(N, I) = 115° C. | | |
| Δε (20° C., 1 kHz) = 0.8 | | |

This mixture is very highly suitable for applications in the microwave region and/or millimeter wave region, in particular for phase shifters.

TABLE 6

Properties of mixture M-4 at 19 GHz

| T/° C. | $\varepsilon_{r,\parallel}$ | $\varepsilon_{r,\perp}$ | $\tau$ | $\tan \delta_{\varepsilon,r,\parallel}$ | $\tan \delta_{\varepsilon,r,\perp}$ | $\eta$ |
|---|---|---|---|---|---|---|
| 20 | t.b.d. | t.b.d. | t.b.d. | t.b.d. | t.b.d. | t.b.d. |

Note:
t.b.d.: to be determined.

Example 5

A liquid-crystal mixture M-5 having the composition and properties as indicated in the following table is prepared.

| Composition Compound | | |
|---|---|---|
| No. | Abbreviation | c/% |
| 1 | GTP(2)TP-6-3 | 10.0 |
| 2 | GTP(c3)TP-4-4 | 10.0 |
| 3 | PTP(2)TP-6-3 | 35.0 |
| 4 | PPTUI-3-2 | 20.0 |
| 5 | PPTUI-3-2 | 25.0 |
| Σ | | 100.0 |
| Physical properties | | |
| T(N, I) = 134° C. | | |
| Δε (20° C., 1 kHz) = 1.0 | | |

This mixture is very highly suitable for applications in the microwave region and/or millimeter wave region, in particular for phase shifters.

TABLE 7

Properties of mixture M-5 at 19 GHz

| T/° C. | $\varepsilon_{r,\parallel}$ | $\varepsilon_{r,\perp}$ | $\tau$ | $\tan \delta_{\varepsilon,r,\parallel}$ | $\tan \delta_{\varepsilon,r,\perp}$ | $\eta$ |
|---|---|---|---|---|---|---|
| 20 | t.b.d. | t.b.d. | t.b.d. | t.b.d. | t.b.d. | t.b.d. |

Note:
t.b.d.: to be determined.

Example 6

A liquid-crystal mixture M-6 having the composition and properties as indicated in the following table is prepared.

| Composition Compound | | |
|---|---|---|
| No. | Abbreviation | c/% |
| 1 | GTP(2)TP-6-3 | 10.0 |
| 2 | GTP(c3)TP-4-4 | 10.0 |
| 3 | PTPI(2)P(2)TP-4-4 | 6.0 |
| 4 | PTPI(2)TP(2)TP-4-4 | 5.0 |
| 5 | PTP(2)TP-6-3 | 28.0 |
| 6 | PPTUI-3-2 | 19.0 |
| 7 | PPTUI-3-2 | 22.0 |
| Σ | | 100.0 |
| Physical properties | | |
| T(N, I) = 141° C. | | |
| Δε (20° C., 1 kHz) = 0.9 | | |

This mixture is very highly suitable for applications in the microwave region and/or millimeter wave region, in particular for phase shifters.

TABLE 8

Properties of mixture M-6 at 19 GHz

| T/° C. | $\varepsilon_{r,\parallel}$ | $\varepsilon_{r,\perp}$ | $\tau$ | $\tan \delta_{\varepsilon,r,\parallel}$ | $\tan \delta_{\varepsilon,r,\perp}$ | $\eta$ |
|---|---|---|---|---|---|---|
| 20 | t.b.d. | t.b.d. | t.b.d. | t.b.d. | t.b.d. | t.b.d. |

Note:
t.b.d.: to be determined.

The invention claimed is:

1. A liquid-crystal medium, comprising a component A which comprises one or more compounds of formulae IA-1, IA-2, or IA-1 and IA-2,

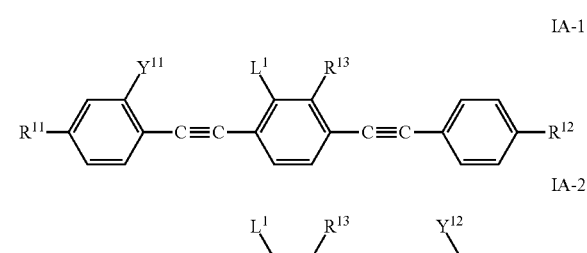

in which

L¹ denotes hydrogen, alkyl having 1 to 3 C atoms, or halogen, one of

Y¹¹ and Y¹² denotes alkyl having 1 to 6 C atoms, cycloalkyl having 3 to 6 C atoms, cycloalkenyl having 4 to 6 C atoms or halogen, and the other denotes H, alkyl having 1 to 6 C atoms, cycloalkyl having 3 to 6 C atoms, cycloalkenyl having 4 to 6 C atoms or halogen, R¹¹ and R¹², independently of one another, denote unfluorinated alkyl or un-fluorinated alkoxy, each having 1 to 15 C atoms, unfluorinated alkenyl, unfluorinated alkenyloxy or unfluorinated alkoxyalkyl, each having 2 to 15 C atoms, or cycloalkyl, alkylcycloalkyl, cycloalkenyl, alkylcycloalkenyl, alkylcycloalkylalkyl or alkylcyclo-alkenylalkyl, each having up to 15 C atoms, and R¹³ denotes alkyl having 2 to 6 C atoms, unfluorinated alkenyl having 2 to 6 C atoms, unfluorinated cycloalkyl having 3 to 5 C atoms or unfluorinated cycloalkenyl having 4 to 6 C atoms, and which further comprises one or more compounds of formula IB-2 and/or IB-4

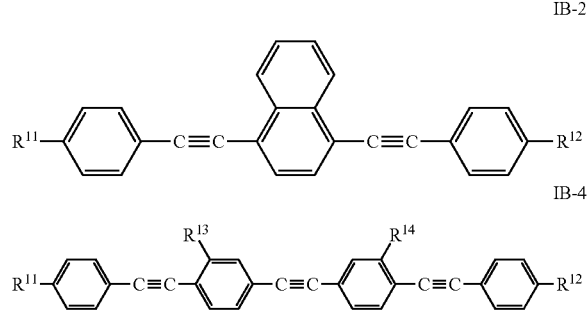

R¹¹ R¹², R¹³ and R¹⁴, independently of one another, denote unfluorinated alkyl or unfluorinated alkoxy, each having 1 to 15 C atoms, unfluorinated alkenyl, unfluorinated alkenyloxy or unfluorinated alkoxyalkyl, each having 2 to 15 C atoms, or cycloalkyl, alkylcycloalkyl, cycloalkenyl, alkylcycloalkenyl, alkylcycloalkylalkyl or alkylcycloalkenylalkyl, each having up to 15 C atoms, and alternatively one of R¹³ and R¹⁴ or both also denote H.

2. The liquid-crystal medium according to claim 1, wherein component A further comprises one or more compounds of the formulae IB-1

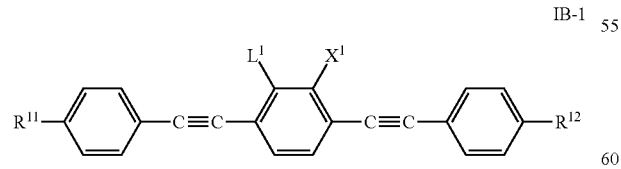

in which in IB-1, L¹ is $C_{1-6}$ alkyl, $C_{3-6}$-cycloalkyl, $C_{4-6}$ cycloalklenyl or halogen, and X¹ is H, $C_{1-3}$-alkyl or halogen.

3. The liquid-crystal medium according to claim 2, wherein component A comprises one or more compounds of the formula IB-1, in which X¹ denotes H.

4. The liquid-crystal medium according to claim 2, wherein component A comprises one or more compounds of the formula IB-1, in which X¹ denotes F.

5. The liquid-crystal medium according to claim 1, additionally comprising one or more components B to E:

a strongly dielectrically positive component, component B, which has a dielectric anisotropy of 10 or more, a strongly dielectrically negative component, component C, which has a dielectric anisotropy having a value of −5 or less, a component, component D, which has a dielectric anisotropy in the range from more than −5.0 to less than 10.0 and is compounds having seven or more five- or six-membered rings, and a component, component E, which likewise has a dielectric anisotropy in the range from more than −5.0 to less than 10.0 and is compounds having up to six five- or six-membered rings.

6. The liquid-crystal medium according to claim 5, comprising a component B.

7. The liquid-crystal medium according to claim 5, comprising component C.

8. The liquid-crystal medium according to claim 5, comprising component D.

9. The liquid-crystal medium according to claim 1, comprising one or more compounds of formula VI

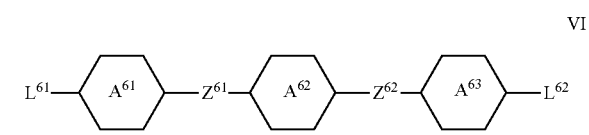

in which

L⁶¹ denotes R⁶¹ and, in the case where Z⁶¹ and/or Z⁶² denote trans-CH=CH— or trans-CF=CF—, alternatively also denotes X⁶¹, L⁶² denotes R⁶² and, in the case where Z⁶¹ and/or Z⁶² denote trans-CH=CH— or trans-CF=CF—, alternatively also denotes X⁶², R⁶¹ and R⁶², independently of one another, denote H, unfluorinated alkyl or unfluorinated alkoxy having 1 to 17 C atoms or unfluorinated alkenyl, unfluorinated alkenyloxy or unfluorinated alkoxyalkyl having 2 to 15 C atoms, X⁶¹ and X⁶², independently of one another, denote F or Cl, —CN, —NCS, —SF₅, fluorinated alkyl or alkoxy having 1 to 7 C atoms or fluorinated alkenyl, alkenyloxy or alkoxyalkyl having 2 to 7 C atoms, or —NCS, one of Z⁶¹ and Z⁶² denotes trans-CH=CH—, trans-CF=CF— or —C≡C— and the other, independently thereof, denotes trans-CH=CH—, trans-CF=CF—or a single bond, and

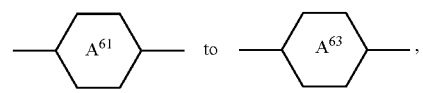

independently of one another, denote

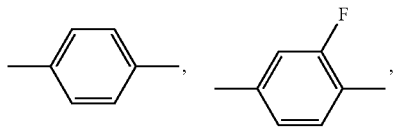

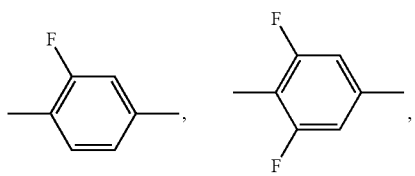

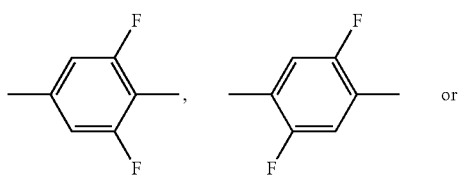

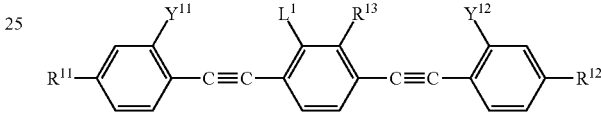

10. A process for the preparation of a liquid-crystal medium according to claim 1, comprising mixing one or more compounds of the formula IA-1 and/or IA-2, and IB-2 and/or IB-4, as indicated in claim 1, with one or more further compounds and/or with one or more additives.

11. A component for high-frequency technology, containing a liquid-crystal medium according to claim 1.

12. A microwave antenna array, comprising one or more components according to claim 11.

13. A process for tuning a microwave antenna array, comprising electrically addressing a component thereof according to claim 11.

14. A liquid-crystal medium according to claim 1, wherein $R^{13}$ is ethyl.

15. A liquid-crystal medium according to claim 1, comprising one or more compounds of the formula IA-2b, IA-2c or IA-2b and IA-2c,

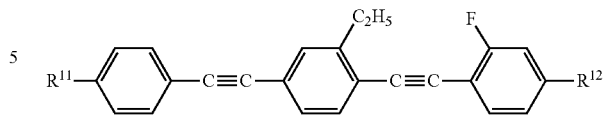

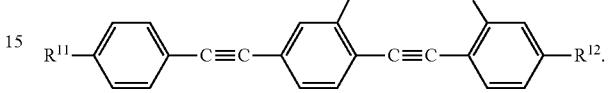

16. A process for the preparation of a compound of the formula IA,

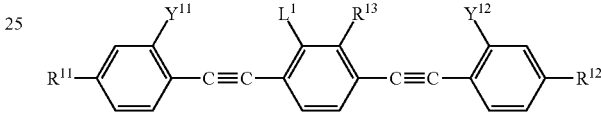

in which $L^1$ denotes hydrogen, alkyl having 1 to 3 C atoms, or halogen, one of $Y^{11}$ and $Y^{12}$ denotes alkyl having 1 to 6 C atoms, cycloalkyl having 3 to 6 C atoms, cycloalkenyl having 4 to 6 C atoms or halogen, and the other denotes H, alkyl having 1 to 6 C atoms, cycloalkyl having 3 to 6 C atoms, cycloalkenyl having 4 to 6 C atoms or halogen, $R^{11}$ and $R^{12}$, independently of one another, denote unfluorinated alkyl or un-fluorinated alkoxy, each having 1 to 15 C atoms, unfluorinated alkenyl, unfluorinated alkenyloxy or unfluorinated alkoxyalkyl, each having 2 to 15 C atoms, or cycloalkyl, alkylcycloalkyl, cycloalkenyl, alkylcycloalkenyl, alkylcycloalkylalkyl or alkylcyclo-alkenylalkyl, each having up to 15 C atoms, and $R^{12}$ denotes alkyl having 2 to 6 atoms, unfluorinated alkenyl having 2 to 6 atoms, unfluorinated cycloalkyl having 3 to 5 C atoms or unfluorinated cycloalkenyl having 4 to 6 C atoms, and $R^{13}$ is alkyl having 2 to 6 C atoms, unfluorinated alkenyl having 2 to 6 C atoms, unfluorinated cycloalkyl having 3 to 5 C atoms or unfluorinated cycloalkenyl having 4 to 6 C atoms, comprising

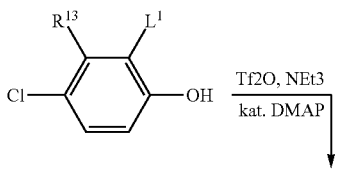

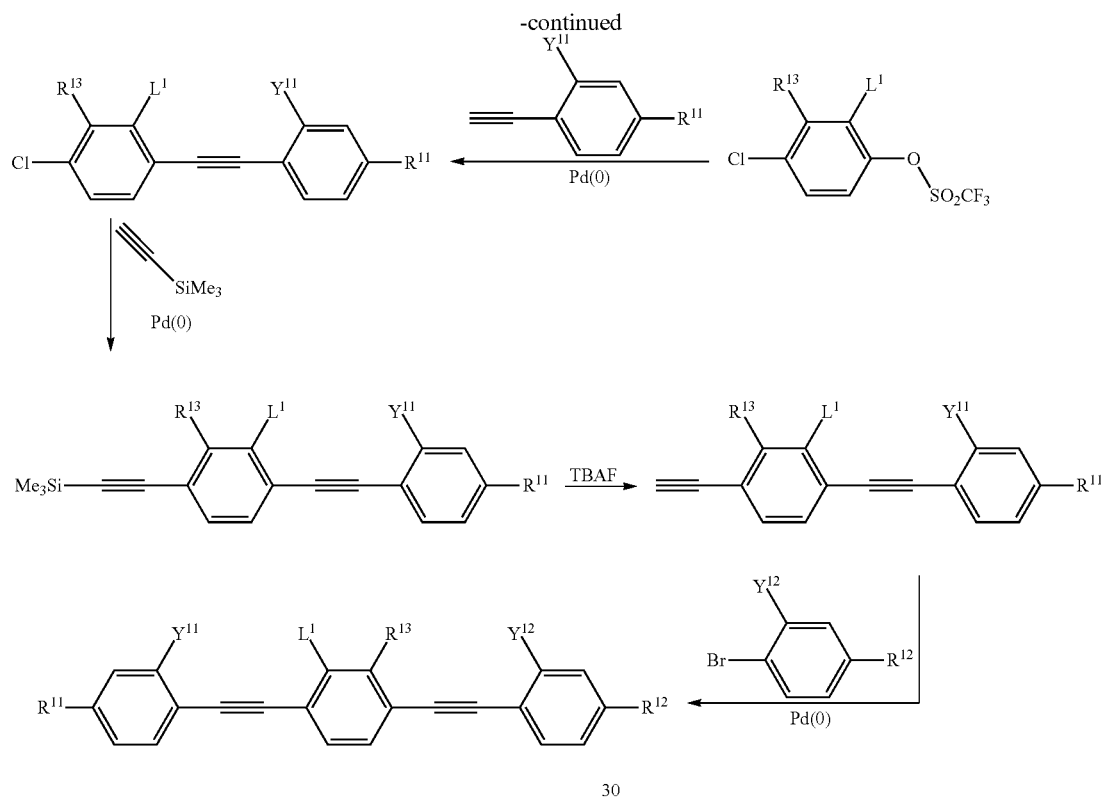

17. The process according to claim 16, wherein the compound of formula IA has formula IA-1

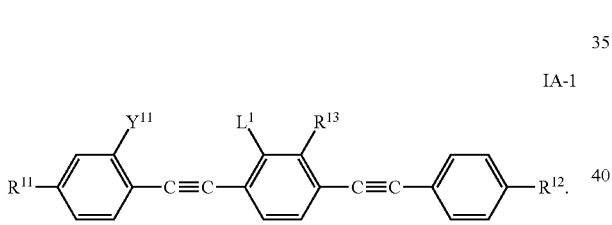

18. The process according to claim 16, wherein the compound of formula IA has formula IA-2

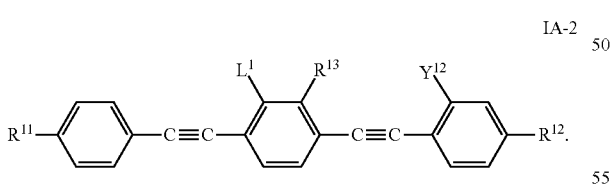

19. A liquid-crystal medium comprising one or more compounds of the formula

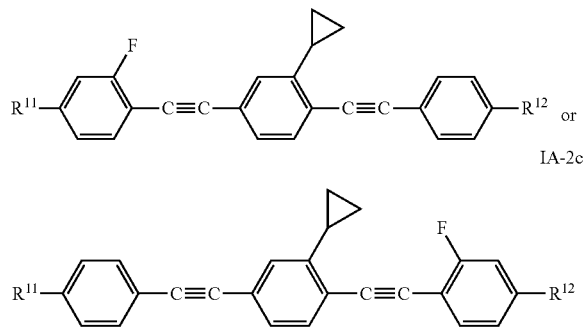

wherein $R^{11}$ and $R^{12}$ are each independently unfluorinated alkyl or unfluorinated alkoxy, each having 1 to 15 C atoms, unfluorinated alkenyl, unfluorinated alkenyloxy or unfluorinated alkoxyalkyl, each having 2 to 15 C atoms, or cycloalkyl, alkylcycloalkyl, cycloalkenyl, alkylcycloalkenyl, alkylcycloalkylalkyl or alkylcycloalkenylalkyl, each having up to 15 C atoms, and wherein at least one compound of formula IA-Ic is present.

20. A liquid-crystal medium comprising one or more compounds of the formula

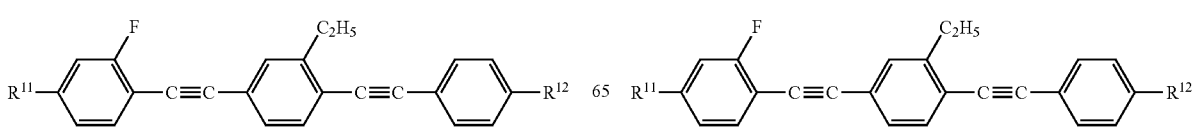

-continued

IA-1c

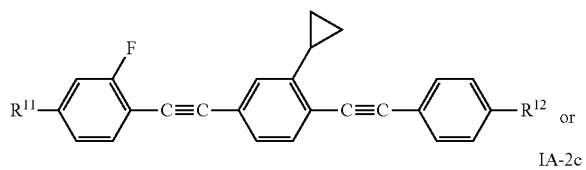

or

IA-2c

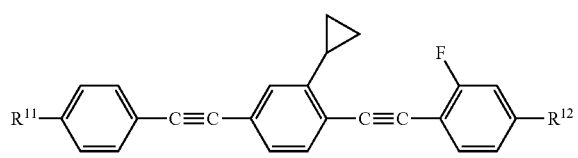

wherein $R^{11}$ and $R^{12}$ are each independently unfluorinated alkyl or unfluorinated alkoxy, each having 1 to 15 C atoms, unfluorinated alkenyl, unfluorinated alkenyloxy or unfluorinated alkoxyalkyl, each having 2 to 15 C atoms, or cycloalkyl, alkylcycloalkyl, cycloalkenyl, alkylcycloalkenyl, alkylcycloalkylalkyl or alkylcycloalkenylalkyl, each having up to 15 C atoms, and wherein at least one compound of formula IA-2c is present.

21. A liquid crystal medium comprising a component A which comprises one or more compounds of formulae IA-1, IA-2, or IA-1 and IA-2,

IA-1

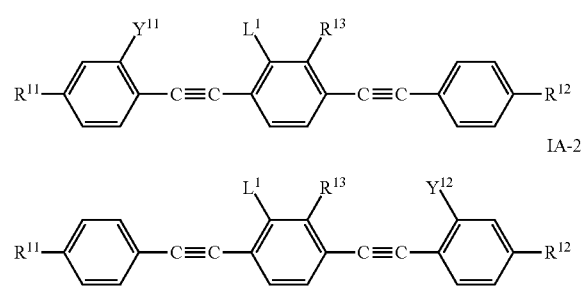

in which $L^1$ denotes hydrogen, alkyl having 1 to 3 C atoms, or halogen, one of $Y^{11}$ and $Y^{12}$ denotes alkyl having 1 to 6 C atoms, cycloalkyl having 3 to 6 C atoms, cycloalkenyl having 4 to 6 C atoms or halogen, and the other denotes H, alkyl having 1 to 6 C atoms, cycloalkyl having 3 to 6 C atoms, cycloalkenyl having 4 to 6 C atoms or halogen, $R^{11}$ and $R^{12}$, independently of one another, denote unfluorinated alkyl or un-fluorinated alkoxy, each having 1 to 15 C atoms, unfluorinated alkenyl, unfluorinated alkenyloxy or unfluorinated alkoxyalkyl, each having 2 to 15 C atoms, or cycloalkyl, alkylcycloalkyl, cycloalkenyl, alkylcycloalkenyl, alkylcycloalkylalkyl or alkylcyclo-alkenylalkyl, ach having up to 15 C atoms, and $R^{13}$ denotes alkyl having 2 to 6 atoms, unfluorinated alkenyl having 2 to 6 atoms, unfluorinated cycloalkyl having 3 to 5 C atoms or unfluorinated cycloalkenyl having 4 to 6 C atoms, wherein component A further comprises one or more compounds of formula IB-1

IB-1

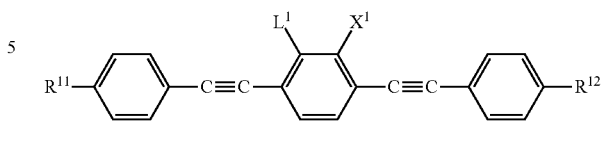

in which $X^1$ denotes F and $L^1$ denotes alkyl or cycloalkyl, and additionally one or more compounds of formula IB-2

IB-2

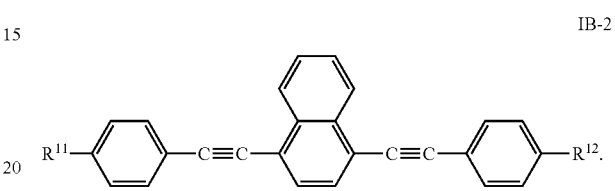

22. A liquid crystal medium comprising a component A which comprises one or more compounds of formulae IA-1, IA-2, or IA-1 and IA-2,

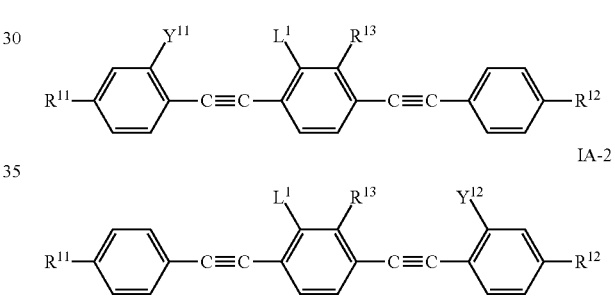

in which $L^1$ denotes hydrogen, alkyl having 1 to 3 C atoms, or halogen, one of $Y^{11}$ and $Y^{12}$ denotes alkyl having 1 to 6 C atoms, cycloalkyl having 3 to 6 C atoms, cycloalkenyl having 4 to 6 C atoms or halogen, and the other denotes H, alkyl having 1 to 6 C atoms, cycloalkyl having 3 to 6 C atoms, cycloalkenyl having 4 to 6 C atoms or halogen, $R^{11}$ and $R^{12}$, independently of one another, denote unfluorinated alkyl or un-fluorinated alkoxy, each having 1 to 15 C atoms, unfluorinated alkenyl, unfluorinated alkenyloxy or unfluorinated alkoxyalkyl, each having 2 to 15 C atoms, or cycloalkyl, alkylcycloalkyl, cycloalkenyl, alkylcycloalkenyl, alkylcycloalkylalkyl or alkylcyclo-alkenylalkyl, each having up to 15 C atoms, and $R^{13}$ denotes alkyl having 2 to 6 atoms, unfluorinated alkenyl having 2 to 6 atoms, unfluorinated cycloalkyl having 3 to 5 C atoms or unfluorinated cycloalkenyl having 4 to 6 C atoms, wherein component A further comprises one or more compounds of formula IB-1

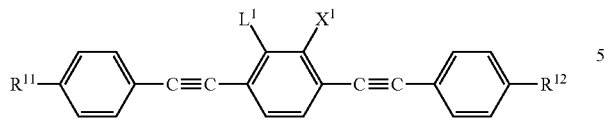

IB-1 in which $X^1$ denotes H, $L^1$ denotes ethyl, $R^{11}$ denotes n-propyl, $R^{12}$ denotes n-hexyl, and additionally one or more compounds of formula IB-2

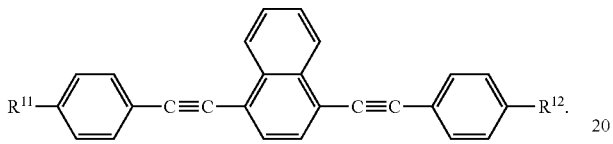

IB-2

23. The liquid crystal medium according to claim 22, wherein component A comprises one or more compounds of formula IB-1 in which $X^1$ denotes H, $L^1$ denotes ethyl, $R^{11}$ denotes n-propyl, $R^{12}$ denotes n-hexyl, additionally one or more compounds of formula IB-1 in which $X^1$ denotes F, $L^1$ denotes alkyl or cycloalkyl, and additionally one or more compounds of formula IB-2.

* * * * *